US012586455B2

(12) United States Patent
Wright et al.

(10) Patent No.: US 12,586,455 B2
(45) Date of Patent: Mar. 24, 2026

(54) DEVICES, SYSTEMS, AND METHODS FOR MONITORING CONTROLLED SPACES FOR TRANSITORY USES

(71) Applicant: TeamOfDefenders LLC, Crossroads, TX (US)

(72) Inventors: Nathan W. Wright, Oak Point, TX (US); Mark A. Cieri, Flower Mound, TX (US)

(73) Assignee: TeamOfDefenders LLC, Crossroads, TX (US)

( * ) Notice: Subject to any disclaimer, the term of this patent is extended or adjusted under 35 U.S.C. 154(b) by 99 days.

(21) Appl. No.: 18/214,152

(22) Filed: Jun. 26, 2023

(65) Prior Publication Data

US 2024/0119828 A1 Apr. 11, 2024

Related U.S. Application Data

(63) Continuation of application No. 18/332,720, filed on Jun. 10, 2023, and a continuation of application No.
(Continued)

(51) Int. Cl.
*G08B 1/08* (2006.01)
*G08B 13/196* (2006.01)
*G08B 25/10* (2006.01)

(52) U.S. Cl.
CPC ....... *G08B 25/10* (2013.01); *G08B 13/19602* (2013.01)

(58) Field of Classification Search
CPC .............. G08B 25/10; G08B 13/19602; G08B 21/0269; G08B 13/00; G08B 25/009;
(Continued)

(56) References Cited

U.S. PATENT DOCUMENTS 5,777,551 A 7/1998 Hess
5,805,063 A 9/1998 Kackman
(Continued)

OTHER PUBLICATIONS

Found at https://sky-hawk.com/self-storage-unit-security/ (last visited on Nov. 15, 2019).
(Continued)

*Primary Examiner* — Anh V La
(74) *Attorney, Agent, or Firm* — Eric Kelly

(57) ABSTRACT

The invention includes electronic monitoring-device for monitoring controlled spaces, as well as systems and methods for such monitoring. The monitoring-devices may be battery powered devices, with various sensors and capable of wireless communications. Installation of the monitoring-device may not require any wiring. These monitoring-devices may be installed at a given controlled space to monitor that given controlled space and to electronically communicate occurrences of that given controlled space to various interested stakeholders, such as, but not limited to, a tenant of the given controlled space, facility operators of the given controlled space, the provider of the electronic monitoring-device, and/or third-parties (e.g., insurance companies, first responders, and/or law enforcement). The monitoring-device may provide details, information, alerts, reminders, notices, notifications, alarms, and/or the like to various authorized stakeholders of the occurrences within that given controlled space. One example of a controlled space is a self-storage unit.

42 Claims, 17 Drawing Sheets

Related U.S. Application Data

17/969,116, filed on Oct. 19, 2022, and a continuation of application No. 16/926,041, filed on Jul. 10, 2020, now Pat. No. 11,688,271.

(60) Provisional application No. 63/457,953, filed on Apr. 7, 2023, provisional application No. 63/457,380, filed on Apr. 5, 2023, provisional application No. 63/416,707, filed on Oct. 17, 2022.

(58) Field of Classification Search
CPC ...... G08B 7/06; G08B 25/007; G08B 25/005; G08B 25/004
USPC ........... 340/539.26, 506, 540, 541, 565, 500
See application file for complete search history.

(56) References Cited

U.S. PATENT DOCUMENTS

| | | | | |
|---|---|---|---|---|
| 6,310,549 | B1 | 10/2001 | Loftin | |
| 6,762,686 | B1 | 7/2004 | Tabe | |
| 6,831,557 | B1 | 12/2004 | Hess | |
| 6,864,789 | B2 | 3/2005 | Wolfe | |
| 6,961,707 | B2 | 11/2005 | Jenkins | |
| 7,312,704 | B1 | 12/2007 | Powell | |
| 7,315,246 | B2 | 1/2008 | Rajapakse | |
| 7,394,359 | B2 | 7/2008 | Eskildsen | |
| 7,800,496 | B2 | 9/2010 | Albert | |
| 7,961,088 | B2 | 6/2011 | Watts | |
| 8,855,311 | B1 | 10/2014 | Clement | |
| 9,576,448 | B2 | 2/2017 | Liu | |
| 9,589,441 | B2 | 3/2017 | Shapiro | |
| 9,972,146 | B1 | 5/2018 | Beard | |
| 9,984,555 | B2 | 5/2018 | Bieser | |
| 10,276,013 | B2 | 4/2019 | Lundy | |
| 10,453,149 | B1 | 10/2019 | Gaudin | |
| 10,938,294 | B1 * | 3/2021 | Chin | H04N 23/651 |
| 11,055,797 | B1 | 7/2021 | Carone | |
| 11,527,147 | B2 * | 12/2022 | Wright | G08B 25/10 |
| 2003/0098791 | A1 | 5/2003 | Carlson | |
| 2004/0119590 | A1 | 6/2004 | Wang | |
| 2004/0196182 | A1 | 10/2004 | Unnold | |
| 2004/0233055 | A1 | 11/2004 | Canich | |
| 2005/0253706 | A1 | 11/2005 | Spoltore | |
| 2006/0250235 | A1 | 11/2006 | Astrin | |
| 2007/0182543 | A1 | 8/2007 | Luo | |
| 2009/0231121 | A1 | 9/2009 | Daniel-Wayman | |
| 2009/0231334 | A1 | 9/2009 | Fitzgibon | |
| 2009/0231427 | A1 | 9/2009 | Fitzgibbon | |
| 2016/0072891 | A1 | 3/2016 | Joshi | |
| 2017/0076562 | A1 | 3/2017 | Hicks | |
| 2017/0124853 | A1 | 5/2017 | Mehta | |
| 2018/0268673 | A1 | 9/2018 | Amir | |
| 2019/0066483 | A1 | 2/2019 | Darling | |
| 2019/0171934 | A1 | 6/2019 | Sites | |
| 2021/0142650 | A1 | 5/2021 | Darling | |

OTHER PUBLICATIONS

Found at https://www.monnit.com/solutions/storage-unit-monitoring (last visited on Nov. 15, 2019).

Found at https://store.google.com/us/product/nest_secure_alarm_system (last visited on Nov. 15, 2019).

Found at https://simplisafe.com/build-my-system (last visited on Nov. 15, 2019).

* cited by examiner

DEVICES, SYSTEMS, AND METHODS FOR MONITORING CONTROLLED SPACES FOR TRANSITORY USES

PRIORITY NOTICE

The present patent application claims priority under 35 U.S.C. § 120 to U.S. nonprovisional patent application Ser. No. 16/926,041 filed on Jul. 10, 2020, the disclosure of which is incorporated herein by reference in its entirety. The present patent application is a continuation of U.S. nonprovisional patent application Ser. No. 16/926,041 filed on Jul. 10, 2020.

The present patent application claims priority under 35 U.S.C. § 120 to U.S. nonprovisional patent application Ser. No. 17/969,116 filed on Oct. 19, 2022, the disclosure of which is incorporated herein by reference in its entirety. The present patent application is a continuation of U.S. nonprovisional patent application Ser. No. 17/969,116 filed on Oct. 19, 2022.

The present patent application claims priority under 35 U.S.C. § 120 to U.S. nonprovisional patent application Ser. No. 18/332,720 filed on Jun. 10, 2023, the disclosure of which is incorporated herein by reference in its entirety. The present patent application is a continuation of U.S. nonprovisional patent application Ser. No. 18/332,720 filed on Jun. 10, 2023.

The present application claims priority under 35 U.S.C. § 119(e) to U.S. Provisional Patent Application Ser. No. 63/416,707 filed on Oct. 17, 2022, the disclosure of which is incorporated herein by reference in its entirety.

The present application claims priority under 35 U.S.C. § 119(e) to U.S. Provisional Patent Application Ser. No. 63/457,380 filed on Apr. 5, 2023, the disclosure of which is incorporated herein by reference in its entirety.

The present application claims priority under 35 U.S.C. § 119(e) to U.S. Provisional Patent Application Ser. No. 63/457,953 filed on Apr. 7, 2023, the disclosure of which is incorporated herein by reference in its entirety.

TECHNICAL FIELD OF THE INVENTION

The present invention relates in general to the monitoring of controlled spaces for transitory uses and more specifically to individual monitoring of at least one controlled space for transitory uses with at least one monitoring hardware device.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Currently (circa 2020) theft, burglary, unauthorized access, and/or losses due to other perils within and/or at controlled spaces for transitory use(s) is a serious problem. As an example, individual storage units and/or similar enclosures may be a type or a category of controlled spaces for transitory use(s). Users (e.g., the tenants/renters) of individual self-storage units rate security concerns as a major concern in selecting a given self storage facility (with self storage units) according to surveys conducted in 2019 among existing self-storage tenants and potential self-storage tenants alike. This concern remains prevalent and leaves tenants lacking true peace of mind regarding whatever it is they may be storing in their individual self-storage units. Currently there are only limited individual storage unit monitoring solutions available in the nearly 50,000 or so self-storage facilities in the United States. This problem is in part a result of privacy concerns, where for example the common regions around a given individual storage unit might be monitored by the operator of that given self-storage facility, but due to privacy concerns, the individual unit is not monitored by this same system. And this problem is in part a financial one, as the capital investment costs to purchase and use existing monitoring/security/surveillance tools and equipment may be too expensive and too time consuming to setup for a single individual storage unit.

For example, existing monitoring/security/surveillance tools/facility access control systems may include that the overall self-storage facility is gated and with a network of security cameras monitoring some of the common areas. The gated access to the self-storage facility is easily defeated by tailgating. And the network of security cameras only tend to monitor some of the common areas (often with significant blind spots) and do not monitor the interiors of the given individual storage unit. In numerous field surveys of self-storage facilities, existing security camera were often non-operational, defeated, or visibly damaged. The newest cameras tout integral video analytics, but at the time of this writing this application, storage facility operation have expressed prevalence of false motion detection triggered by animals, wind, storms, and light level changing. Further, the network of security cameras often required specialized custom installation services (including wiring/cabling) as well as traditional monitoring systems and then may require continued subscription services for monitoring of the installed network of security cameras and monitoring devices. Such a solution may be too expensive and too time consuming to setup for a given individual storage unit.

Similarly, installing electronic access controls for a given individual storage unit presently often requires significant capital investment costs along with, in some cases, monthly or annual fees that ultimately may be too expensive, too time consuming to setup, and too inflexible for use pervasively across most individual storage units.

There is a need in the art for an electronic device, with monitoring sensors, that may be readily, easily, and quickly installed (e.g., retrofittable placement almost anywhere in and/or on the given controlled space) to offer on-demand monitoring services (e.g., service enabled/disabled only when needed) by the facility owner/operator (and/or by the tenant themselves) for use (e.g., by subscription but not necessarily with any capital investment requirements) by the controlled space tenant to monitor a given controlled unit's interior space(s) and/or asset(s); and wherein such a system and/or method may provide details, information, alerts, reminders, notices, notifications, alarms, and/or the like to various authorized stakeholders, such as the tenant/renter, the facility operator, the provider of the electronic device, the provider of the monitoring service/subscription, and/or third-parties (e.g., tenant's own back-up contacts, insurance companies, first responders, maintenance staff, and/or law enforcement).

It is to these ends that the present invention has been developed.

BRIEF SUMMARY OF THE INVENTION

To minimize the limitations in the prior art, and to minimize other limitations that will be apparent upon reading and understanding the present specification, the present invention describes various embodiments, of: monitoring-devices (with sensor(s) and with radio(s)), systems using such monitoring-devices, methods using such monitoring-devices, proprietary software (i.e., a set of instructions, that may be referred to herein as "NINCE" for "Network Intelligent Notification & Configuration Engine") that may be residing in memory of at least one server for interacting with the monitoring-devices and with computing-devices associated with the authorized stakeholders, combinations thereof, and/or the like. In some embodiments, the monitoring-devices may be electronic, battery powered devices, with various monitoring sensors and capable of wireless communications (e.g., low power wireless, cellular, NFC, etc.). Installation of the monitoring-device may not require any wiring/cabling. These monitoring-devices may be installed in and/or on a given controlled space (e.g., a storage unit) to monitor that given controlled space and to communicate motion, activity, events, environmental conditions, occurrences, combinations thereof, and/or the like within that given controlled space to various authorized stakeholders, such as, but not limited to, the tenant/renter of the given controlled space, the facility operator (e.g., storage facility manager) of the given controlled space, the provider of the electronic monitoring-device, the provider of the monitoring service/subscription, third-parties (such as, but not limited to, insurance companies and/or first responders), combinations thereof, and/or the like. The monitoring-device may provide details, information, alerts, reminders, notices, notifications, alarms, and/or the like to various authorized stakeholders of the motion, activity, events, and/or occurrences within/at that given controlled space.

A novel use of the collective inventions and embodiments disclosed herein may apply to controlled use spaces (i.e., "controlled spaces"). In some embodiments, a given controlled space may be one or more of a space, a zone, an area, a room, an enclosure, a yard, a facility, and/or a property; wherein the one or more of the space, the zone, the area, the room, the enclosure, the yard, the facility, and/or the property may have a predetermined limit and/or boundary (e.g., by some physical structure [such as, but not limited, a wall, a door, a window, a floor, a ground, a ceiling, a roof, a substrate, combinations thereof, and/or the like]), such that the given controlled space may be a defined space. In some embodiments, a given controlled space may be notably transitory in how the controlled space may be used. In some embodiments, a given controlled space may be a temporarily utilized space for personal, business, and/or commercial use. In some embodiments, users of controlled spaces may generally use the controlled space for the storage of assets, operation of assets, and/or as a location for a tenant and/or a resident. In some embodiments, the controlled space for transitory use may be of either fixed, stationary, or moveable nature. In some embodiments, those controlled spaces which may most notably value the novel use of this invention and/or some of its embodiments, may most often be associated with higher turnover in "space occupiers" who may generally place, store, and/or operate assets of highly perceived personal and/or commercial value and/or reside in said defined location (controlled space) but are not generally the owners of the given controlled space. In some embodiments, the controlled spaces may generally be occupied "temporarily" by individuals and/or business clients, such as, but not limited to, tenants/renters (e.g., in self-storage units, apartment units, or the like), lessees (e.g., in warehouses), guests/patrons/campers (e.g., in hotels, vacation rentals, campgrounds, RV parks, or the like) for either a fixed term (e.g., an annual lease) or an indefinite term (e.g., day to day, week to week, month to month, or the like) but where the occupier (e.g., main user) may often not be the owner (nor the operator) of the given controlled space. In some embodiments, the controlled space with transitory use(s) may often be remotely located, moveable, or mobile; and often may lack ready access to electrical power for operating electronic equipment (such as monitoring equipment) and/or may lack ready access to a local network and/or the Internet. Some examples of such controlled spaces may include self-storage units, utility trailers, moveable storage containers, combinations thereof, and/or the like.

Some embodiments of the present invention may involve monitoring-devices (e.g., with at least one sensor, with at least one radio, and with at least one power source), systems, and/or methods for monitoring said controlled space(s) for transitory use(s) and/or asset(s). In some embodiments, one or more monitoring-devices may be used to monitor a given controlled space for transitory use and/or assets. In some embodiments, a given controlled space may be selected from one or more of the following: an interior space; an interior zone; enclosed spaces; a room of a building; rooms; marine vessels (e.g., vessels, boats, ships, house boats, and the like); RVs (e.g., recreational vehicles, campers, motor homes, fifth wheels, and the like); equipment used with camping (e.g., tents, campsites, and the like); equipment used in moving (e.g., moving boxes, moving trucks, moving vehicles, and the like); pods (e.g., storage pods); trailers; vacant homes; vacant buildings; locked buildings; hotel rooms; construction sites, construction yards; kennels; stables; animal stalls; rentals (e.g., residential, commercial, and the like); vacation rentals; cabins; warehouses; fleets; apartments, AirBNB rental properties; car rentals; vehicle rentals; schools; waste totes; cargo containers; aircraft; luggage; trash containers; fields; yards; lots; parking lots and/or parking spots; combinations thereof, portions thereof, and/or the like.

It should be noted, that in some embodiments, the controlled spaces for transitory uses may be nested. For example, and without limiting the scope of the present invention a self-storage facility may be itself a controlled space for transitory use which may be monitored, while its individual storage units inside the same self-storage facility may also be controlled spaces for transitory use, that may also be monitored.

When considering the above, conventional (preexisting) monitoring/security systems fall short in monitoring such controlled spaces for transitory uses as such conventional systems most often require the owner/operator of the controlled space to commit significant capital expenditures towards the installing of the conventional monitoring equipment in often a plurality of controlled spaces (e.g., which may require hiring professional/licensed installers/contractors, obtaining governmental permits, buying the installation materials, buying/renting the conventional monitoring equipment, combinations thereof, and/or the like). Such conventional monitoring equipment are most often installed permanently (i.e., rendering them immovable and a fixture of the given controlled space). Even with careful planning, consideration, and foreknowledge, the owner/operators face space utilization demand profiles that are often volatile (including but not limited to, demands that vary significantly with the seasons), thus leaving a given controlled space unutilized and/or leaving such installed monitoring equipment being unutilized. Further, a tenant/renter may damage and/or harm such installed conventional monitoring equipment. The above noted controlled spaces and their uses often lack access to: stable electrical power (e.g., no or limited local AC electrical power [i.e., no or limited grid supplied electrical power]), to network connections, and/or to the Internet. Thus, using conventional monitoring equipment may require yet additional infrastructure investment by the owner/operator for when the owner/operator installs such conventional monitoring equipment, as that installation may also require running electrical power to the conventional monitoring equipment, and/or setting up network connections with the conventional monitoring equipment. Any one of these costs attributes or additionally the combination of multiple of these cost attributes with respect to installing the conventional monitoring equipment in controlled spaces, applies negative pressure on the return on investment (ROI) for such capital expenditures; which may result in too little ROI or no ROI to justify the capital expenditures by the owner/operator. Equivalently, when the owner/operators do not offer controlled space monitoring services, a personal or business occupier (e.g., a tenant) still might desire or even require the added visibility, assurance, awareness, and/or peace-of-mind only made possible by monitoring the given controlled space(s). Clearly, the occupier (i.e., the tenant) may not desire to invest their own capital for the benefit of the facility not owned by said occupier, especially for shorter duration transitory occupiers. Or some occupiers may simply not have the funds necessary for installing conventional monitoring equipment.

Some embodiments of the present invention may provide an on-demand ad hoc monitoring service of a given controlled space for transitory use. In an analogous manner, enterprise owners and operators are increasingly choosing to avoid capital expenditures and operating expenses associated with purchasing and maintaining their own data centers. Instead, enterprise owners and operators are turning to using cloud services as they provide pay-on-demand, scalable, and flexible computing and storage resources. Such an on-demand computing and storage data service model efficiently matches real time (or near real time) demand with right-sized enterprise resources while avoiding needlessly tying up capital in under-utilized assets (i.e., servers, networking equipment, storage devices, etc.). In some embodiments, the controlled space monitoring systems and/or methods described herein provide novel, on-demand, flexible, and scalable monitoring of controlled spaces (as controlled spaces have been defined herein) architected in a similar manner and business model.

It is an objective of the present invention to provide a monitoring-device, system for, and method for monitoring an individual storage unit using at least one such monitoring-device.

It is another objective of the present invention to provide enhanced visibility, monitored space environmental awareness, monitored space operational awareness, and/or peace of mind to tenants/renters of controlled spaces (e.g., self-storage units) by use of electronic monitoring-devices (with sensor(s)) and a Human Interface System (HIS).

It is another objective of the present invention to provide a system for, and/or a method for monitoring an individual (at least one) controlled space (e.g., a storage unit) using at least one monitoring-device, that utilizes wireless communications (such as, but not limited to, WiFi, RFID, BT, 802.15, ZigBee, LP-WAN, LoRa, cellular, NFC, combinations thereof, and/or the like) so as to avoid a wired/cabled installation.

It is another objective of the present invention to provide a system for, and/or a method for monitoring an individual (at least one) controlled space (e.g., a storage unit) using at least one monitoring-device that may be: simple, easy, fast, and inexpensive to setup, install, operate, maintain, remove and redeploy as compared to and unlike prior art conventional monitoring/security solutions.

It is another objective of the present invention to provide a system for, and/or a method for monitoring an individual (at least one) controlled space (e.g., a storage unit) using at least one monitoring-device that may generate minimal false alarms.

It is another objective of the present invention to provide a system for, and/or a method for monitoring an individual (at least one) controlled space (e.g., a storage unit) using at least one monitoring-device that may generate minimal false alarms by use of machine learning and/or algorithms.

It is another objective of the present invention to provide a system for, and/or a method for monitoring an individual (at least one) controlled space (e.g., a storage unit) using at least one monitoring-device that may be easy for a user to interface with.

It is another objective of the present invention to provide a system for, and/or a method for monitoring an individual (at least one) controlled space (e.g., a storage unit) using at least one monitoring-device that may use a variety of user interfaces, such as, but not limited to, web-based interfaces (i.e., browser based interfaces), sms messaging (or text messaging) interfaces, mobile app based interfaces, phone call based interfaces, combinations thereof, and/or the like.

It is another objective of the present invention to provide a system for, and/or a method for monitoring an individual (at least one) controlled space (e.g., a storage unit) using at least one monitoring-device that generates historical logs of activity, events, operational data, sensor data, environmental conditions, occurrences, combinations thereof, and/or the like of the controlled space being monitored with the at least one monitoring-device.

It is another objective of the present invention to provide a system for, and/or a method for monitoring an individual (at least one) controlled space (e.g., a storage unit) using at least one monitoring-device that maintains (e.g., as an accessible database) historical logs of activity, events, operational data, sensor data, environmental conditions, occurrences, combinations thereof, and/or the like of the controlled space being monitored with the at least one monitoring-device.

It is yet another objective of the present invention to provide a system for, and/or a method for monitoring an individual (at least one) controlled space (e.g., a storage unit) using at least one monitoring-device that further provides authorized interested parties/authorized stakeholders with either more efficient access to valuable information (or actionable insights) or first time visibility to previously unavailable information, such as automated/semi-automated access to historical logs of the controlled space activity, events, operational data, sensor data, environmental conditions, occurrences of the controlled space being monitored with the at least one monitoring-device.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

REFERENCE NUMERAL SCHEDULE

Figure 1:
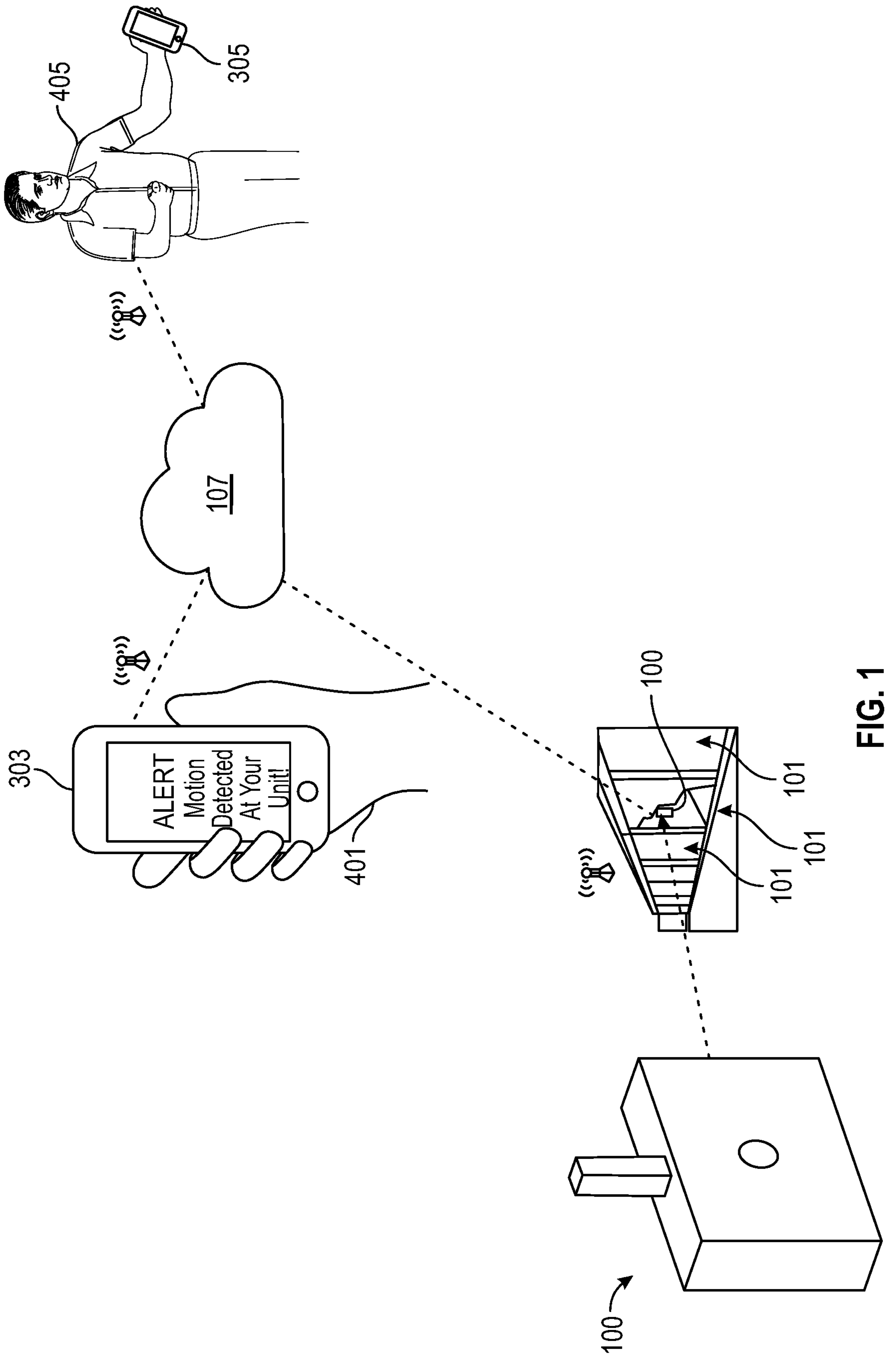
FIG. 1 may depict a system for remotely monitoring a given storage unit using at least one monitoring-device installed within that given storage unit.

100 monitoring-device 100
101 storage unit (storage space) 101
107 network/cloud 107
201 enclosure 201
203 mounting-hole 203
205 UX output 205
207 communication port 207
209 sensor port 209
211 external antenna 211
213 mounting magnet 213
215 adhesive layer 215
217 mechanical fastener 217
**217*a* mechanical fastener 217*a***
**217*b* mechanical fastener 217*b***
303 tenant device 303
305 facility operator device 305
307 cloud 307
309 provider device 309
311 third-party device 311
321 communication pathway 321
323 communication pathway 323
325 communication pathway 325
327 communication pathway 327
329 communication pathway 329
331 communication pathway 331
333 communication pathway 333
341 gateway (hub) 341
343 audible indicator 343
345 storage facility 345
351 communication pathway 351
353 communication pathway 353
361 gateway 361
363 connection 363
365 internet 365
367 Network Intelligent Notification & Configuration Engine (NINCE) 367

371 cellular connection 371
373 computing-device 373
375 control transmission 375
377 control transmission 377
379 data transmission 379
381 data transmission 381
383 control transmission 383
385 data transmission 385
400 Human Interface System (HIS) 400
401 Tenant 401
403 Tenant N+1 403
405 Facility Operator (storage facility worker) 405
407 hierarchy relationship 407
409 hierarchy relationship 409
411 hierarchy relationship 411
415 interface to tenant device 415
417 interface to facility operator device 417
501 processor 501
503 memory 503 (storage 503)
505 sensors 505
**505*a* primary sensor 505*a***
**505*b* secondary sensor 505*b***
507 communications 507
**507*a* primary radio 507*a***
**507*b* secondary radio 507*b***
509 inputs/outputs (I/O) means 509
511 power source 511
513 daughter board 513
515 integral mounting hardware 515
517 magnetic shielding 517
600 method for establishing messaging based storage unit monitoring 600
601 step of establishing ad hoc wireless network at storage facility 601
603 step of putting a storage unit into use 603
605 step of establishing subscription with end-user 605
607 step of NINCE establishing wireless connection with monitoring-device 607
609 step of mounting monitoring-device within storage unit 609
611 step of monitoring storage unit with monitoring-device 611
613 step of terminating subscription with end-user 613
615 step of restricting access of end-user with terminated subscription 615
617 step of removing monitoring-device from storage unit 617
620 method for establishing messaging based storage unit monitoring 620
700 method of establishing messaging based service insurance 700
705 step of establishing insurance policy 705
707 step of NINCE establishing connections 707
709 step of transmitting subscriber information 709
711 step of initiating insurance policy coverage period 711
713 step of determination of insurance claim 713
715 step of if claim approved, paying out 715
717 step of monitoring storage unit with monitoring-device 717
719 peril/loss occurs 719
721 step of detecting peril/loss 721
723 step of validating peril/loss occurred 723
725 step of gathering information 725
727 step of transmitting insurance claim 727
741 vehicle 741
751 equipment/tool 751
761 thief 761
771 insurance company 771
801 cellular network 801
803 low power wireless connection/communication 803
805 wireless connection/communication 805
809 GPS module 809

DETAILED DESCRIPTION OF THE INVENTION

In some embodiments, a given controlled space (for transitory use) may be one or more of a space, a zone, an area, a room, an enclosure, a yard, a facility, and/or a property; wherein the one or more of the space, the zone, the area, the room, the enclosure, the yard, the facility, and/or the property may have a predetermined limit and/or boundary (e.g., by some physical structure [such as, but not limited, a wall, a door, a window, a floor, a ground, a ceiling, a roof, a substrate, combinations thereof, and/or the like]), such that the given controlled space may be a defined space. In some embodiments, a given controlled space may be notably transitory in how the controlled space may be used. In some embodiments, a given controlled space may be a temporarily utilized space for personal, business, and/or commercial use. In some embodiments, users of controlled spaces may generally use the controlled space for the storage of assets, operation of assets, and/or as a location for a tenant and/or a resident. In some embodiments, the controlled space for transitory use may be of either fixed, stationary, or moveable nature. In some embodiments, those controlled spaces which may most notably value the novel use of this invention and/or some of its embodiments, may most often be associated with higher turnover in "space occupiers" who may generally place, store, and/or operate assets of highly perceived personal and/or commercial value and/or reside in said defined location (controlled space) but are not generally the owners of the given controlled space. In some embodiments, the controlled spaces may generally be occupied "temporarily" by individuals and/or business clients, such as, but not limited to, tenants/renters (e.g., in self-storage units, apartment units, or the like), lessees (e.g., in warehouses), guests/patrons/campers (e.g., in hotels, vacation rentals, campgrounds, RV parks, or the like) for either a fixed term (e.g., an annual lease) or an indefinite term (e.g., day to day, week to week, month to month, or the like) but where the occupier (e.g., main user) may often not be the owner (nor the operator) of the given controlled space. In some embodiments, the controlled space with transitory use(s) may often be remotely located, moveable, or mobile; and often may lack ready access to electrical power for operating electronic equipment (such as monitoring equipment) and/or may lack ready access to a local network and/or the Internet. Some examples of such controlled spaces may include self-storage units, utility trailers, moveable storage containers, combinations thereof, and/or the like.

Some embodiments of the present invention may involve monitoring-devices (e.g., with at least one sensor, with at least one radio, and with at least one power source), systems, and/or methods for monitoring said controlled space(s) for transitory use(s) and/or asset(s). In some embodiments, one or more monitoring-devices may be used to monitor a given controlled space for transitory use and/or assets. In some embodiments, a given controlled space may be selected from one or more of the following: an interior space; an interior zone; enclosed spaces; a room of a building; rooms; marine vessels (e.g., vessels, boats, ships, house boats, and the like); RVs (e.g., recreational vehicles, campers, motor homes, fifth wheels, and the like); equipment used with camping (e.g., tents, campsites, and the like); equipment used in moving (e.g., moving boxes, moving trucks, moving vehicles, and the like); pods (e.g., storage pods); trailers; vacant homes; vacant buildings; locked buildings; hotel rooms; construction sites, construction yards; kennels; stables; animal stalls; rentals (e.g., residential, commercial, and the like); vacation rentals; cabins; warehouses; fleets; apartments, AirBNB rental properties; car rentals; vehicle rentals; schools; waste totes; cargo containers; aircraft; luggage; trash containers; fields; yards; lots; parking lots and/or parking spots; combinations thereof, portions thereof, and/or the like.

In at least some of the following descriptions and/or examples, monitoring of one particular type/category of controlled spaces (for transitory uses) may be shown, discussed and described, wherein the one type/category of controlled space may be at least one self-storage unit. However, it should be noted that such self-storage unit monitoring as shown, discussed and described herein, may readily be applied to the other noted types of controlled spaces.

The terms "storage," "storage space," "self-storage," "self-storage unit," "storage unit," "individual storage units," combinations thereof, and/or the like may be used interchangeably herein; and such terms may be a type/category of controlled space (for transitory use).

The term "tenant" as used herein may represent a tenant, a renter, a lessee, a client, a customer, a guest, a patron, or the like of a given controlled space (for transitory use). In some embodiments, the tenant may be the one who predominantly uses a given controlled space (for transitory use) but who does not own the given controlled space (for transitory use).

The term "owner" may be an entity that owns a given controlled space (for transitory use). The owner may not be an operator of the given controlled space (for transitory use).

The terms "operator," "facility operator," and/or the like may refer to a business and/or its staff, a business and/or its agents, a worker, personnel, staff, manager, property manager, warehouse managers, facility manager, landlord, site manager, facility worker, maintenance worker, or the like who may work to operate and/or maintain a given controlled space (for transitory use). The terms "operator," "facility operator," and/or the like may be used interchangeably herein.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 may show a tenant 401 of a storage unit 101 monitoring that storage unit 101 while the tenant 401 may be located away from that storage unit 101 (i.e., tenant 401/may be remotely located with respect to storage unit 101). FIG. 1 may show a storage facility worker 405 (facility operator 405) monitoring that storage unit 101 while facility operator 405 may be located away from that storage unit 101. In FIG. 1, a monitoring-device 100 may be used to monitor storage unit 101. In some embodiments, monitoring-device 100 may be mounted/installed within storage unit 101. In some embodiments, monitoring-device 100 may be removably mounted within storage unit 101. In some embodiments, monitoring-device 100 may comprise one or more electronics. In some embodiments, monitoring-device 100 may comprise one or more electronic hardware elements/members. In some embodiments, monitoring-device 100 may comprise one or more sensors for monitoring storage unit 101. In some embodiments, monitoring-device 100 may comprise one or more means for wireless communications (e.g., radios and/or antennas). In some embodiments, monitoring-device 100 may comprise one or more means for low power wireless communications (e.g., specifically configured radios and/or antennas). In some embodiments, monitoring-device 100 may be in (wireless) communication with one or more computing-devices 373, such as, but not limited to, computing-devices 373 used by tenant 401 (e.g., a tenant device 303), facility operator 405 (e.g., a facility operator device 305), combinations thereof, and/or the like. In some embodiments, monitoring-device 100 may be in (wireless) communication with tenant 401 specified back-up contacts. In some embodiments, wireless communications between monitoring-device 100 and computing-devices 373 used by tenant 401/owner 401, worker 405, combinations thereof, and/or the like, may use and/or may communicate through at least a portion of a network/cloud 107.

In some embodiments, storage space 101 may have one or more monitoring-devices 100. In some embodiments, one or more monitoring-devices 100 may be located in, next to, adjacent to, and/or proximate to a given storage space 101 that is intended to be monitored. In some embodiments, one or more monitoring-devices 100 may be located on any internal facing surface of storage space 101, such as, but not limited to, walls, ceiling, windows, and/or doors of storage space 101. In some embodiments, one or more monitoring-devices 100 may be mounted on any internal facing surface of storage space 101, such as, but not limited to, walls, ceiling, windows, and/or doors of storage space 101. In some embodiments, one or more monitoring-devices 100 may be removably mounted on any internal facing surface of storage space 101, such as, but not limited to, walls, ceiling, windows, and/or doors of storage space 101.

In some embodiments, a given storage space 101 may be an individual storage unit and/or may be a self-storage unit. In some embodiments, a given storage space 101 may be a single room, typically with a single access door but in other cases, one or more doors may exist in multiple sides/walls of storage space 101. In some embodiments, such a room may have fixed and predetermined dimensions. For example, and without limiting the scope of the present invention, such a room have a footprint of: 5 feet by 5 feet; 5 feet by 10 feet; 5 feet by 15 feet; 5 by 20 feet; 7.5 feet by 10 feet; 10 feet by 10 feet; 10 feet by 15 feet; 10 feet by 20 feet; 10 feet by 25 feet; 10 feet by 30 feet; and the like. Other dimensions and space configurations are contemplated as well.

In some embodiments, a given storage space 101 may have environmental controls, such as, for controlling temperature, humidity, air pressure, combinations thereof, and/or the like within the given storage space 101.

A room with defined boundaries may be a storage space 101. A storage unit with defined boundaries may be a storage space 101. A room that may be substantially enclosed may be a storage space 101. A storage unit that may be substantially enclosed may be a storage space 101. In some embodiments, storage space 101 may be an interior space fully (or substantially) enclosed with walls and a ceiling. In some embodiments, storage space 101 may be open to an exterior, but may have floor space/ground/water space allocated with one or more open sides and an optional roof.

In some embodiments, a given storage space 101 may be selected from: an individual storage unit; a self-storage unit; a storage area of a moving truck; a storage area of a mobile moving pod; a (predetermined) section of warehouse; an interior of a room; an interior of a hotel room; an interior of an Airbnb room; an interior of a RV; an interior of a camper; an interior of a tent; an interior of box truck; an interior of a utility truck; an interior of a shipping cargo container; and/or the like.

In some embodiments, an exterior and/or an interior of a given storage space 101 may have warning signage denoting that the given storage space 101 may be under electronic monitoring and/or under electronic surveillance, and/or the like. In some embodiments, the given storage space 101 and/or the one or more monitoring-devices 100 that may be monitoring that given storage space 101, may be electrically powered by one or more energy harvesting sources, such as, but not limited to, solar power, wind power, and/or the like.

In some embodiments, a given monitoring-device 100 may successfully monitor a single ingress point of a given storage space 101 and/or an area of about 15 feet by 30 feet, plus or minus a foot. For a given storage space 101 that may be larger than this and/or with multiple ingress points, more than one monitoring-devices 100 may be required and/or desired.

Figure 2A:
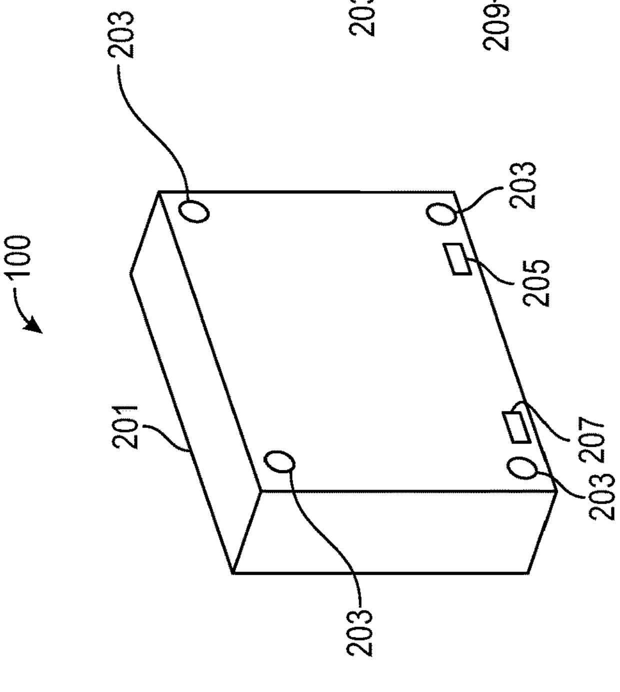
FIG. 2A may depict a perspective view of a monitoring-device.

FIG. 2A may show a perspective view of a monitoring-device 100. In some embodiments, monitoring-device 100 may comprise an enclosure 201. In some embodiments, at least one monitoring-device 100 may comprise enclosure 201 and electronics, wherein at least some of the electronics may be located within (or at least partially) enclosure 201. In some embodiments, at least one sensor 505 and the least one radio 507 may both be components of the electronics. In some embodiments, enclosure 201 may house at least some of the electronics of monitoring-device 100. In some embodiments, at least some of the electronics of monitoring-device 100 may be substantially enclosed within enclosure 201. In some embodiments, enclosure 201 may be rated (e.g., by NEMA, UL, combinations thereof, and/or the like) for use with electronics in outdoor environments, indoor environments, wet environments, humid environments, marine environments, cold environments, hot environments, dry environments, combinations thereof, and/or the like. In some embodiments, enclosure 201 may be rated to be substantially weatherproof, fire proof, leak proof, combinations thereof, and/or the like.

Continuing discussing FIG. 2A, in some embodiments, monitoring-device 100 may comprise one or more mounting-holes 203. In some embodiments, a given mounting-hole 203 may be located on an exterior surface of enclosure 201. In some embodiments, a given corner of enclosure 201 may have a mounting-hole 203. In some embodiments, a given mounting-hole 203 may be configured to receive at least a portion of a threaded screw and/or bolt. In some embodiments, a given mounting-hole 203 may be female threaded. In some embodiments, a given mounting-hole 203 may pass entirely through enclosure 201. In some embodiments, mounting-hole(s) 203, along with the screw/bolt, may be used to attach (mount) monitoring-device 100 to some substrate (such as, but not limited to, a floor, a wall, a ceiling, a door, a window, a frame, combinations thereof, and/or the like, of storage unit 101). Note, in some embodiments, monitoring-device 100 may have no mounting-holes 203; or mounting-holes 203 may not be used.

Continuing discussing FIG. 2A, in some embodiments, monitoring-device 100 may comprise one or more UX (user experience) outputs 205. In some embodiments, a given UX output 205 may be configured to convey information of that monitoring-device 100 to a person who is locally proximate (e.g., in visible range and/or in audible range) to that monitoring-device 100. In some embodiments, a given UX output 205 may be selected from a light source, a light emitter, a display, a light maker, an audible source, a sound maker, a speaker, a buzzer, an alarm, a bell, a whistle, combinations thereof, and/or the like. In some embodiments, the light source, the light emitter, and/or the light maker of a given UX output 205 may be one or more LEDs (light emitting diodes). In some embodiments, when the given UX output 205 may be the light source, the light emitter, and/or the light maker, then that given UX output 205 may be exteriorly visible from enclosure 201. In some embodiments, when the given UX output 205 may be the light source, the light emitter, and/or the light maker, then that given UX output 205 may be located on an exterior of enclosure 201. In some embodiments, when the given UX output 205 may be the audible source, the sound maker, the speaker, the buzzer, the alarm, the bell, and/or the whistle, then that given UX output 205 may be located within enclosure 201. Note, in some embodiments, UX output 205 may a sub-type (sub-category) of I/O (input-output) means 509, wherein I/O means 509 may be discussed below in the FIG. 5A discussion.

Continuing discussing FIG. 2A, in some embodiments, monitoring-device 100 may comprise one or more communications ports 207. In some embodiments, a given communication port 207 may be configured to receive a plug and/or a connector, which may in turn be wired to a power source and/or to a computing device. In some embodiments, a given communication port 207 may be used to receive electrical power (e.g., for recharging a battery of monitoring-device 100). In some embodiments, a given communication port 207 may be used to receive instructions/inputs from the computing device (e.g., for a firmware update and/or for diagnosis purposes). In some embodiments, a given communication port 207 may be used to transmit information back to the computing device (such as, but not limited to, data and/or status information). In some embodiments, the one or more communication ports 207 may be sized, shaped, and configured as an industry standard communication/power port, such as, but not limited to, USB, micro USB, lightning, combinations thereof, and/or the like. In some embodiments, a given communication port 207 may be of proprietary size and/or shape. In some embodiments, a given communication port 207 may be accessible from an exterior of enclosure 201. In some embodiments, a given communication port 207 may be located on an exterior of enclosure 201. Note, in some embodiments, monitoring-device 100 may not comprise a communication port 207. Note, in some embodiments, communication port 207 may a sub-type (sub-category) of communications 507, wherein communications 507 may be discussed below in the FIG. 5A discussion.

Figure 2B:
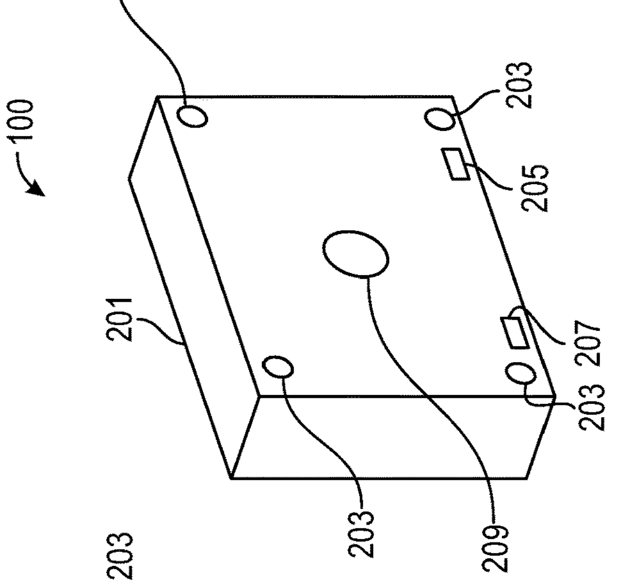
FIG. 2B may depict a perspective view of a monitoring-device with at least one sensor port.

FIG. 2B may show a perspective view of a monitoring-device 100. Monitoring-device 100 of FIG. 2B may differ from monitoring-device 100 of FIG. 2A, by inclusion of at least one sensor port 209. That is, the monitoring-device 100 of FIG. 2A may be without any sensor ports 209; whereas, the monitoring-device 100 of FIG. 2B may be with at least one sensor port 209. Otherwise, the monitoring-device 100 of FIG. 2A and the monitoring-device 100 of FIG. 2B may be substantially the same.

Continuing discussing FIG. 2B, in some embodiments, monitoring-device 100 may comprise at least one sensor port 209. In some embodiments, monitoring-device 100 may comprise one or more sensor ports 209. In some embodiments, a given sensor port 209 may be an opening, a break, a window, a lens, combinations thereof, and/or the like, in enclosure 201, allowing a given sensor to sense/capture information outside of that monitoring-device 100. In some embodiments, a given sensor of monitoring-device 100 may be coupled to a given sensor port 209. Some sensor types (such as, but not limited to, PIR motion detectors, cameras, combinations thereof, and/or the like) may benefit or require views/information that are exterior to the given monitoring-device 100; whereas, other sensor types (such as, but not limited to, accelerometers, vibration detectors, inertia detectors, positional detectors, water, humidity, temperature, acoustic, combinations thereof, and/or the like) may not need any such sensor port 209 and may function properly while entirely located within enclosure 201.

Figure 2C:
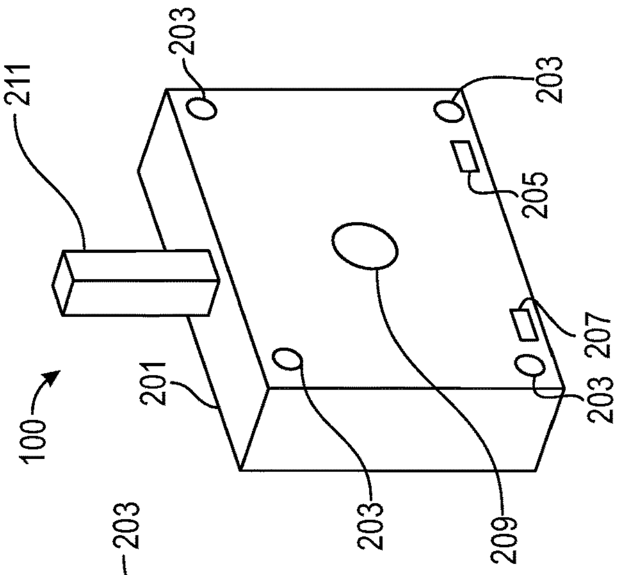
FIG. 2C may depict a perspective view of a monitoring-device with at least one partially extended or extendable antenna.

FIG. 2C may show a perspective view of a monitoring-device 100. Monitoring-device 100 of FIG. 2C may differ from monitoring-device 100 of FIG. 2B, by inclusion of at least one external antenna 211. That is, the monitoring-device 100 of FIG. 2B may be without any external antennas 211; whereas, the monitoring-device 100 of FIG. 2C may be with at least one external antenna 211. Otherwise, the monitoring-device 100 of FIG. 2B and the monitoring-device 100 of FIG. 2C may be substantially the same.

Figure 2F:
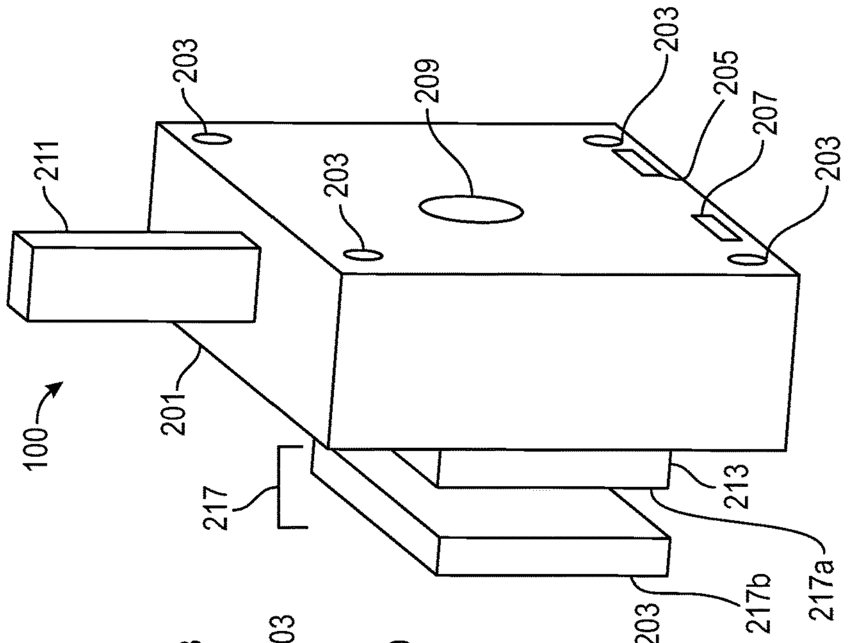
FIG. 2F may depict a perspective view of a monitoring-device with a specific type of integral mounting hardware (e.g., plurality of hooks and plurality of complimentary loops).

Note, monitoring-devices 100 of FIG. 1, FIG. 2A through and including FIG. 2F, may all comprise at least one internal antenna, that is located at least substantially (or totally) within enclosure 201.

Continuing discussing FIG. 2C, in some embodiments, monitoring-device 100 may comprise at least one external antenna 211. In some embodiments, monitoring-device 100 may comprise one or more external antennas 211. In some embodiments, a given external antenna 211 may be operatively linked to radio electronic hardware of that monitoring-device 100. In some embodiments, a given external antenna 211 may be configured for wireless communications. In some embodiments, a given external antenna 211 may be configured for radio frequency communication. In some embodiments, a given external antenna 211 may be configured to both receive and to transmit information. In some embodiments, a given external antenna 211 may be configured for cellular wireless communications.

Note, in some embodiments, external antenna 211 may a sub-type (sub-category) of communications 507, of primary radio **507*a* and/or of secondary radio 507*b*; wherein communications 507 may be discussed below in the FIG. 5A discussion; and wherein primary radio 507*a* and secondary radio 507*b* may discussed below in FIG. 5**B.

Figure 2E:
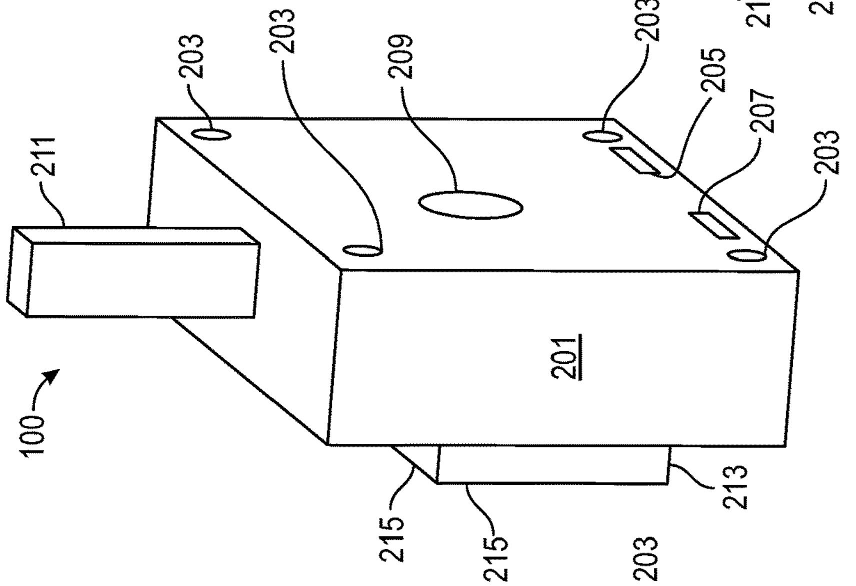
FIG. 2E may depict a perspective view of a monitoring-device with a specific type of integral mounting hardware (e.g., at least one adhesive layer).
Figure 2D:
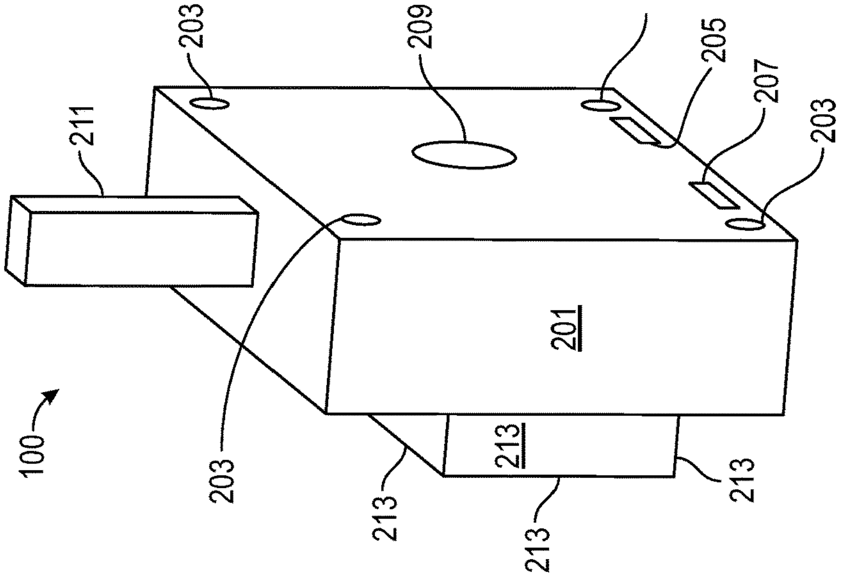
FIG. 2D may depict a perspective view of a monitoring-device with a specific type of integral mounting hardware (e.g., at least one magnet).

FIG. 2D may show a perspective view of a monitoring-device 100. In some embodiments, a given monitoring-device 100 may comprise at least one mounting magnet 213. In some embodiments, a given monitoring-device 100 may comprise one or more mounting magnets 213. In some embodiments, located on an exterior of enclosure 201 may be at least one mounting magnet 213. In some embodiments, located on an exterior of monitoring-device 100 may be at least one mounting magnet 213. In some embodiments, at least one magnet 213 may be located on or proximate (e.g., within a quarter inch) to an exterior surface of enclosure 201. In some embodiments, at least one magnet 213 may be located on or proximate (e.g., within a quarter inch) to an exterior surface of monitoring-device 100. In some embodiments, at least one magnet may be attached to exterior of enclosure 201 and/or to an exterior of monitoring-device 100. In some embodiments, mounting magnet 213 may be used to removably attach a given monitoring-device 100 easily, quickly, and without any tools, to a ferrous containing substrate (such as, but not limited to, a floor, a wall, a ceiling, a door, a window, a frame, combinations thereof, and/or the like), which are highly prevalent in storage units 101. In some embodiments, inside of enclosure 201 may be shielding to minimize mounting magnet 213 from interacting with electronics of that monitoring-device 100. In some embodiments, mounting magnet 213 may be spaced apart sufficiently on the exterior of enclosure 201 from electronics of that monitoring-device 100 to avoid mounting magnet 213 interacting with those electronics. In some embodiments, enclosure 201 may also be built of a molded magnetic composite material to reduce the need for distinct materials and reduce assembly costs.

FIG. 2E may show a perspective view of a monitoring-device 100. In some embodiments, a given monitoring-device 100 may comprise at least one adhesive layer 215. In some embodiments, a given monitoring-device 100 may comprise one or more adhesive layers 215. In some embodiments, located on an exterior of enclosure 201 may be at least one adhesive layer 215. In some embodiments, at least one adhesive layer 215 may be located on an exterior of at least one monitoring-device 100; at least one adhesive layer 215 may be located on an exterior of enclosure 201; at least one adhesive layer 215 may be located on an exterior of at least one magnet 213; and/or combinations thereof, and/or the like. In some embodiments, adhesive layer 215 may be used to attach a given monitoring-device 100 to a substrate (such as, but not limited to, a floor, a wall, a ceiling, a door, a window, a frame, combinations thereof, and/or the like) in storage unit 101. In some embodiments, before using adhesive layer 215, a protective backing may be peeled off of and away from adhesive layer 215, revealing a tacky surface of adhesive layer 215, and then adhesive layer 215 may be adhered to a substrate in storage unit 101.

Continuing discussing FIG. 2D, in some embodiments, adhesive layer 215 may at least partially cover over the exterior of mounting magnet 213. In such embodiments, if the storage unit 101 has a ferrous containing substrate (in a desired location), the protective backing may be left on adhesive layer 215 and the mounting magnet 213 may be used to removably attach that monitoring-device 100 to that ferrous containing substrate. Or in such embodiments, if that storage unit 101 has no such ferrous containing substrates (or are in undesired locations), then the protective backing may be peeled off of and away from adhesive layer 215, and then the revealed tacky adhesive layer 215 may be used to adhere (attach) that monitoring-device 100 to a substrate within that storage unit 101.

FIG. 2F may show a perspective view of a monitoring-device 100. In some embodiments, a given monitoring-device 100 may comprise at least one mechanical fastener 217. In some embodiments, a given monitoring-device 100 may comprise one or more mechanical fasteners 217. In some embodiments, mechanical fastener 217 may be a Velcro (or a Velcro like) fastener. In some embodiments, mechanical fastener 217 may be comprised of mechanical fastener **217*a* and mechanical fastener 217*b*. In some embodiments, located on an exterior of enclosure 201 may be at least one mechanical fastener 217*a*. In some embodiments, at least one layer of the plurality of loops 217*a* or the at least one layer of the plurality of hooks 217*b* may be located on an exterior of the at least one monitoring-device 100. In some embodiments, mechanical fastener 217*a* may be half of a Velcro (or of a Velcro like) fastener, i.e., mechanical fastener 217*a* may be a plurality of hooks or a plurality of loops. When mechanical fastener 217*a* may be plurality of hooks, then mechanical fastener 217***a* may be removably attached to a complimentary layer of mechanical fastener 217*b*, which may be plurality of loops. Or vice versa, i.e., when mechanical fastener 217*a* may be plurality of loops, then mechanical fastener 217*a* may be removably attached to a complimentary layer of mechanical fastener 217*b*, which may be plurality of hooks. In some embodiments, the complimentary layer of mechanical fastener 217*b* may be adhered (via an adhesive backing) to a surface of a substrate in storage unit 101.

Figure 3A:
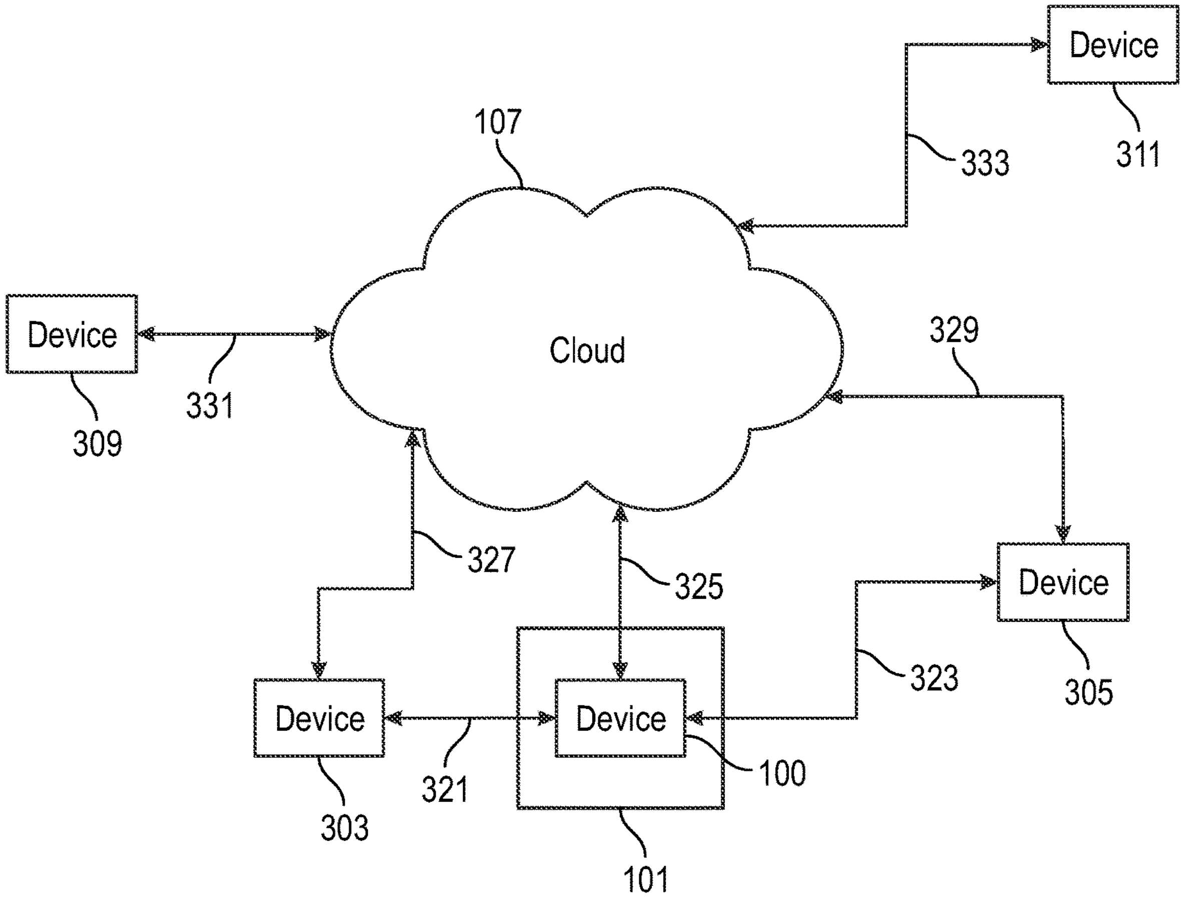
FIG. 3A may depict a block diagram of possible communication pathways of a given monitoring-device with various other electronic devices.
Figure 3B:
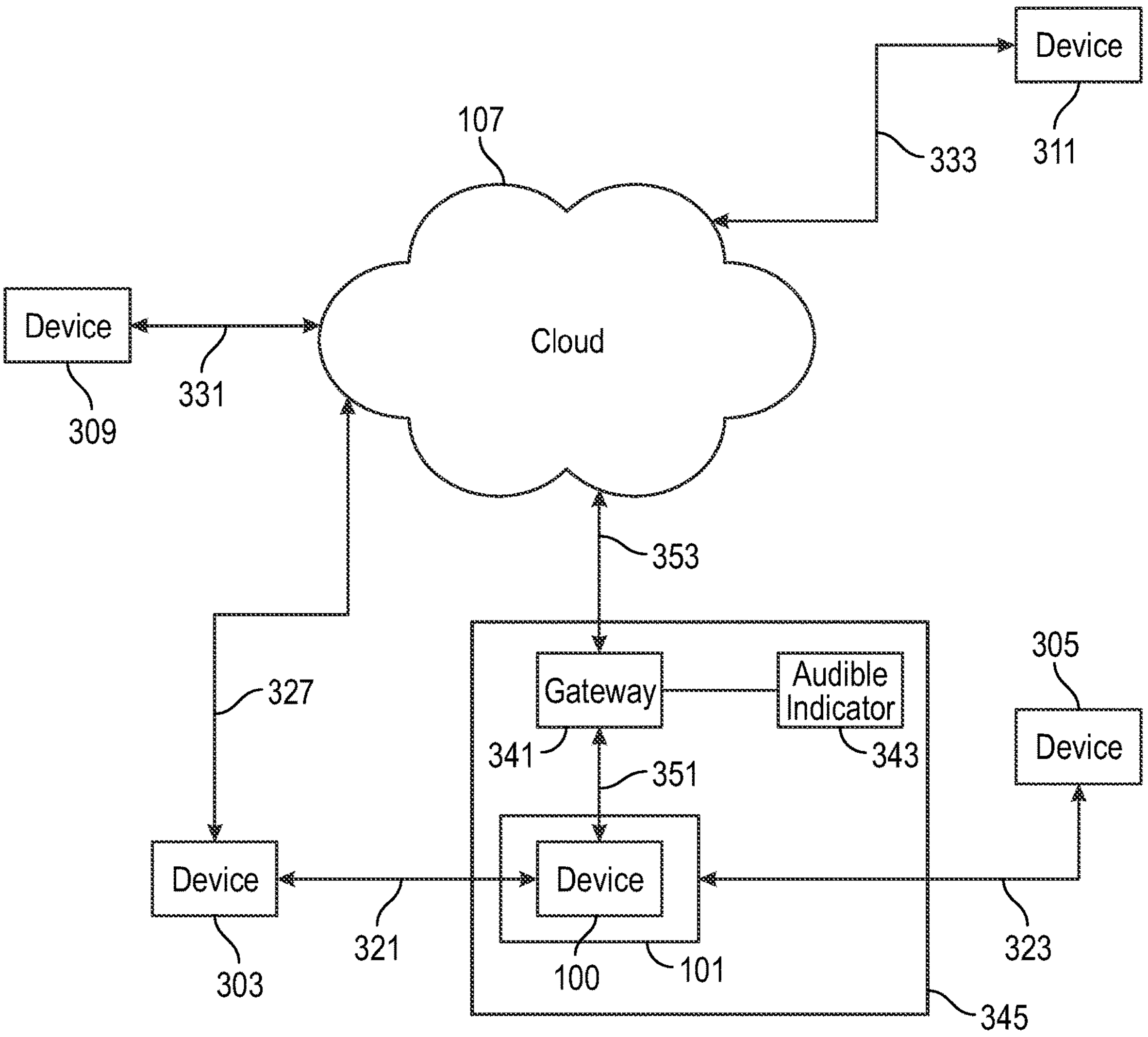
FIG. 3B may depict a block diagram of possible communication pathways of a given monitoring-device with various other electronic devices.

While FIG. 3A and FIG. 3B may only show one monitoring-device 100 per figure, note in some embodiments, a given storage space 101 may have one or more monitoring-devices 100. In some embodiments, a given storage unit 101 may have more than one monitoring-device 100 installed inside of that given storage unit 101.

While FIG. 3A and FIG. 3B may only show one storage space 101 per figure, note in some embodiments, a given facility 345 may have one or more storage spaces 101. In some embodiments, each such storage space 101 may have one or more monitoring-devices 100. In some embodiments, at least one storage space 101 may have one or more monitoring-devices 100.

FIG. 3A may depict a block diagram of possible communication pathways of the given monitoring-device 100 with various other electronic devices. In some embodiments, there be at least one monitoring-device 100 for a given storage space 101. In some embodiments, at least one storage space 101 may have one or more monitoring-devices 100.

In some embodiments, a given monitoring-device 100 may be in wireless communications via its communications 507 with one or more of: tenant device 303, facility operator device 305, provider device 309, third-party device 311, hub 341, and/or local audible indicator 343. In some embodiments, tenant device 303, facility operator device 305, provider device 309, third-party device 311, hub 341, and/or (local) audible indicator 343 may be selected from one or more of: a computer, a computing device, a smartphone, a tablet computing device, a laptop computer, a desktop computer, a tower computer, a server computer (server), a workstation computer (workstation), and/or the like.

In some embodiments, the given monitoring-device 100 may provide monitoring details and/or information of a given storage space 101 to one or more of: tenant device 303, facility operator device 305, provider device 309, third-party device 311, hub 341, and/or local audible indicator 343.

In some embodiments, one or more of tenant device 303, facility operator device 305, provider device 309, third-party device 311, hub 341, and/or local audible indicator 343 may communicate with the given monitoring-device 100. In some embodiments, one or more of tenant device 303, facility operator device 305, provider device 309, third-party device 311, hub 341, and/or local audible indicator 343 may provide information and/or instructions to the given monitoring-device 100. In some embodiments, one or more of tenant device 303, facility operator device 305, provider device 309, third-party device 311, hub 341, and/or local audible indicator 343 may control at least some aspects of the given monitoring-device 100.

Continuing discussing FIG. 3A, in some embodiments, a given tenant device 303 may be used by a tenant 401 (e.g., a renter) of a given storage space 101. For example, and without limiting the scope of the present invention, tenant device 303 may be a smartphone (but as noted above could be other types of computers or computing devices). In some embodiments, tenant 401, facility operator 405, and/or owner of a given storage space 101 may receive various details, information, alerts, reminders, notices, notifications, audible indicators and/or the like pertaining to activity, motion, events, occurrences, environmental conditions, and/or status of given storage space 101 being monitored by the one or more monitoring-devices 100. Such content may be displayed on/in tenant device 303 via one or more of: text message, SMS message, internet browser, email, voice call, video call, voicemail, private message, mobile app, in app messaging, dedicated/proprietary software application (e.g., the space monitoring software or portion thereof), combinations thereof, and/or the like. In some embodiments, tenant device 303 may be used to transmit, convey, and/or communicate various instructions, settings, information, and/or data to a given monitoring-device 100. In some embodiments, tenant device 303 may be used to arm and/or disarm a given monitoring-device 100. In some embodiments, tenant device 303 may be used to input, update, and/or change settings and/or preferences of a given monitoring-device 100. In some embodiments, changes made by tenant device 303 to a given monitoring-device 100 may also be communicated to the facility operator via their facility operator device 305 and/or to the provider via their provider device 309.

Continuing discussing FIG. 3A, in some embodiments, monitoring-device 100 may be in communication with tenant device 303. In some embodiments, this communication may be direct, from device to device, as denoted by communication pathway 321. In some embodiments, this communication may be indirect, from device to device, but routed through cloud 107, such as using communication pathway 325 between monitoring-device 100 and cloud 107; and then communication pathway 327 between cloud 107 and tenant device 303. In some embodiments, communication between monitoring-device 100 and tenant device 303 may be via wireless communications, such as but not limited to, communication pathways 321, 325, and 327. In some embodiments, communication between monitoring-device 100 and tenant device 303 may be wireless communications (or a portion of the communication may be wireless), such as, but limited to, low power wireless communications protocol(s), LoRa, NFC, Bluetooth (BT), Zigbee, 802.15, RFID, combinations thereof, and/or the like communications, such as communication pathway 321.

Continuing discussing FIG. 3A, in some embodiments, cloud 107 may comprise one or more of: LAN (local area network), WAN (wide area network), the internet, combinations thereof, and/or the like. In some embodiments, cloud 107 may comprise at least a portion of: a LAN, a WAN, the internet, combinations thereof, and/or the like. In some embodiments, cloud 107 may comprise one or more of: network hardware, network switching hardware, network routing hardware, routers, modems, switches, hubs, cabling, wiring, fiber optics, antennas, dishes, transmitters, receivers, buffers, memory, and/or the like.

Continuing discussing FIG. 3A, in some embodiments, a given facility operator device 305 may be used by one who operates and/or manages a given storage facility 345, which may be (or may not be) the owner of the given storage facility 345. In some embodiments, a given facility operator device 305 may be used by facility operator 405. In some embodiments, a given storage facility 345 may comprise one or more storage spaces 101, e.g., at one or more distinctive geographic locations. For example, and without limiting the scope of the present invention, facility operator device 305 may be a smartphone (but as noted above could be other types of computers or computing devices). In some embodiments, the facility operator 405 of a given storage space 101 may receive various details, information, alerts, reminders, notices, notifications, alarms and/or the like pertaining to events, occurrences, environmental conditions, operational information, sensor data, and/or status of given storage space 101 being monitored by the one or more monitoring-devices 100. Such content may be displayed on/in facility operator device 305 via one or more of: text message, SMS message, internet browser, email, voice call, video call, voicemail, private message, mobile app, dedicated/proprietary software application (e.g., the storage space monitoring software or portion thereof), combinations thereof, and/or the like. In some embodiments, facility operator device 305 may be used to transmit, convey, and/or communicate various instructions, settings, information, and/or data to a given monitoring-device 100. In some embodiments, facility operator device 305 may be used to arm and/or disarm a given monitoring-device 100. In some embodiments, facility operator device 305 may be used to input, update, and/or change settings and/or preferences of a given monitoring-device 100. In some embodiments, changes made by facility operator device 305 to a given monitoring-device 100 may also be communicated (reported) to the tenant via their tenant device 303 and/or to the provider via their provider device 309. In some situations, it may be necessary for the facility operator to override tenant settings and/or preferences, e.g., to effect emergency repairs or inspections of a given storage space 101.

Continuing discussing FIG. 3A, in some embodiments, monitoring-device 100 may be in communication with facility operator device 305. In some embodiments, this communication may be direct, from device to device, as denoted by communication pathway 323. In some embodiments, this communication may be indirect, from device to device, but routed through cloud 107, such as using communication pathway 325 between monitoring-device 100 and cloud 107; and then communication pathway 329 between cloud 107 and facility operator device 305. In some embodiments, communication between monitoring-device 100 and facility operator device 305 may be via wireless communications (or a portion may be wireless), such as but not limited to, communication pathways 323, 325, and 329. In some embodiments, communication between monitoring-device 100 and facility operator device 305 may be wireless communications, such as, but limited to, low power wireless communication protocol(s), LoRa, NFC, RFID, cellular, combinations thereof, and/or the like communications, such as communication pathway 323.

Continuing discussing FIG. 3A, in some embodiments, a given provider device 309 may be used by one who manages, implements, and/or services the overall space monitoring software (e.g., NINCE 367) and who may provision, implement, provide, maintain, and/or service the monitoring-devices 100. In some embodiments, the provider may be the company (and/or organization) that manages, implements, maintains, and/or services the overall space monitoring software and that may provision, implement, provide, maintain, and/or service the monitoring-devices 100. In some embodiments, the provider may provide various back end operations, customer services, technical support, and/or support for the space monitoring software and its hardware, such as, monitoring-devices 100, gateways (hubs) 341, and/or local audible indicator 343. In some embodiments, the provider may provide human responders for escalation purposes from sensor data, alerts, and/or alarms generated by a given monitoring-device 100.

For example, and without limiting the scope of the present invention, provider device 309 may be a smartphone, tablet computing device, and/or laptop (but as noted above could be other types of computers or computing devices), such as in situations where a provider technician may be sent onsite to a given storage facility 345 and/or to a given storage space 101.

For example, and without limiting the scope of the present invention, provider device 309 may be a server, a workstation, a desktop computer, a tower computer, a laptop computer, tablet computing device, (but as noted above could be other types of computers or computing devices). In some embodiments, provider devices 309 may be in communication with one or more databases. In some embodiments, provider device 309 may be at least one server 309 whose memory may non-transitorily store NINCE 367. In some embodiments, NINCE 367 shown in FIG. 3C may be running and/or operating at least one server 309 (provider device 309).

In some embodiments, the provider may receive various details, information, alerts, reminders, notices, notifications, alarms and/or the like pertaining to events, occurrences, environmental conditions, sensor data, and/or status of given storage space 101 being monitored by the one or more monitoring-devices 100. Such content may be displayed on/in provider devices 309 via one or more of: text message, SMS message, internet browser, email, voice call, video call, voicemail, private message, mobile app, dedicated/proprietary software application (e.g., the storage space monitoring software or portion thereof), combinations thereof, and/or the like. In some embodiments, provider devices 309 may be used to transmit, convey, and/or communicate various instructions, settings, information, software updates, firmware updates, overrides, and/or data to a given monitoring-device 100. In some embodiments, provider devices 309 may be used to arm and/or disarm a given monitoring-device 100. In some embodiments, provider devices 309 may be used to input, update, and/or change settings and/or preferences of a given monitoring-device 100. In some embodiments, changes made by provider devices 309 to a given monitoring-device 100 may also be communicated to the facility operator via their facility operator device 305 and/or to the tenant, renter, and/or owner via their tenant device 303.

Continuing discussing FIG. 3A, in some embodiments, monitoring-device 100 may be in communication with provider device 309. In some embodiments, this communication may be direct, from device to device. In some embodiments, this communication may be indirect, from device to device, but routed through cloud 107, such as using communication pathway 325 between monitoring-device 100 and cloud 107; and then communication pathway 331 between cloud 107 and provider device 309. In some embodiments, communication between monitoring-device 100 and provider device 309 may be wireless communications, such as communication pathways 325 and 331. In some embodiments, communication pathway 331 may be wireless, wired, or combinations thereof. For example, and without limiting the scope of the present invention, when provider device 309 may be a server, communication pathway 331 from this server to cloud 107 may be wired or substantially wired. In some embodiments, communication between monitoring-device 100 and tenant device 303 may be wireless communications, such as, but limited to, low power wireless communications, LoRa, WiFi, NFC, BT, RFID, cellular, combinations thereof, and/or the like communications. In some embodiments, communication between monitoring-device 100 and provider device 309 may be via wired communications when the two devices may be local to each other and removably wired to each other.

Continuing discussing FIG. 3A, in some embodiments, a given third-party device 311 may be used by one who may be providing some third-party service to one or more of: the tenant 401, the owner, the landlord, the storage facility operator 405, and/or the provider associated with provider devices 309. For example, and without limiting the scope of the present invention, the third-party provider may be an insurer (insurance company and/or insurance carrier), first responder, law enforcement, government entity, combinations thereof, and/or the like.

For example, and without limiting the scope of the present invention, third-party device 311 may be a smartphone, desk phone, tablet computing device, and/or laptop (but as noted above could be other types of computers or computing devices), such as in situations where first responders, law enforcement or an insurance claims adjuster may be sent onsite to a given storage facility 345 and/or to a given storage space 101.

For example, and without limiting the scope of the present invention, third-party device 311 may be a server, a workstation, a desktop computer, a tower computer, a laptop computer, tablet computing device, (but as noted above could be other types of computers or computing devices). In some embodiments, third-party devices 311 may be in communication with one or more databases.

In some embodiments, the third-party provider may receive various details, information, alerts, reminders, notices, notifications, alarms and/or the like pertaining to events, occurrences, environmental data, sensor data, and/or status of given storage space 101 being monitored by the one or more monitoring-devices 100. Such content may be displayed on/in third-party devices 311 via one or more of: text message, SMS message, internet browser, email, voice call, video call, voicemail, private message, mobile application, dedicated/proprietary software application (e.g., the storage space monitoring software or portion thereof), combinations thereof, and/or the like. In some embodiments, third-party devices 311 may be used to transmit, convey, and/or communicate various instructions, settings, information, overrides, and/or data to a given monitoring-device 100. In some embodiments, third-party devices 311 may be used to arm and/or disarm, enable and/or disable, a given monitoring-device 100. In some embodiments, third-party devices 311 may be used to input, update, and/or change settings and/or preferences of a given monitoring-device 100. In some embodiments, changes made by third-party devices 311 to a given monitoring-device 100 may also be communicated to the provider via provider devices 309; to the facility operator via their facility operator device 305; and/or to the tenant, renter, and/or owner via their tenant device 303.

In some embodiments, the third party device 311 may be running a software interface, such as, one or more APIs (Application Programmable Interfaces) for providing various services to one or more of: the tenant 401, the facility operator 405, and/or the provider.

Continuing discussing FIG. 3A, in some embodiments, monitoring-device 100 may be in communication with third-party device 311. In some embodiments, this communication may be direct, from device to device. In some embodiments, this communication may be indirect, from device to device, but routed through cloud 107, such as using communication pathway 325 between monitoring-device 100 and cloud 107; and then communication pathway 333 between cloud 107 and third-party device 311. In some embodiments, communication between monitoring-device 100 and third-party device 311 may be wireless communications such as communication pathways 325 and 333. In some embodiments, communication pathway 333 may be wireless, wired, or combinations thereof. In some embodiments, communication between monitoring-device 100 and facility operator device 305 may be wireless communications, such as, but limited to, WiFi, low power wireless communications, cellular, NFC, Bluetooth, ZigBee, 802.15, RFID, combinations thereof, and/or the like communications.

FIG. 3B may depict a block diagram of possible communication pathways of the given monitoring device 100 with various other electronic devices. FIG. 3B may differ from FIG. 3A, in that in FIG. 3B, one or more of gateway (hub) 341, audible indicator 343, and/or storage facility 345 may be shown in FIG. 3B.

In FIG. 3B, communications between cloud 107 and a given monitoring-device 100 may include an intermediary network device, such as, but not limited to, hub 341. In some embodiments, hub 341 may be one or more of: a modem, a router, a network switch, combinations thereof, and/or the like. In some embodiments, hub 341 may have its own processors, memory, wireless communication means (e.g., one or more antennas), and/or power supply; wherein, in some embodiments, this memory may increase the storage capacity of memory 503 of monitoring-devices 100 and/or act as a buffer. In some embodiments, hub 341 may have a backup power supply. In some embodiments, at least one monitoring-device 100 may be in direct wireless communication with hub 341 via communication pathway 351. In some embodiments, hub 341 may be in communication with cloud 107 via communication pathway 353. In some embodiments, communication pathway 353 may be wireless, wired, and/or combinations thereof. In some embodiments, one or more hubs 341 may be located within a given storage facility 345. In some embodiments, hub 341 may be used to enhance wireless communication coverage of the one or more monitoring-devices 100 (e.g., in locations where cellular coverage may be weak).

Continuing discussing FIG. 3B, in some embodiments, a given storage facility 345 may comprise one or more audible indicators 343. In some embodiments, the one or more local audible indicators 343 may be in communication with the one or more monitoring-devices 100 of that given storage facility 345. In some embodiments, the one or more local audible indicators 343 may be in communication with the one or more monitoring-devices 100 of that given storage facility 345, via one or more hubs 341. In some embodiments, a given local audible indicators 343 may be in direct communication with a given hub 341. In some embodiments, this communication may be wired, wireless, and/or combinations thereof. In some embodiments, a given hub 341 may comprise one or more local audible indicators 343. In some embodiments, a trigger above some setting, threshold, and/or preference (which may be predetermined in some embodiments), detected by at least one monitoring-device 100, may result in activating and/or engaging the one or more local audible indicators 343 such that the one or more local audible indicators 343 may be producing a visual (via lights) and/or auditory (via speakers) alarm.

In some embodiments, a given storage facility 345 may comprise one or more: storage spaces 101, monitoring-devices 100, hubs 341, and/or local audible indicators 343.

In some embodiments, at least some of the wireless communication in FIG. 3A and/or FIG. 3B, may be cellular, such as, but not limited, wireless communications between monitoring-devices 100 and other devices shown therein.

Figure 3C:
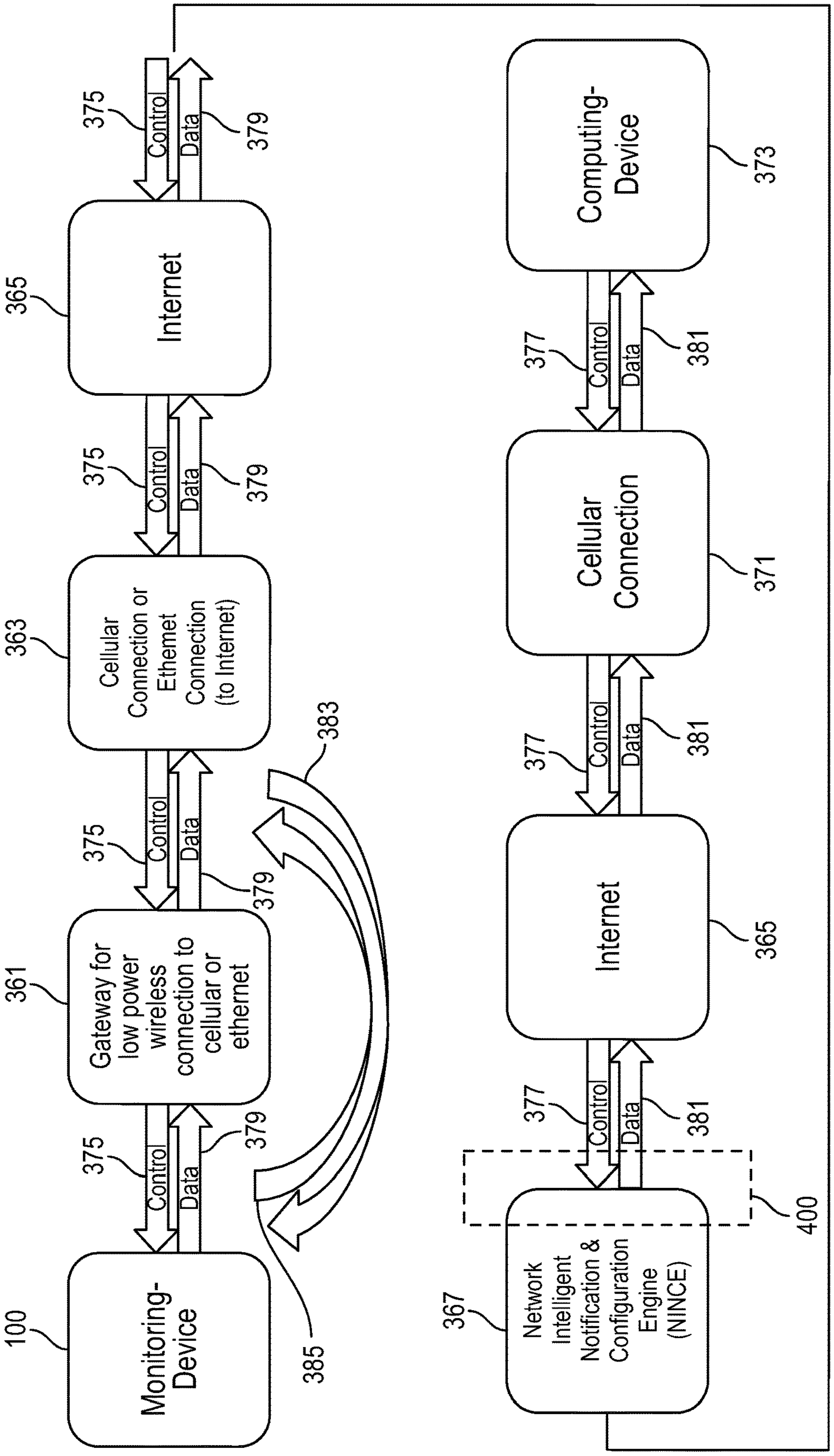
FIG. 3C may depict a block diagram of possible communication pathways and types between a given monitoring-device and a given end-user computing-device.

In some embodiments, FIG. 3C may show a schematic block flow diagram of information/data/control commands/instruction commands flow between a given monitoring-device 100 and a given computing-device 373. In some embodiments, the monitoring-device 100 may be mounted inside of the given storage unit 101. In some embodiments, the computing-device 373 may be located outside of the given storage unit 101. In some embodiments, the computing-device 373 may be the tenant device 303; the facility operator device 305; the provider device 309; and/or the third-party device 311.

Continuing discussing FIG. 3C, in some embodiments, the given monitoring-device 100 may be in communication with "Network Intelligent Notification & Configuration Engine 367" or NINCE 367. In some embodiments, NINCE 367 may be software (set of instructions) running on servers 309 (non-transitorily stored in memory of such servers 309) of the service/subscription provider. In some embodiments, NINCE 367 may control/govern communications to and/or from a given monitoring-device 100. In some embodiments, NINCE 367 may control/govern at least some portions of "Human Interface System" (HIS) 400. In some embodiments, NINCE 367 may correlate sensor 505 data in real time (or near real time), from one or more monitoring-devices 100, optionally with additional input of one or more authorized users and interested parties (from their respective computing-devices 373 that are in communication with NINCE 367), in order to collect actionable insights to make real time (or near real time) decisions based on a real time (or near real time) continuous stream of data from monitoring-devices 100 and authorized users. In some embodiments, NINCE 367 may deploy in real time (or near real time) a decision making and communication algorithm to automatically or semi-automatically provide authorized users/stakeholders two-way communication of content that is proper, highly relevant, useful, and/or time sensitive such as, but not limited to: data, sensor 505 data, details, information, alerts, reminders, notices, notifications, alarms, events, occurrences, escalation events, de-escalation events, and/or the like with respect to the given controlled space (e.g., storage unit 101) being monitored, the assets being monitored, and/or the authorized stakeholders interfacing with NINCE 367 through HIS 400. In some embodiments, communication between the given monitoring-device 100 and NINCE 367 may not be direct, but rather may be indirect.

Continuing discussing FIG. 3C, in some embodiments, the given monitoring-device 100 may be in wireless communication with at least one gateway 361 (via radio(s) and/or antenna(s) of the given monitoring-device 100). In some embodiments, gateway 361 may provide a bridge to connection 363. In some embodiments, gateway 361 may be in communication with connection 363. In some embodiments, gateway 361 may be in wired and/or wireless communication with connection 363. In some embodiments, gateway 361 may be a low power wireless communication protocol for connecting to connection 363. In some embodiments, gateway 361 may be a low power wireless communication protocol (e.g., LP WAN) for connecting to connection 363. In some embodiments, gateway 361 may utilize a low power wireless communication protocol for connecting to connection 363. In some embodiments, gateway 361 may utilize a low power wireless communication protocol (e.g., LP WAN) for connecting to connection 363. While in some embodiments, a configuration of gateway 361 may include a wireless communication protocol (which may be low power in some embodiments), there are some embodiments of gateway 361, which may also be in wired LAN ethernet and/or wireless communication with connection 363.

In some embodiments, there may be at least one gateway 361 installed on and at a given storage facility 345. In some embodiments, there may be an ad hoc wireless network established on and at the given storage facility 345. In some embodiments, the ad hoc wireless network may comprise at least one gateway 361. In some embodiments, the at least one gateway 361 may be configured for low power wireless communications with the monitoring-devices 100 used at that storage facility 345 in the various storage units 101; and the ad hoc wireless network may be in communication (wired and/or wireless) with connection 363, cellular connection 371, and/or internet 365. Thus, some portions of the ad hoc wireless network may be configured for low power wireless communications with the monitoring-devices 100; and other portions of the ad hoc wireless network may have wired and/or wireless communications that may ultimately connect internet 365. In some embodiments, the ad hoc wireless network may comprise one or more of: gateway 361, a radio, an antenna, a modem, a router, a switch, a processor, memory, a solar power array/panel, a battery, an AC/DC converter/adapter, combinations thereof, and/or the like. In some embodiments, at least one gateway 361 may be solar powered, battery powered, wired to a local electrical power source, combinations thereof, and/or the like. In some embodiments, at least some portion of the ad hoc wireless network may be solar powered, battery powered, wired to a local electrical power source, combinations thereof, and/or the like.

In some embodiments, there need not be a requirement of any gateway 361 installed at the given storage facility 345 as there may already be a LP WAN (low power WAN) and/or low power cellular wireless communications services available by some other network providers accessible in the area (such as, but not limited to, NB-IoT, LTE Cat-M1, SigFox, or the like). In some embodiments, such existing LP WAN and/or low power cellular wireless communications services available may achieve the benefits of the ad hoc wireless network when at least one of the monitoring-devices 100 includes a matching low power wireless communication radio, antenna and matching wireless communication protocol such that the monitoring-devices 100 used at that storage facility 345 in the various storage units 101 is offered access to this existing LP WAN and/or low power cellular wireless communications services available; and thus provided communication to Internet 365 given its own integral direct wireless communication connection 363.

Continuing discussing FIG. 3C, in some embodiments, connection 363 may be a cellular connection or a wired connection to internet 365. In some embodiments, connection 363 may in communication with internet 365. In some embodiments, NINCE 367 may be in communication with internet 365. In some embodiments, NINCE 367 may be in wired and/or wireless communication with internet 365.

Continuing discussing FIG. 3C, in some embodiments, internet 365 may be in communication with connection 363 and NINCE 367. in some embodiments, internet 365 may be in communication with NINCE 367 and cellular connection 371.

Continuing discussing FIG. 3C, in some embodiments, cellular connection 371 may be a cellular connection between internet 365 and a given computing-device 373. In some embodiments, cellular connection 371 may be provided by a third-party provider, such as, but not limited to, Verizon, AT&T, T-Mobile, combinations thereof, and/or the like.

Continuing discussing FIG. 3C, in some embodiments, commands, instructions, firmware updates, and/or software updates from NINCE 367 to a given monitoring-device 100 may be deemed a control transmission 375. In some embodiments, control transmission 375 may comprise at least one: command, instruction, firmware update, software update, combinations thereof, and/or the like, from NINCE 367 to monitoring-device 100. In some embodiments, control transmission(s) 375 received at a given monitoring-device 100 may require that monitoring-device 100 to behave in a particular and/or predetermined manner (such as, but not limited to, activating a sensor 505/505*a*/505*b*; deactivating a sensor 505/505*a*/505*b*; cause a sensor 505/505*a*/505*b* to take a reading; change a parameter value; change a threshold value; change wireless communication protocol; change radios and/or antennas of monitoring-device 100 being used; cause a data transmission from that monitoring-device 100 [e.g., a sensor reading, status, status change, etc.]; cause monitoring-device 100 to delete data; cause monitoring-device 100 to update its firmware and/or software; generate an output to UX output 205; stop an output of UX output 205; combinations thereof, and/or the like). In some embodiments, control transmission(s) 375 may be automatically generated by NINCE 367 and/or may originate from end-users via a computing-device 373.

Continuing discussing FIG. 3C, in some embodiments, commands, and/or instructions from the computing-device 373 to the given monitoring-device 100 (and/or to NINCE 367) may be deemed a control transmission 377. In some embodiments, control transmission 377 may comprise at least one: command, instruction, combinations thereof, and/or the like, from computing-device 373 to monitoring-device 100 and/or to NINCE 367. In some embodiments, when control transmission 377 may reach (may be received at) NINCE 367, NINCE 367 may reformat that control transmission 377 into a control transmission 375 from the NINCE 367. In some embodiments, a command and/or instruction originating at a given computing-device 373 (such as, but not limited to, tenant device 303) may comprise natural language in the body of a text message, SMS message, email, in app messenger, instant messenger, robo-voice message, web notifications, combinations thereof, and/or the like, wherein that natural language command and/or instruction may be encoded in control transmission 377. In some embodiments, control transmission 375 and control transmission 377 may be formatted differently. In some embodiments, control transmission 375 and control transmission 377 may comprise different elements.

Continuing discussing FIG. 3C, in some embodiments, data transmission 379 may be data, information, confirmation(s), combinations thereof, and/or the like originating at a given monitoring-device 100 and received at NINCE 367. In some embodiments, data transmission 379 may comprise any data and/or information generated by a given monitoring-device 100 and/or any data/or information non-transitorily stored in memory 503 (storage 503) of the given monitoring-device 100. (See the discussion of FIG. 5A below for a discussion of memory/storage 503). In some embodiments, data transmission 379 may comprise one or more of: monitoring-device 100 status; monitoring-device 100 change in status; a setting of monitoring-device 100, metadata of monitoring-device 100; serial number of monitoring-device 100; model number of monitoring-device 100; address of monitoring-device 100; IP address of monitoring-device 100; MAC address of monitoring-device 100; sensor 505/505*a*/505*b* reading of monitoring-device 100; data captured by sensor(s) 505/505*a*/505*b* of monitoring-device 100; image(s) captured by camera(s) of monitoring-device 100; type of reporting sensor 505/505*a*/505*b*; a date of a sensor reading, occurrence, event, and/or alert; a date/time of a sensor reading, occurrence, event, and/or alert; firmware version; software version; battery (power source 511) status; memory 503 capacity status; log data; received confirmation (s); combinations thereof, and/or the like.

Continuing discussing FIG. 3C, in some embodiments, data transmission 381 may be data, information, confirmation(s), combinations thereof, and/or from NINCE 367 and ultimately received at the computing-device 381. In some embodiments, a data transmission 379 originating from monitoring-device 100 but wherein at least a portion of that data transmission 379 may be intended to be received at the computing-device 373, may be reformatted by NINCE 367 from a data transmission 379 into a data transmission 381. In some embodiments, data transmission 379 and data transmission 381 may be formatted differently. In some embodiments, data transmission 379 and data transmission 381 may comprise different information. In some embodiments, data transmission 379 may comprise raw data, information, and/or the like from the given monitoring-device 100. In some embodiments, NINCE 367 may interpret received data transmission 379 into data transmission 381 which may include event and/or alert information/notifications.

Continuing discussing FIG. 3C, in some embodiments, the given monitoring-device 100 may utilize control transmission 383 and data transmission 385 to wirelessly connect to connection 363 when gateway 361 may not be available. In some embodiments, informational content of control transmission 383 may be substantially similar to control data transmission 375. In some embodiments, informational content of data transmission 385 may be substantially similar to data transmission 379.

In some embodiments, users of: monitoring-device(s) 100; NINCE 367; systems utilizing monitoring-device(s) 100 and/or utilizing NINCE 367; and/or methods utilizing monitoring-device(s) 100 and/or utilizing NINCE 367—may interact/interface with such monitoring-device(s) 100, NINCE 367, systems, and/or methods via a "Human Interface System" (HIS) 400. In some embodiments, the HIS 400 must be accessed through a given computing-device 373, such as, but not limited to, tenant device 303, facility operator device 305, provider device 309, third-party device 311, combinations thereof, and/or the like. In some embodiments, the HIS 400 may comprise one or more of: SMS messaging, text messaging, voice, web portal (e.g., through a web browser), mobile app, in app messaging, instant messaging, combinations thereof, and/or the like—any one of which accessed/used through a given computing-device 373. In some embodiments, the HIS 400 may employ/utilize one or more of: SMS messaging, text messaging, voice, web portal (e.g., through a web browser), mobile app, in app messaging, instant messaging, combinations thereof, and/or the like—any one of which accessed/used through a given computing-device 373.

In some embodiments, the users of: the HIS 400; monitoring-device(s) 100; NINCE 367; systems utilizing monitoring-device(s) 100 and/or utilizing NINCE 367; and/or methods utilizing monitoring-device(s) 100 and/or utilizing NINCE 367—may comprise one or more authorized interested party/stakeholder(s) (referred to as "authorized stakeholders"). In some embodiments, the one or more authorized stakeholders may comprise one or more of: tenants 401 of a given storage unit 101; tenant specified back-up contact(s) for storage unit 101; facility operator 405 of storage facility 345 with one or more storage units 101; on-site or off-site maintenance staff, workers/management of the provider of the HIS 400, monitoring-device(s) 100, NINCE 367, systems, and/or methods; workers/management of insurance companies; governmental employees (such as, but not limited to, first responders, law enforcement personnel, fire department personnel, etc.); combinations thereof, and/or the like.

In some embodiments, the interaction between HIS 400 and NINCE 367 may involve distributed decision making methodologies (e.g., with multiple stakeholders interacting with NINCE 367). In some embodiments, "two-way enhanced electronic text and/or audible messaging communication" (that may be defined to include the use of simplified two way text messaging [such as SMS] at the heart of the communication protocol, but may also include one or more of the following: two way instant messaging; two way web alerts; two way mobile phone notifications; two way mobile app alerts, combinations thereof), and/or the like may be a means for interacting with monitoring-device(s) 100; NINCE 367; systems utilizing monitoring-device(s) 100 and/or utilizing NINCE 367; and/or methods utilizing monitoring-device(s) 100 and/or utilizing NINCE 367. In some embodiments, the two-way enhanced electronic text and/or audible messaging communication, combinations thereof, and/or the like may be a means for controlling monitoring-device(s) 100; NINCE 367; systems utilizing monitoring-device(s) 100 and/or utilizing NINCE 367; and/or methods utilizing monitoring-device(s) 100 and/or utilizing NINCE 367, and/or portions thereof. In some embodiments, the two-way enhanced electronic text and/or audible messaging communication, combinations thereof, and/or the like may be between a given stakeholder and NINCE 367, according to the informational flows shown and described in FIG. 3C.

In some embodiments, the two-way enhanced electronic text and/or audible messaging communication, combinations thereof, and/or the like may be between two or more different authorized stakeholders. In some embodiments, the two-way enhanced electronic text and/or audible messaging communication, combinations thereof, and/or the like that may be between the two or more different authorized stakeholders, that may be indirect communications that are routed and controlled through NINCE 367, according to the informational flows shown and described in FIG. 3C, with each different stakeholder utilizing the HIS 400 through their own computing-device 373.

In some embodiments, there may be multiple computing-devices 373, each associated with a given authorized stakeholder, wherein each such authorized stakeholder may be interacting with and/or controlling the same monitoring-device 100 of a same storage unit 101 through stakeholder communications with NINCE 367 according to the flows of FIG. 3C.

In some embodiments, the two-way enhanced electronic text and/or audible messaging communication, combinations thereof, may be a control mechanism for authorized stakeholders interacting/controlling monitoring-devices 100 and/or NINCE 367. In this context, "two-way NINCE 367 communications" may be defined as utilization of the HIS 400 interfacing, such as, but not limited to, two-way text/SMS messages, as well as optionally including instant messaging; web alerts; mobile phone notifications; mobile app alerts, text-to-voice/voice-to-text communication from the given authorized stakeholder to NINCE 367; and the two-way NINCE 367 communications from NINCE 367 to the given authorized stakeholder. That is, the given authorized stakeholder may be in two-way NINCE 367 communications messaging NINCE 367; and NINCE 367 may be in two-way NINCE 367 communications messaging the given authorized stakeholder. In some scenarios, the given authorized stakeholder may be the one initiating the two-way NINCE 367 communications, such as a text-SMS messaging, to NINCE 367. In some scenarios, NINCE 367 may be initiating the two-way NINCE 367 communications, such as but not limited to text-SMS messaging, to the given authorized stakeholder.

In some embodiments, the two-way NINCE 367 communications from the given authorized stakeholder may include various predetermined and increasingly smarter AI-learning contextual commands/instructions, in textual form; that when received by NINCE 367, NINCE 367 may recognize and act on, including when appropriate, converting the received textual command/instruction into a command/instruction recognized and communicated to the given monitoring-device 100. In some embodiments, the format/form of commands/instructions received at a given monitoring-device 100 from NINCE 367 may not be in SMS/text message form/format.

In some embodiments, the predetermined and/or deterministic commands/instructions that a given authorized stakeholder are, via the HIS 400 (such as, but not limited to, SMS/text message, instant messaging, web alerts, mobile phone notifications, mobile app alerts), directly or indirectly transmitting to NINCE 367 may include one or more of the following: for the given monitoring-device 100 to report back its current status; for the given monitoring-device 100 to report back its metadata/specifications (such as, but not limited to, model type, model number, serial number, chip set, lot number, IP address, MAC address, firmware version, software version, etc.); for the given monitoring-device 100 to change its operating mode; for the given monitoring-device 100 to activate a given sensor 505 type; for the given monitoring-device 100 to deactivate a given sensor 505 type; for the given monitoring-device 100 to change a parameter and/or threshold; for the given monitoring-device 100 to take sensor 505 readings at an increased frequency; for the given monitoring-device 100 to take sensor 505 readings at a decreased frequency; for the given monitoring-device 100 to begin image and/or audio capture; for the given monitoring-device 100 to transmit captured image and/or audio data; for the given monitoring-device 100 to delete data, information, and/or files from its memory 503; to schedule an event/activity at the given monitoring-device 100; to end an event/activity at the given monitoring-device 100; to initiate an audible and/or visual output (e.g., at UX output 205) locally at the given monitoring-device 100; to mute an audible output of the given monitoring-device 100; for the given monitoring-device 100 to perform/execute a self-calibration process; for the given monitoring-device 100 to switch from low power wireless communications 803 to higher power wireless communications 805; for the given monitoring-device 100 to switch from higher power wireless communications 805 to low power wireless communications 803; for the given monitoring-device 100 to receive a firmware and/or software update; for the given monitoring-device 100 to power down and turn off; for NINCE 367 to escalate an event detected a given monitoring-device 100; for NINCE 367 to de-escalate an event detected a given monitoring-device 100; for NINCE 367 to contact or attempt to contact another authorized interested party/stakeholder; for NINCE 367 to report back given a report, a log, a notice, statistics, data, information, sensor 505 reading(s), interpretations thereof, combinations thereof; combinations thereof, and/or the like.

In some embodiments, the two-way NINCE 367 communications content, such as, but not limited to, SMS/text message content, directly or indirectly from NINCE 367, may include data and/or information from a given monitoring-device 100. In some embodiments, the two-way NINCE 367 communications content from NINCE 367 may include interpretations of data and/or information from a given monitoring-device 100. In some embodiments, the two-way NINCE 367 communications content from NINCE 367 may include notices, reports, alerts, alarms, logs, log information, sensor data/readings, combinations thereof, and/or the like. In some embodiments, the two-way NINCE 367 communications content from NINCE 367 may be formatted to include one or more of: text, images, still image captures, video captures, links to web or mobile app pages, spreadsheets, documents, files, as well as other presentation outputs, combinations thereof, and/or the like.

In some embodiments, the two-way NINCE 367 communications content from NINCE 367 may be initiated by one or more of the following: sensor 505 state change; sensor 505 readings exceeding a predetermined parameter/threshold; sensor 505 health/status polling/inquiry; power source 511 change; change in wireless communication protocol/hardware (e.g., switch from low power to higher power or vice versa); authorized interested party/stakeholder (authorized end-user) prompted; timed based (e.g., scheduled and/or programmed); based an outcome/output from a predictive anomaly detection algorithm/AI/machine learning portion of NINCE 367; combinations thereof, and/or like.

In some embodiments, the two-way NINCE 367 communications messaging from NINCE 367 may include a request/demand for a responsive the two-way NINCE 367 communications message from the (authorized) interested party/stakeholder recipient. In some embodiments, the request/demand in the two-way NINCE 367 communications message from NINCE 367 may be requiring/requesting: a Yes/No or equivalent response; an acknowledgment response; an action cueing word response; an escalation response; a de-escalation response; an approval response; a denied response; combinations thereof, and/or the like—from the (authorized) interested party/stakeholder recipient.

In some embodiments, the two-way NINCE 367 communications (such as SMS/text messaging) control architecture may also be used to automatically or semi-automatically onboard a new end-user (e.g., new interested party/stakeholder, such as, but not limited to, a new tenant 401 or expanding services of an existing tenant 401), including, but not limited to: setting up a new account; providing information for populating the new account; setting up/initializing a given monitoring-device 100 with a given storage-unit 101; assenting to/agreeing to legally binding agreements/contracts (e.g., end-user subscription agreement, privacy policy, terms and conditions, information sharing, combinations thereof, and/or the like); end-user authentication; who may be authorized stakeholders; combinations thereof; and/or the like. In some embodiments, the two-way NINCE 367 communications control architecture may also be used to update an already existing account. In some embodiments, the two-way NINCE 367 communications control architecture may also be used to terminate an end-user (tenant 401) subscription.

In some embodiments, the two-way NINCE 367 communications control architecture may also be executed by voice calls, wherein one or more APIs may convert the given voice call into a the two-way NINCE 367 communications, such as a SMS/text message, or vice versa; such that NINCE 367 may transmit voice calls to authorized stakeholders; and/or the authorized stakeholders may transmit voice calls with commands/instructions to NINCE 367.

In some embodiments, network/cloud 107 may be comprised of at least portions of gateway 361, connection 363, internet 365, and connection 371. In some embodiments, network/cloud 107 may be comprised of at least portions of gateway 361, connection 363, internet 365, connection 371, and servers hosting NINCE 367. In some embodiments, the network/cloud 107 shown in FIG. 1, FIG. 3A, FIG. 3B, FIG. 7B, and FIG. 7C, may be a simplification of at least some of the elements (e.g., gateway 361, connection 363, internet 365, NINCE 367, and connection 371) shown in FIG. 3C. In some embodiments, connections/interfaces in FIG. 3C may be facilitated by one or more predetermined APIs (application program interfaces).

In some embodiments, FIG. 3C may depict a system for controlling communication between at least one monitoring-device 100 and at least one computing-device 373. In some embodiments, such a system may comprise the at least one monitoring-device 100 and a set of instructions (e.g., NINCE 367) non-transitorily stored in memory of at least one server 309. In some embodiments, the at least one monitoring-device 100 may comprise at least one sensor 505 and two radios configured for wireless communications, a primary radio 507*a* and a secondary radio 507*b*, respectively. In some embodiments, the at least one sensor 505 and the two radios may be operatively linked. In some embodiments, the set of instructions (e.g., NINCE 367), through the at least one server 309, may be in communication with both the at least one monitoring-device 100 and the at least one computing-device 373. In some embodiments, the at least one server 309, through control by the set of instructions (e.g., NINCE 367), may be in communication with the Internet 365. In some embodiments, the Internet 365 may be in communication with a connection 363. In some embodiments, the connection 363 may be in communication with gateway 361. In some embodiments, the connection 363 is in communication with cellular connection 383/385. In some embodiments, gateway 361 may be in wireless communication with primary radio 507*a* under certain predetermined conditions. In some embodiments, cellular connection 383/385 may be in wireless communication with secondary radio 507*b* under certain different predetermined conditions. In some embodiments, the set of instructions (e.g., NINCE 367) may cause communications from the set of instructions (e.g., NINCE 367) to the at least one monitoring-device 100 to flow from the at least one server 309 through at least a portion of the Internet 365, then through the connection 363, then through either the gateway 361 or the cellular connection 383/385, and then to the at least one monitoring-device 100. In some embodiments, the at least one monitoring-device 100 may cause communications from the at least one monitoring-device 100 to the set of instructions (e.g., NINCE 367) to flow from the at least one monitoring-device 100 to either the gateway 361 or the cellular connection 383/385, then to the connection 363, then through at least some portion of the Internet 365, and then to the set of instructions (e.g., NINCE 367).

Note, in some embodiments, connection 383/385 may not be a cellular connection, but may be a type of predetermined wireless communication. In some embodiments, connection 383/385 may be wireless communications of one or more of: low power, short range, low bandwidth, higher power, long range, higher bandwidth, combinations thereof, and/or the like.

In some embodiments, the Internet 365 may also in communication with a different cellular connection 371. In some embodiments, this different cellular connection 371 may be in communication with the at least one computing-device 373. In some embodiments, the set of instructions (e.g., NINCE 367) may cause communications from the set of instructions (e.g., NINCE 367) to the at least one computing-device 373 to flow from the at least one server 309 through at least a different portion of the Internet 365, then to the different cellular connection 371, and then to the at least one computing-device 373. In some embodiments, communications from at least one computing-device 373 to the set of instructions (e.g., NINCE 367) may flow from the at least one computing-device 373 to the different cellular connection 371, to at least some different portion of the Internet 365, and then to the at least one server 309 for interaction with the set of instructions (e.g., NINCE 367).

In some embodiments, the certain predetermined conditions may be when the primary radio 507*a* is able to establish a wireless connection with the gateway 361 and the at least one monitoring-device 100 has not received a command to switch over to using the secondary radio 507*b*, wherein the wireless connection between the primary radio 507*a* and the gateway 361 may be a low power wireless connection using a low power wireless communication protocol. In some embodiments, the low power wireless connection/communications between primary radio 507*a* and gateway 361 may be lower power than the connection 383/385. See also FIG. 8A and FIG. 8B.

In some embodiments, the certain different predetermined conditions may be when primary radio 507*a* is either unable to establish a wireless connection with gateway 361 or the at least one monitoring-device 100 has received a command to switch over to using the secondary radio 507*b*. See also FIG. 8A and FIG. 8B.

In some embodiments, such a radio switch over command may come from the set of instructions (e.g., NINCE 367). In some embodiments, such a radio switch over command may originate from the set of instruction (e.g., NINCE 367) and/or from (an authorized) computing-device 373.

In some embodiments, the system may comprise gateway 361. In some embodiments, gateway 361 may be solar powered. In some embodiments, gateway 361 may part of an ad hoc wireless network. In some embodiments, at least some portion of the ad hoc wireless network may be solar powered. In some embodiments, gateway 361 may be located on storage facility 345, wherein storage facility 345 may include the at least one storage unit 101.

In some embodiments, the set of instructions (e.g., NINCE 367) may be configured to perform one or more of the following: (a) instruct the at least one monitoring-device 100 in how to function; (b) receive information (such as, but not limited to, sensor 505 data) from the at least one monitoring-device 100; (c) interpret at least some of the information received from the at least one monitoring-device 100; (d) convert at least some of the information received from the at least one-monitoring-device 100; (e) transmit at least some of the information from the at least one-monitoring-device 100 that has been received, interpreted, and/or converted by the set of instructions (e.g., NINCE 367) to the at least computing-device 373 (according to the flows of FIG. 3C); (f) receive commands from at least one computing-device 373; (g) execute at least some of the commands received from the at least one computing-device 373 on the at least one server 309; (h) interpret at least some of the commands received from the at least one computing-device 373; (i) convert at least some of the commands received from the at least one computing-device 373; and (j) transmit at least some of the commands from the at least one computing-device 373 that have been received, interpreted, and/or converted by the set of instructions (e.g., NINCE 367) to the at least one monitoring-device 100.

Figure 4:
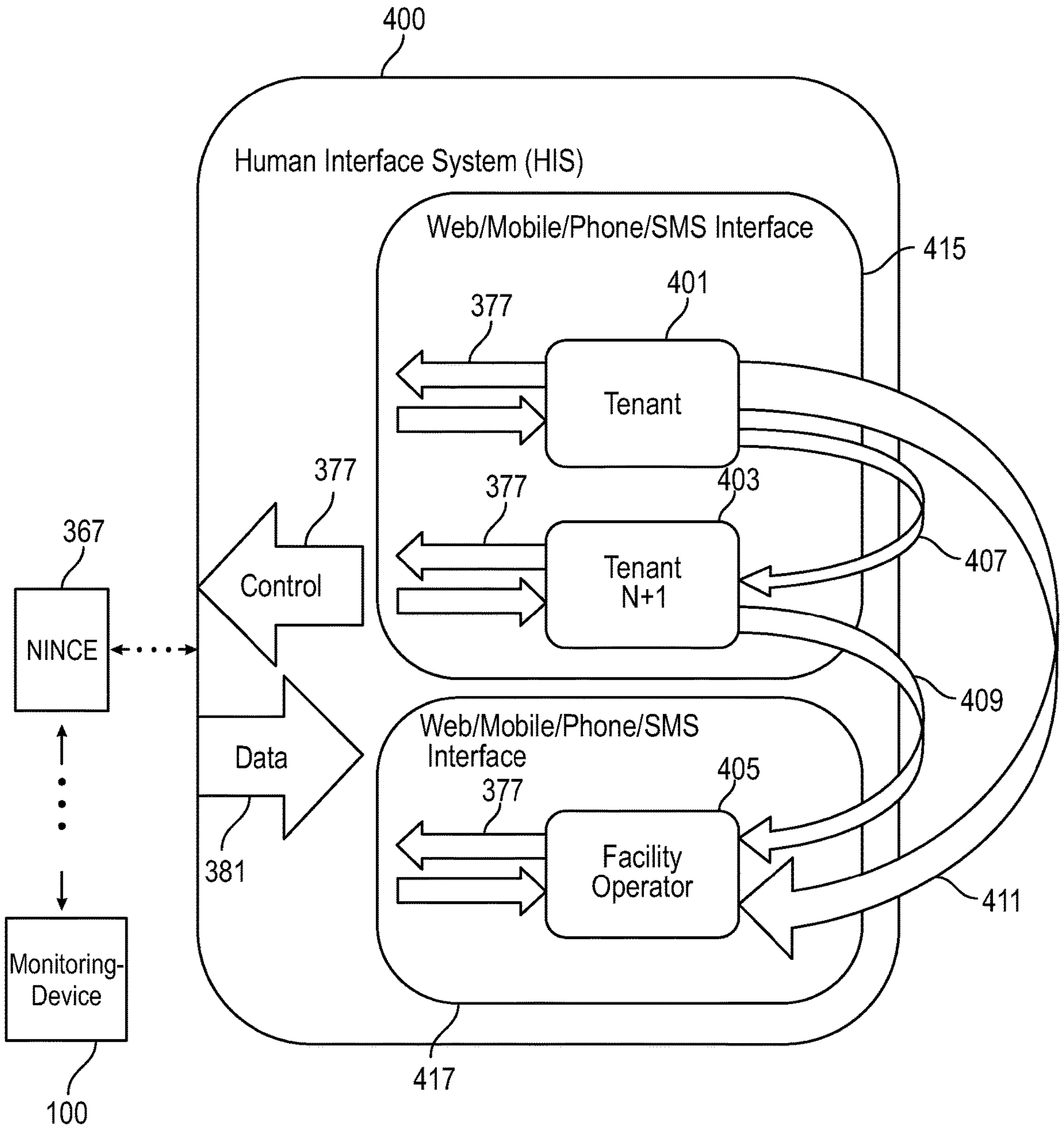
FIG. 4 may be schematic block flow diagram showing application of a decision logic tree where communications between an initial tenant/owner of a given storage unit 101 with a "Network Intelligent Notification & Configuration Engine" ("NINCE") (i.e., proprietary software) may impact communications between the NINCE and other authorized stakeholders (such as, but not limited to, other tenants/owners and/or a facility operator).

FIG. 4 may be schematic block flow diagram showing application of a decision logic tree where communications between an initial tenant (Tenant 401) of a given storage unit 101 with NINCE 367 may impact communications between NINCE 367 and one or more other authorized tenant 401 contacts (which may include trusted escalation contacts, back-up contacts, support personnel, combinations thereof, and/or the like—all specified by tenant 401) (referred to herein as "Tenant N+1" 403); how communications between the tenant 401 authorized contact(s) (Tenant N+1 403) of the given storage unit 101 with NINCE 367 may impact communications between NINCE 367 and the storage unit facility operator 405; and/or how communications between the initial tenant (Tenant 401) of the given storage unit 101 with NINCE 367 may impact communications between NINCE 367 and the storage unit facility operator 405. In FIG. 4, HIS 400 may be shown divided into two of its sub-portions, that of interface to tenant device 415 (e.g., for interfacing with tenant device 303) and that of interface to facility operator device 417 (e.g., for interfacing with facility operator device 305). While other interfaces are not shown in FIG. 4, HIS 400 may have at least one such interface for each computing-device 373 that may be in communication with NINCE 367; or HIS 400 may have at least one such interface for each category of authorized stakeholder that may be in communication with NINCE 367 through their respective computing-devices 373.

For example, and without limiting the scope of the present invention, NINCE 367 may communicate some event/alert/incident/status change/information updates to Tenant 401 pertaining to that Tenant's 401 storage unit 101 from information generated by a monitoring-device 100 installed in that storage unit 101; then depending upon how (or even if) that Tenant 401 responds to the event/alert/incident/status change/information update communication from NINCE 367, NINCE 367 may contact/communicate with Tenant N+1 403 and/or with the Facility Operator 405 for that given storage unit 101. For example, and without limiting the scope of the present invention, the event/alert/incident/status change/information update may be of a possible fire, flooding, break-in, natural disaster, intrusion, device malfunction, sensor 505 data (e.g., motion, temperature, humidity, water, etc.) that exceeds established real-time sensor data thresholds, combinations thereof, and/or the like. In some embodiments, Tenant N+1 403 may be a tenant of the storage unit 101 along with the Tenant 401, i.e., Tenant 401 and Tenant N+1 403 may be joint or co-tenants together of the same storage unit 101. In some embodiments, Tenant N+1 may be a tenant of a different storage unit 101 from that of Tenant 401's storage unit 101. In some embodiments, the storage unit 101 of Tenant 401 and the storage unit 101 of Tenant N+1 may be adjacent or proximate storage units, physically close together. For example, and without limiting the scope of the present invention, after NINCE 367 communicates the event/alert/incident/status change to Tenant 401, NINCE 367 may be expecting some communication back from Tenant 401 (such as, but not limited to, an escalation command, a de-escalation command, an ignore command, etc.). Depending on how (or if) Tenant 401 responds to the NINCE 367 communication of the event/alert/incident, NINCE 367 may then contact/communicate with Tenant N+1 403 and/or with the Facility Operator 405. In some embodiments, in these above examples, the decision logic may be deterministic, based on: response communications from Tenant 401, from Tenant N+1 403, from Facility Operator 403, and/or from some other authorized stakeholder; lack of response communications from Tenant 401, from Tenant N+1 403, from Facility Operator 403, and/or from some other authorized stakeholder; timing of a response communication from Tenant 401, from Tenant N+1 403, from Facility Operator 403, and/or from some other authorized stakeholder; combinations thereof, and/or the like.

Continuing discussing FIG. 4, in some embodiments, hierarchy relationship 407, hierarchy relationship 409, and hierarchy relationship 411 (shown as arrows in the right side of FIG. 4) may not be communications pathways, but rather may illustrate the hierarchal relationships, based on deterministic logic as noted above. For example, and without limiting the scope of the present invention, hierarchy relationship 407 may indicate whether and how NINCE 367 communicates with Tenant N+1 403 may depend upon how, what, if, and/or when Tenant 401 responds/communicates with NINCE 367. For example, and without limiting the scope of the present invention, hierarchy relationship 409 may indicate whether and how NINCE 367 communicates with Facility Operator 405 may depend upon how, what, if, and/or when Tenant N+1 403 responds/communicates with NINCE 367. For example, and without limiting the scope of the present invention, hierarchy relationship 411 may indicate whether and how NINCE 367 communicates with Facility Operator 405 may depend upon how, what, if, and/or when Tenant 401 responds/communicates with NINCE 367.

Also note as an example in FIG. 4, and without limiting the scope of the present invention, the HIS of Tenant 401 and/or of Tenant N+1 403, of communications between that Tenant 401 and/or that Tenant N+1 403 and NINCE 367, may be via SMS messaging (and/or text messaging) via their associated tenant device 303; and communications from NINCE 367 to that Tenant 401 and/or that Tenant N+1 403, received at the given tenant device 303, may also be via SMS messaging (and/or text messaging). However note, in some embodiments, communications between Tenant 401 (and/or Tenant N+1 403) with NINCE 367, may not be limited to just SMS messaging (and/or text messaging); that is, web portals via a web browser, mobile app, instant messaging, voice commands with phone calls, combinations thereof, and/or the like may also be interface means of the HIS 400.

Also note as an example in FIG. 4, and without limiting the scope of the present invention, the HIS of Facility Operator 405 of communications between Facility Operator 405 and NINCE 367, may be via web portal (via web browser), mobile app, voice command with phone calls, SMS messaging (and/or text messaging), combinations thereof, and/or the like via their associated facility operator device 305; and communications from NINCE 367 to that Facility Operator 405, received at the given facility operator device 305, may also be via web portal (via web browser), mobile app, voice command with phone calls, SMS messaging (and/or text messaging), combinations thereof, and/or the like.

Note, in some embodiments, in FIG. 4 the hierarchy relationship 407 between Tenant 401 and Tenant N+1 403 may not be direct communications; rather, any communications between Tenant 401 and Tenant N+1 403 may be routed through and controlled by NINCE 367, according to the flows shown in FIG. 3C.

Similarly, in some embodiments, in FIG. 4 the hierarchy relationship 409 between Tenant N+1 403 and Facility Operator 405 may not be direct communications; rather, any communications between Tenant N+1 403 and Facility Operator 405 may be routed through and controlled by NINCE 367, according to the flows shown in FIG. 3C.

Similarly, in some embodiments, in FIG. 4 the hierarchy relationship 411 between Tenant 401 and Facility Operator 405 may not be direct communications; rather, any communications between Tenant 401 and Facility Operator 405 may be routed through and controlled by NINCE 367, according to the flows shown in FIG. 3C.

In some embodiments, depending on the interaction (such as, but not limited to, a positive response, a "yes" response, a negative response, a "no" response, an acknowledgment, and/or a specific [and predetermined] action cue word) of one authorized person (such as, but not limited to, Tenant 401, Tenant N+1 403, Facility Operator, maintenance staff, insurance personnel, law enforcement personnel, fire department personnel, first responder personnel, etc.), the system and/or the method (e.g., NINCE 367) may respond and provide interaction/communications (such as, but not limited to, notices, messaging, alerts, responses) to other authorized persons (such as, but not limited to, other: Tenant 401, Tenant N+1 403, Facility Operator, insurance personnel, law enforcement personnel, fire department personnel, first responder personnel, etc.), with optional escalation or de-escalation, for increased real-time (or near real-time) responsiveness and/or intelligence. Further in FIG. 4, communications from NINCE 367 to the other authorized persons, may occur sequentially or may occur concurrently.

Figure 5A:
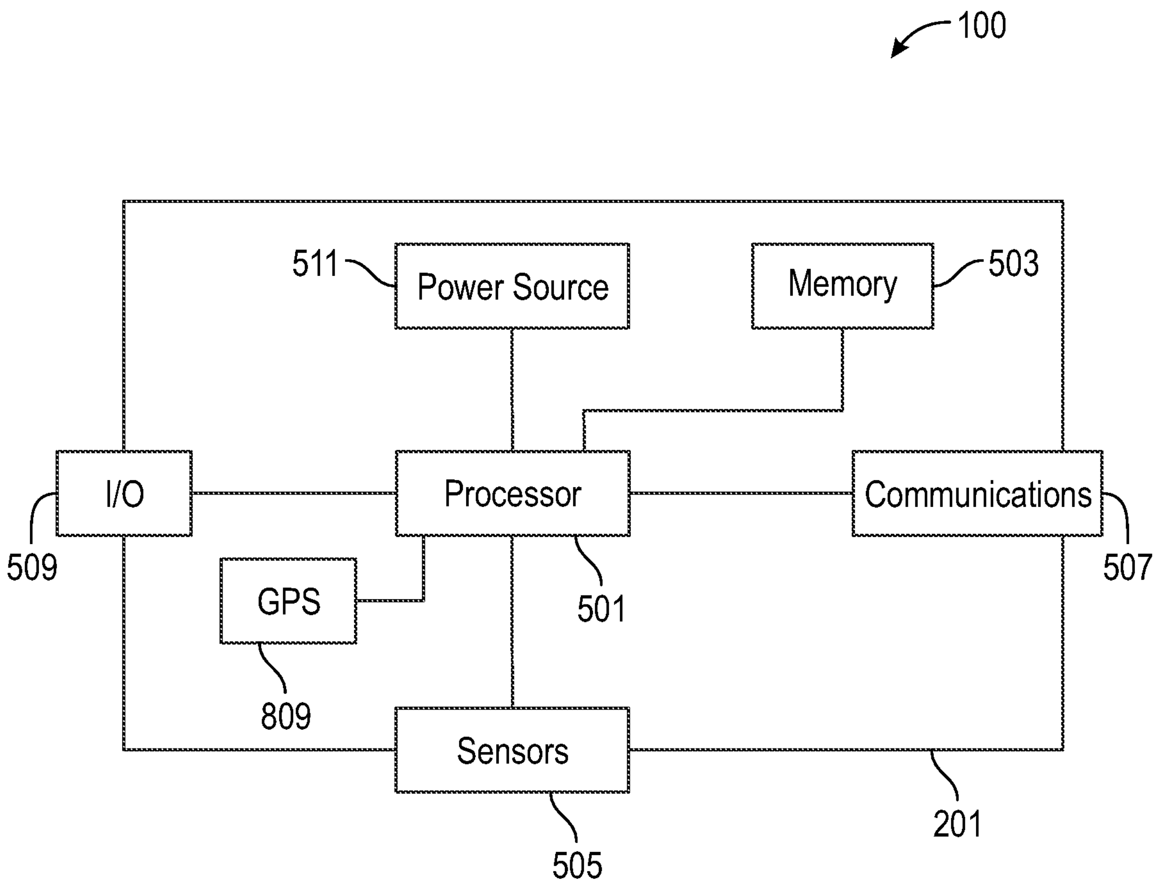
FIG. 5A may depict a block diagram of hardware/electronic/circuit elements of a given monitoring-device.

FIG. 5A may depict a block diagram showing at least some electronics of a given monitoring-device 100. In some embodiments, monitoring-device 100 may be a computer. In some embodiments, monitoring-device 100 may be a computing device. In some embodiments, one or more monitoring-devices 100 may be used to monitor its given storage space 101.

Continuing discussing FIG. 5A, in some embodiments, monitoring-device 100 may comprise one or more circuits. In some embodiments, monitoring-device 100 may comprise a printed circuit board (PCB) or may comprise one or more such PCBs. In some embodiments, the electronics and/or electronic hardware of monitoring-device 100 may be implemented via one or more PCBs. In some embodiments, monitoring-device 100 may comprise one or more of the following sub-hardware elements (components): one or more processors 501, one or more memory 503, one or more sensors 505, one or more communications 507 (for external communications), I/O means 509, and power source 511. "I/O" herein may refer to "inputs/outputs" as is commonly known in the computing and electronics industries. In some embodiments, the one or more processors 501 may be electrically and/or optically coupled (e.g., via wiring, cabling, bus, and/or the like) with the one or more memory 503, one or more sensors 505, one or more communications 507, I/O means 509, and power source 511. In some embodiments, at least some of processors 501, one or more memory 503, one or more sensors 505, one or more communications 507, I/O means 509, and/or power source 511 may be operationally linked with one another, such as via electrical wired connections. In some embodiments, processor(s) 501, memory 503, sensor(s) 505, primary sensor 505*a*, secondary sensor 505*b*, communications 507, primary radio 507*a*, secondary radio 507*b*, I/O means 509, power source 511, daughter board 513, GPS module 809, portions thereof, combinations thereof, and/or the like of monitoring-device 100 may be implemented via one or more PCBs.

In FIG. 5A, processor 501 may be one or more processors, including one or more central processors and/or one or more processors for graphics. In some embodiments, processor 501 may be in communication with one or more memory 503. In some embodiments, processor 501 may be in communication with one or more sensors 505. In some embodiments, processor 501 may be in communication with communications 507. In some embodiments, processor 501 may be in communication with I/O Means 509. In some embodiments, processor 501 may be in communication with power source 511. In some embodiments, such communications may be facilitated via wired connections for electrical (and/or optical) communications. In some embodiments, processor 501 may receive electrical power necessary for operations from power source 511.

In some embodiments, the one or more sensors 505 may be used to monitor the given storage space 101. In some embodiments, the one or more sensors 505 may be one or more of: motion detection sensors; PIR (passive infrared) sensor (e.g., for detecting motion); acceleration sensor (e.g., accelerometer); inertial sensor; positional sensor; orientation sensor; gyroscope; vibration sensor; storage unit 101 door movement sensor; storage unit 101 door open or closed sensor; storage unit 101 window movement sensor; storage unit 101 window open or closed sensor; storage unit 101 window break sensor; rodent intrusion sensor; touch sensor; change in resistance sensor; change in capacitance sensor; change in magnetic field sensor; temperature sensor; humidity sensor; sound sensor (e.g., one or more microphones); chemical sensor (e.g., to detect odors and/or chemicals); particulate sensor (e.g., to detect smoke or dust); water detection sensor; light sensor (darkness sensor); light level sensor; light of storage unit 101 on or off; location sensor (e.g., GPS module 809 and/or chip); camera(s) coupled to at least one sensor, combinations thereof, and/or the like. In some embodiments, the sound/acoustic sensors (e.g., microphones) may be used for detecting environmental abnormalities/occurrences, such as entry; but also, may be used for voice recognition features and/or functions. In some embodiments, a field of view of the one or more sensors 505 of a given monitoring-device 100 may be directed at a door and/or at a window of the given storage space 101. In some embodiments, the one or more sensors 505 may be used to monitor door and/or window open/closed status, temperature, humidity of the given storage space 101. In some embodiments, the one or more sensors 505 may be used to monitor motion of a door and/or of a window of the given storage space 101. In some embodiments, sensor 505 reading(s) may include time and date information (i.e., a timestamp) of when each given sensor 505 reading(s) was taken/generated. In some embodiments, this timestamp data may be communicated along with the sensor 505 readings data itself.

In some embodiments, the one or more sensors 505 may be used to measure, read, determine, generate, and/or capture sensor data within a controlled space and/or detect an event and/or an occurrence within or in at least some portion of the given storage space 101 being monitored. In some embodiments, that detected event, occurrence, sensor 505 data/reading, timestamp, combinations thereof, and/or the like may be communicated (wirelessly in some embodiments) to one or more of: NINCE 367, computing-device 373, tenant device 303, facility operator device 305, provider device 309, third party device 311, a mobile app, a webpage of a website, wherein this communication may utilize communications 507 of the monitoring-device 100 whose sensors 505 detected the event and/or occurrence.

In some embodiments, the inputs of I/O means 509 of a given monitoring-device 100 may be one or more inputs selected from: inputs from fingerprint-scanner or detector; inputs from a keypad; a touchscreen of monitoring-device 100; buttons of monitoring-device 100; switches of monitoring-device 100; keyboard of monitoring-device 100; stylus of monitoring-device 100; mouse of monitoring-device 100; trackball of monitoring-device 100; touchpad of monitoring-device 100; lever of monitoring-device 100; slide of monitoring-device 100; dials of monitoring-device 100; camera(s) of monitoring-device 100; proximity detectors of monitoring-device 100 (e.g., RFID/NFC/BT reader/receiver/scanner); hardwired electrical power ports (e.g., a USB port or the like) of monitoring-device 100; hardwired data ports (e.g., a USB port or the like) of monitoring-device 100; incoming communications received via communications 507 of monitoring-device 100; microphones of monitoring-device 100; and/or the like. In some embodiments, I/O means 509 may comprise a GPS chip set or GPS-module and/or the like for determining a position (or a location) of monitoring-device 100. In some embodiments, the camera may be have its own microphones.

In some embodiments, the inputs of I/O means 509 of a given monitoring-device 100 may comprise at least one camera configured to capture external images, video, and/or audio from outside of monitoring-device 100. In some embodiments, such camera(s) may be digital. In some embodiments, such data generated and/or captured from such camera(s) may be non-transitorily store in memory 503. In some embodiments, such camera(s) may have infrared capability and/or low visible light image capturing capability.

In some embodiments, the outputs of I/O means 509 may be one or more outputs selected from: monitoring-device 100 external facing light(s); information/content displayed on a monitor, screen (including a touchscreen), or display of monitoring-device 100; readouts of monitoring-device 100; speakers of monitoring-device 100; buzzers, sirens, horns, of monitoring-device 100; bells of monitoring-device 100; whistles of monitoring-device 100; lights (LEDs) of monitoring-device 100 (such as, but not limited to, indicator lighting, alarm lighting, strobe lighting); alarms of monitoring-device 100; scanners of and/or in communication with monitoring-device 100; printers of and/or in communication with monitoring-device 100; outgoing information transmitted via the hardwired port (e.g., a USB port or the like) of monitoring-device 100; outgoing information transmitted via communications 507, and/or the like.

Continuing discussing FIG. 5A, in some embodiments, processor 501 may execute a computer program known as an operating system (e.g., a Microsoft Windows operating system, a Linux operation system, an Apple and/or Macintosh operating system, a mobile computing device operating system, any other suitable operating system, and/or combinations thereof) which may control the execution of other computer programs (e.g., application programs); and may provide for scheduling, input/output (I/O) and other hardware device control, accounting, compilation, storage assignment, data management, memory management, communication; and/or dataflow control. Collectively, processor 501 and its operating system may define a computer platform for which the application programs and other computer program languages may be written in. In some embodiments, processor 501 may also execute one or more computer programs to implement various functions and/or methods of the present invention, such as storage space monitoring software. These computer programs may be written in any type of computer program language, including, but not limited to, a procedural programming language, object-oriented programming language, macro language, script language, and/or combinations thereof.

These computer programs, including the operating system and/or application programs, may be stored (e.g., non-transitorily stored) in memory 503. Note, memory 503 and/or storage 503 may be used interchangeably herein. Memory 503 may store (hold) information on a volatile or non-volatile medium, and may be fixed and/or removable. Memory 503 may include a tangible computer readable and computer writable non-volatile recording medium, on which signals are stored that define a computer program or information to be used by the computer program. The recording medium may, for example, be disk memory, flash memory, flash memory card, micro-SD card, SD card storage, and/or any other article(s) of manufacture usable to record and store information (in a non-transitory fashion). In some embodiments, in operation, processor 501 may cause(s) data (such as, but not limited to, user account data, user profile data, user preference data, event occurrence logs, usage logs, access logs, keystroke logs, camera captures [e.g., photos and/or video], microphone captures [e.g., audio captures], GPS/positional information, movement/translation information, fingerprint scans, fingerprint reference files, usernames, passwords, passcodes, environmental data logs, etc.) to be read from the nonvolatile recording medium into a volatile memory (e.g., a random access memory, or RAM) that may allow for more efficient (i.e., faster) access to the information by the processor 501 as compared against the nonvolatile recording medium. Such RAM memory may be located in/on the memory 503 and/or in/on processor 501. See e.g., FIG. 5A. The processor 501 may manipulate(s) the data within integrated circuit memory and may then copy the data to the nonvolatile recording medium after processing may be completed. A variety of mechanisms are known for managing data movement between the nonvolatile recording medium and the integrated circuit memory element, and the invention is not limited to any mechanism, whether now known or later developed. The invention is also not limited to a particular processing unit (e.g., processor 501) or storage unit (e.g., memory 503).

Note, each and every method and/or step discussed herein and as depicted in the figures may be implemented as non-transitory computer-readable medium including software code executable by a processor, such as processor 501. That is, such non-transitory computer-readable medium may be the one or more memory 503 storage units. That is, such a processor may be processor 501; or alternatively, processor 501 may comprise such a processor.

The space monitoring software may be non-transitorily stored in memory 503. In some embodiments, the storage space monitoring software may be distributed across several and different memory 503's of a single monitoring-device 100. In some embodiments, the storage space monitoring software may be distributed across several and different memory 503*s* of several and different monitoring-devices 100. In some embodiments, some portions of the storage space monitoring software (e.g., a user GUI or user cookie, user's data or portion thereof) may be non-transitorily stored in memory 503 of computing-device(s), such as, tenant device 303; wherein other portions of the storage space monitoring software (e.g., user account data, user profile data, user preference data, event occurrence logs, usage logs, access logs, keystroke logs, camera captures [e.g., photos and/or video], microphone captures [e.g., audio captures], GPS/positional information, movement/translation information, fingerprint scans, fingerprint reference files, usernames, passwords, passcodes, environmental data logs, etc.) may be non-transitorily stored in memory 503 of a computing-device, such as, but not limited to, tenant device 303, facility operator device 305, provider device 309, third-party device 311, hub 341, and/or local audible indicator 343. Wherein yet further other portions the storage space monitoring software (e.g., admin's GUI or admin's cookie) may be non-transitorily stored in memory 503 of a computing-device that may be facility operator device 305 and/or provider device 309.

New and/or updates to code, program, software applications, operating system, firmware, and/or the storage space monitoring software may be saved non-transitorily onto memory 503 using I/O means 509 (e.g., communication port 207) and/or using communications 507 (e.g., primary radio 507*a* and/or secondary radio 507*b*).

Continuing discussing FIG. 5A, in some embodiments, processor 501 may also be in communication with communications 507. In some embodiments, processor 501 may control communications 507, depending upon the instructions that processor 501 may be processing/executing. In some embodiments, communications 507 may permit external communications between a given monitoring-device 100 and other computing-devices 373, such as, but not limited to, tenant device 303, facility operator device 305, provider device 309, third-party device 311, hub 341, local audible indicator 343, gateway 361, connection 363, NINCE 367, and/or cellular network 801 (see e.g., FIG. 3A, FIG. 3B, FIG. 3C, and FIG. 8B). In some embodiments, wireless communications from a given monitoring-device 100 that may be utilizing communications 507 may include battery level information and/or signal strength level information. In some embodiments, communications 507 may permit communication between a given monitoring-device 100 and other computing-devices that are not part of that given monitoring-device 100 (e.g., computing-devices 373, tenant device 303, facility operator device 305, provider device 309, third-party device 311, hub 341, local audible indicator 343, gateway 361, connection 363, NINCE 367, and/or cellular network 801); and/or that may not be under the control of a given monitoring-device 100. In some embodiments, communications 507 may permit communication between a given monitoring-device 100 and another different monitoring-device 100. In some embodiments, use of and/or inclusion of communications 507 may facilitate ease of installation for a given monitoring-device 100 as no wiring and/or cabling may be necessary for installation.

In some embodiments, communications 507 may comprise one or more radios and/or one or more antennas to facilitate wireless communications, such as, low power wireless communications, short range wireless communications, LP WAN, LoRa, SigFox, WiFi (Wi-Fi), BT, 802.15, BLE Mesh, ISM radio, Bluetooth, ZigBee, cellular, RFID, NFC, a predetermined wireless communication protocol, a higher power wireless communication protocol, a longer range wireless communication protocol, combinations thereof, and/or the like. In some embodiments, communications 507 may comprise at least one Bluetooth chipset and/or the like. In some embodiments, communications 507 may comprise a network card and/or a network adapter. In some embodiments, communications 507 may be a network card and/or a network adapter. In some embodiments, communications 507 may be in wired and/or wireless communications with the Internet, WAN (wide area network), LAN (local area network) (see e.g., cloud 107 in FIG. 3A). In some embodiments, communications between a given monitoring-device 100 that may rely upon and/or utilize communications 507 and one or more of: another different monitoring-device 100, tenant device 303, facility operator device 305, provider device 309, third-party device 311, hub 341, and/or local audible indicator 343—may be routed through such a network (see e.g., cloud 107 in FIG. 3A). In some embodiments, communications between a given monitoring-device 100 that may rely upon and/or utilize communications 507 and one or more of: another different monitoring-device 100, tenant device 303, facility operator device 305, provider device 309, third-party device 311, hub 341, and/or local audible indicator 343 may be direct and not utilize cloud 107. In some embodiments, communications 507 may provide for non-wired communications to and from a given monitoring-device 100.

In some embodiments, communications 507 may comprise one or more radios and/or antennas to facilitate reading, interrogating, and/or scanning of RFID tags (and/or NFC tags or BT); wherein "RFID" may refer to radio frequency identification and "NFC" may refer to near field communication. In some embodiments, RFID and/or NFC communication may include Bluetooth tags. In some embodiments, such RFID tags and/or NFC tags and/or emitters may emanate from one or more of tenant device 303, facility operator device 305, provider device 309, third-party device 311, hub 341, and/or audible indicator 343.

In some embodiments, communications 507 may comprise one or more radios and/or antennas that function as RFID tags (and/or NFC tags) of monitoring-device 100. In some embodiments, such RFID tags and/or NFC tags may be read, scanned, and/or interrogated by one or more of tenant device 303, facility operator device 305, provider device 309, third-party device 311, hub 341, and/or audible indicator 343.

In some embodiments, power source 511 may provide electrical power to the main sub-hardware elements and/or electronics of monitoring-device 100. In some embodiments, power source 511 may be one or more batteries, fuel cells, combinations thereof, and/or the like. In some embodiments, power source 511 may be one or more rechargeable batteries. In some embodiments, power source 511 may be one or more backup batteries. In some embodiments, power source 511 may be in electrical communication with one more renewable or energy harvesting sources, such as, but not limited to solar power generators, wind power generator, and/or the like. In some embodiments, the integral portable power source 511 (e.g., such as batteries) may provide sufficient electrical power to a given monitoring-device 100 for normal operations. For example, and without limiting the scope of the present invention, fully charged power source 511 may provide sufficient electrical power for operating monitoring-device 100 for at least three to five times longer than the average expected use duration of the transitory self-storage tenants 401. For example, and without limiting the scope of the present invention, fully charged power source 511 may provide sufficient electrical power for operating monitoring-device 100 for three to eight years, in some embodiments and/or in some use scenarios. In some embodiments, use of and/or inclusion of power source 511 (e.g., when power source 511 may be one or more batteries) may facilitate ease of installation for a given monitoring-device 100 as no wiring and/or cabling may be necessary for installation to provide electrical power to the monitoring-device 100.

In some embodiments, power source 511 may be one or more AC/DC adapters or electrical power conditioners allowing monitoring-device 100 to received standardized AC electrical power from wired power source.

The main sub-hardware elements of a given monitoring-device 100, including their workings and configurations, are well known in the relevant computing and electronics industries and such information is incorporated herein by reference.

In some embodiments, monitoring-device 100 may further comprise enclosure 201. In some embodiments, enclosure 201 may house the circuits, PCBs, electronics, hardware, sub-hardware elements (components) of monitoring-device 100. In some embodiments, enclosure 201 may house one or more of: processors 501, memory 503, sensors 505, communications 507, I/O means 509, and/or power source 511. In some embodiments, at least some portions of processors 501, memory 503, sensors 505, communications 507, I/O means 509, and/or power source 511 may be located on an exterior of enclosure 201. In some embodiments, at least some portions of processors 501, memory 503, sensors 505, communications 507, I/O means 509, and/or power source 511 may be at least partially extend from the exterior of enclosure 201. In some embodiments, at least some portions of processors 501, memory 503, sensors 505, communications 507, I/O means 509, and/or power source 511 may be accessible from the exterior of enclosure 201. In some embodiments, a given enclosure 201 may be rated to handle environmental conditions of −40 degrees Fahrenheit to +140 Fahrenheit. In some embodiments, a given enclosure 201 may be rated to handle environmental conditions of dust and/or high humidity. In some embodiments, a given enclosure 201 may be waterproof to substantially waterproof. In some embodiments, a given enclosure 201 may be IP67 rated and/or the like. In some embodiments, a given enclosure 201 may be about four inches, by four inches, by one inch, plus or minus a quarter of an inch. In some embodiments, a given enclosure 201 may be other predetermined, fixed, and non-variable dimensions. In some embodiments, enclosure 201 may be mounted (removably so in some embodiments) to a surface of storage space 101. In some embodiments, mounting of enclosure 201 to a surface of storage space 101 may be via integral mounting hardware 515. In some embodiments, integral mounting hardware 515 may comprise one or more of: mounting-hole 203, mounting magnet 213, adhesive layer 215, mechanical fastener 217, mechanical fastener 217*a*, mechanical fastener 217*b*, nails, screws, bolts, pins, posts, clips, buttons, snaps, tongue and groove, zippers, plurality of loops and complimentary plurality of loops (e.g., Velcro or Velcro like), magnets, tape, adhesive tape, chemical adhesives (such as, but not limited to, epoxy, glue, and/or the like), combinations thereof, and/or the like. In some embodiments, mounting of enclosure 201 to a surface in storage space 101 may be without the need of any tools. Within storage space 101, its structures are often constructed from ferrous (i.e., steel and/or iron) materials, such as, but not limited to studs, walls, doors, casings, door jambs, window frames, ceilings, beams, strapping, combinations thereof, and/or the like, wherein such structures may serve as the surface of storage space 101 that may be removably attached to mounting magnet 213 of monitoring-device 100. The ability to simply attach the monitoring-devices 100 by hand across a plurality of storage units 101, without any tools, directly in place and equivalent remove, and/or redeploy into other storage space 101 is novel.

In some embodiments, enclosure 201 may be substantially constructed of one or more thermoplastics suitable for injection molding. For example, and without limiting the scope of the present invention, some embodiments of enclosure 201 may be substantially constructed of one or more materials of acrylonitrile-butadiene styrene (ABS), polyvinyl chloride (PVC), polycarbonate, nylon, polypropylene, polyethylene (e.g., HDPE), with or without fillers, with or without colorants, combinations thereof, and/or the like.

Note with respect to the materials of construction, it is not desired nor intended to thereby unnecessarily limit the present invention by reason of such disclosure.

Figure 5B:
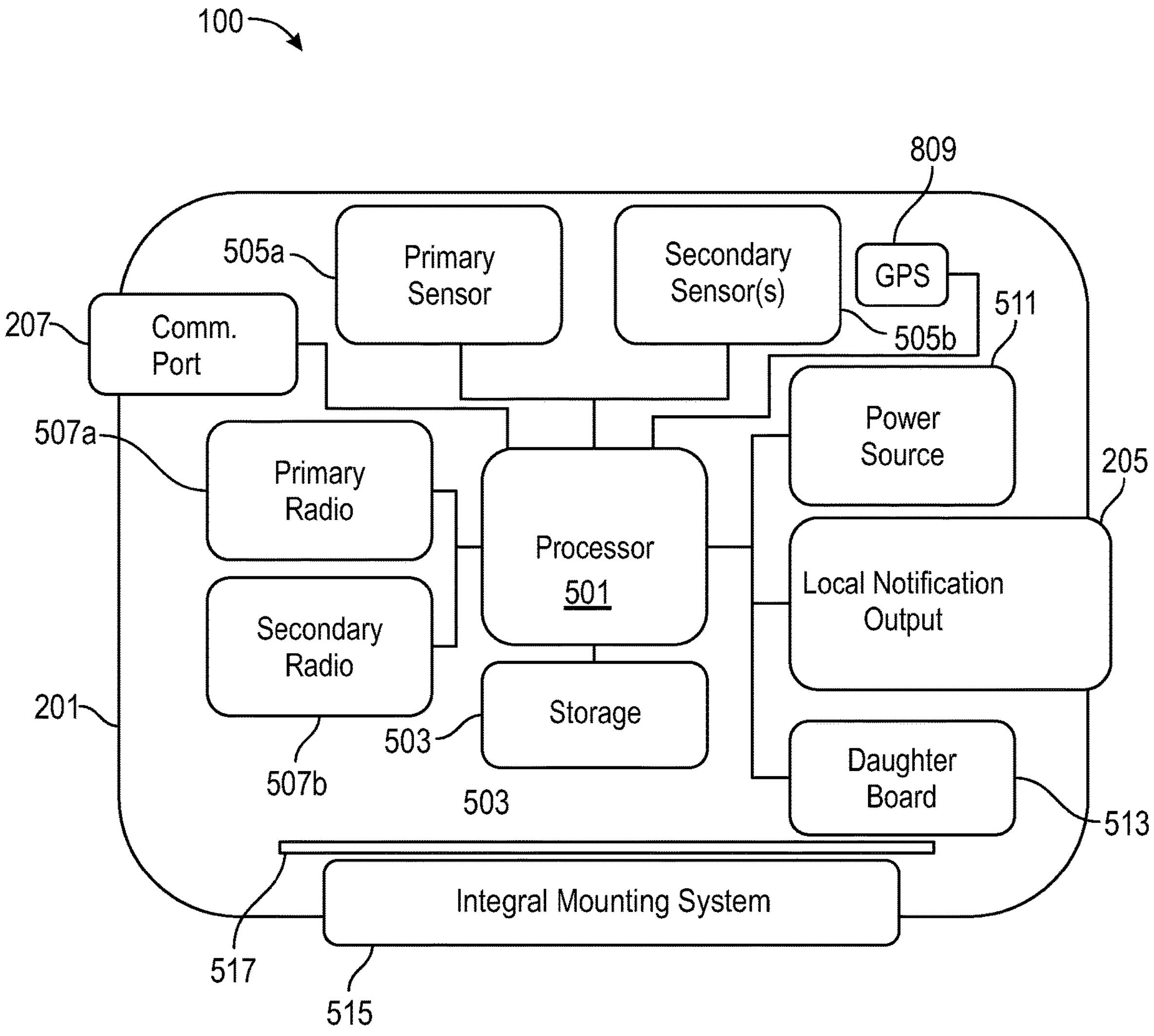
FIG. 5B may depict a block diagram of hardware/electronic/circuit elements of a given monitoring-device.

FIG. 5B may depict a block diagram showing at least some electronics of a given monitoring-device 100. In FIG. 5B, the sensors 505 of the given monitoring-device 100 may comprise at least one primary sensor 505*a* and at least one secondary sensor 505*b*. In some embodiments, primary sensor 505*a* may of a different sensor type as compared to secondary sensor 505*b*. For example, and without limiting the scope of the present invention, in some embodiments, primary sensor 505*a* may be PIR motion detection sensor; and secondary sensor 505*b* may be an accelerometer, a temperature sensor, a humidity sensor, an acoustic sensor, and/or other sensor type. In some embodiments, primary sensor 505*a* and secondary sensor 505*b* may be of a same sensor type.

In some embodiments, at least one of primary sensor 505*a* or secondary sensor 505*b* may be coupled with sensor port 209 in enclosure 201 so that sensor may capture information outside of that given monitoring-device 100.

In some embodiments, primary sensor 505*a* may be coupled with sensor port 209 in enclosure 201 so that primary sensor 505*a* may capture information outside of that given monitoring-device 100; and secondary sensor 505*b* may be located substantially or completely within enclosure 201.

In some embodiments, secondary sensor 505*b* may be coupled with sensor port 209 in enclosure 201 so that secondary sensor 505*b* may capture information outside of that given monitoring-device 100; and primary sensor 505*a* may be located substantially or completely within enclosure 201.

In some embodiments, activation of the at least one secondary sensor 505*b* may depend upon the at least one primary sensor 505*a* obtaining a sensor reading above a predetermined threshold. In some embodiments, activation of the at least one secondary sensor 505*b* may depend upon an escalation event (at the given monitoring-device 100).

Continuing discussing FIG. 5B, in some embodiments, communications 507 of the given monitoring-device 100 may comprise at least one primary radio 507*a* and at least one secondary radio 507*b*. In some embodiments, primary radio 507*a* and secondary radio 507*b* may each comprise its own separate and unique/different antenna configured for wireless communications. In some embodiments, primary radio 507*a* and secondary radio 507*b* may each be configured for a different type of wireless communication.

For example, and without limiting the scope of the present invention, primary radio 507*a* may be configured for low power shorter range wireless communications (such as, but not limited to, LoRa, SigFox, ZigBee, 802.15, BlueTooth, BT-Mesh, BLE, combinations thereof, and/or the like); whereas, secondary radio 507*b* may be configured for higher power longer range communications (comparative to primary radio 507*a*, in some embodiments) (such as but not limited to, cellular, 4G, LTE, 5G, NB-IOT, LTE Cat-M1 as well as LoRa, SigFox, combinations thereof, and/or the like).

For example, and without limiting the scope of the present invention, secondary radio 507*b* may be configured for low power shorter range wireless area network communications (such as, but not limited to, LoRa, SigFox, ZigBee, 802.15, BlueTooth, BT-Mesh, BLE, combinations thereof, and/or the like); whereas, primary radio 507*a* may be configured higher power longer range communications (comparative to secondary radio 507*b* in some embodiments) (such as but not limited to cellular, 4G, LTE, 5G, NB-IOT, LTE Cat-M1, LoRa, SigFox, combinations thereof, and/or the like).

In some embodiments, the low power wireless radio may be preferred over use of a higher power, longer-range wireless radio due to ability to sustain longer battery life; however, if the low power wireless radio is non-functional perhaps due to lack coverage availability, then the higher power wireless radio may be utilized until such time as sufficient satisfactory coverage threshold for the low power wireless radio is sustained. In some embodiments, the low power wireless radio may be preferred over use of a higher power wireless radio which has higher bandwidth; however, if a communication command signal is received to switch over from low power wireless radio to communicate for a short but defined period of duration to communicate and/or stream larger data files (such as video stream or camera images), then the higher power wireless radio may be utilized for an interim period of time but not continuously as to preserve longer battery life. In some embodiments, primary radio 507*a* may comprise an internal antenna that may be completely or mostly located within enclosure 201. In some embodiments, primary radio 507*a* may comprise external antenna 211 that may be at least partially located outside of enclosure 201. In some embodiments, secondary radio 507*b* may comprise an internal antenna that may be completely or mostly located within enclosure 201. In some embodiments, secondary radio 507*b* may comprise external antenna 211 that may be at least partially located outside of enclosure 201.

Continuing discussing FIG. 5B, in some embodiments, the electronics of the given monitoring-device 100 may comprise a daughter board 513. In some embodiments, an additional plug-in board referred to as a daughter board 513 may be operatively linked to processor(s) 501 and/or to PCBs of monitoring-device 100. Provisions for a plug-in daughter board 513 may be optionally included, in some embodiments, to expand functionality of a baseline monitoring-device 100 without: (1) necessarily requiring a newly sized enclosure 201; (2) including a new baseline PCB design or a different PCB design; (3) triggering increased manufacturing costs for having different tooling for different PCBs and/or different sized enclosures 201; and/or (4) increasing the X-Y dimensions (namely the area/footprint) of the baseline PCB in exchange for decreased/smaller Z-axis dimensions of the baseline PCB.

Continuing discussing FIG. 5B, in some embodiments, the given enclosure 201 may comprise an integral mounting hardware 515. In some embodiments, attached to an exterior of enclosure 201 may be integral mounting hardware 515. In some embodiments, part of an exterior of enclosure 201 may be integral mounting hardware 515. In some embodiments, mounting hardware 515 may the means or at least part of the means as to how a given monitoring-device 100 may be mounted/attached to a substrate of the given storage unit 101. In some embodiments, integral mounting hardware 515 may be selected from one or more of: mounting-hole(s) 203, mounting magnet(s) 213, adhesive layer 215, mechanical fastener 217, mechanical fastener 217*a*, mechanical fastener 217*b*, combinations thereof, and/or the like.

Continuing discussing FIG. 5B, in some embodiments, integral mounting hardware 515 may be separated (segregated) from the electronics of the given monitoring-device 100 by magnetic shielding 517. In some embodiments, magnetic shielding 517 may be disposed of between integral mounting hardware 515 and the electronics of the given monitoring-device 100.

Figure 6A:
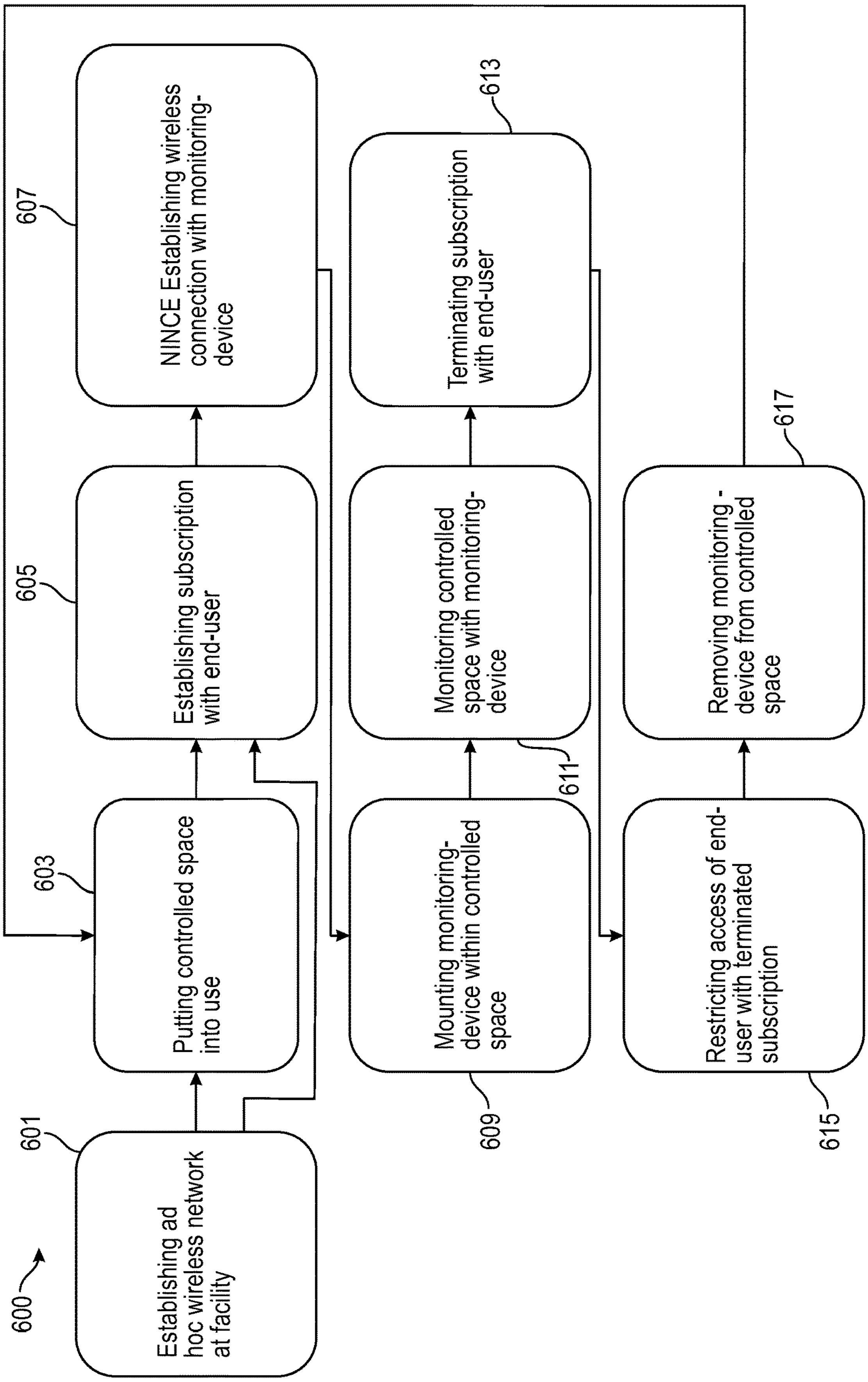
FIG. 6A may depict at least some steps in a flow diagram of a method for establishing messaging based storage unit monitoring (e.g., SMS messaging or other two-way communication mechanisms such as, but not limited to, web alerts/notifications, mobile app notification, and/or voice phone).

FIG. 6A may depict a flow diagram of at least some steps for a method 600. In some embodiments, method 600 may be a method for establishing messaging based storage unit monitoring. In some embodiments, method 600 may be a method for establishing messaging based storage unit monitoring by just-in-time installing monitoring-device(s) 100 at a time of end-user (tenant 401) demand (need). In some embodiments, method 600 may utilize at least one monitoring-device 100 (mounted inside a given storage unit 101) and NINCE 367. In some embodiments, user interface with method 600 may be via that user's computing-device 373. In some embodiments, method 600 may comprise: step 601, step 605, step 607, step 609, and step 611. In some embodiments, method 600 may comprise: step 601, step 603, step 605, step 607, step 609, step 611, step 613, step, 615, and optionally in some embodiments, step 617. In some embodiments, method 600 may comprise one or more of: step 601, step 603, step 605, step 607, step 609, step 611, step 613, step, 615, or step 617. In some embodiments, steps of method 600 need not occur in sequential order of their respective reference numerals.

In some embodiments, method 600 may not comprise step 603, as step 603 may occur outside of method 600.

Continuing discussing FIG. 6A, in some embodiments, step 601 may be a step of setting up an ad hoc wireless network at storage facility 345 that has at least one storage unit 101, wherein that at least one storage unit 101 is intended to be monitored by at least one monitoring-device 100. In some embodiments, the ad hoc wireless network may include gateway 361. In some embodiments, the ad hoc wireless network (with gateway 361) may already exist at storage facility 345. In some embodiments, completion of step 601 may transition method 600 into step 603. In some embodiments, completion of step 601 may transition method 600 into step 605, e.g., when step 603 may already be completed.

Continuing discussing FIG. 6A, in some embodiments, step 603 may be a step of a given storage unit 101 at that storage facility 345 with the now setup ad hoc wireless network, being put into use (e.g., being rented/leased by a given tenant 401). The tenant may desire to remotely monitor that rented/leased storage unit 101 using one or more monitoring-devices 100. In some embodiments, completion of step 603 may transition method 600 into step 605. Also note, in some embodiments, step 603 may have occurred before step 601.

Continuing discussing FIG. 6A, in some embodiments, step 605 may be a step of establishing a subscription with a given end-user, such as, but not limited to, tenant 401 of the rented storage unit 101. In some embodiments, step 605 of establishing a subscription agreement with a tenant 401 of the at least one storage unit 101 may be with respect to using at least one monitoring-device 100 for monitoring of that at least one storage unit 101. In some embodiments, step 605 may be carried out by NINCE 367 receiving required information via HIS 400 (which may be in the form of SMS message, text message, voice call, inputs into a web browser, inputs in a mobile app, instant messaging, combinations thereof, and/or the like) from the prospective end-user (e.g., tenant 401) of that prospective end-user's contact information. In some embodiments, step 605 may occur by the set of instructions (e.g., NINCE 367) receiving tenant information and a tenant affirmation from a computing-device 373 (e.g., tenant device 303) that may be in indirect communication with the at least one server 309, wherein that computing-device 373 may be used by tenant 401. In some embodiments, tenant 401 may use computing-device 373 (e.g., tenant device 303) to provide the required information via HIS 400 to NINCE 367 for establishing the subscription service/agreement. In some embodiments, tenant 401 may be onsite with storage unit 101 and/or with storage facility 345; or tenant 401 may be located remotely from storage unit 101 and/or with storage facility 345—when using HIS 400 to provide the required information to NINCE 367 for establishing the subscription agreement/service. In some embodiments, NINCE 367 may respond by confirming establishment of the subscription with that end-user; and/or NINCE 367 may communicate by requesting further information from the prospective end-user; and/or NINCE 367 may communicate by requesting an acknowledgment of the subscription service from tenant 401. In some embodiments, successful completion of step 605 may be establishment of a subscription service agreement between the end-user (e.g., the tenant) and the provider. In some embodiments, successful completion of step 605 may result in creation of an account for that end-user. In some embodiments, one or more: monitoring-devices 100; storage units 101; and storage facilities may be associated with that account of that end-user. In some embodiments, completion of step 605 may transition method 600 into step 607.

Continuing discussing FIG. 6A, in some embodiments, step 607 may be a step of NINCE 367 establishing a wireless connection with at least one monitoring-device 100, to be associated with that end-user and that end-user account. In some embodiments, step 607 may also be a step of associating that wirelessly connected at least one monitoring-device 100 with a given storage unit 101 and with a given storage facility. In some embodiments, step 607 may be a step of establishing a connection between the set of instructions (e.g., NINCE 367), that non-transitorily resides in memory of at least one server 309 and the at least one monitoring-device 100, using in part either primary radio 507*a* or secondary radio 507*b* of the at least one monitoring-device 100. In some embodiments, step 607 may be a step of linking the subscription agreement with the at least one monitoring-device 100 within NINCE 367. In some embodiments, successful completion of step 607 may result in at least one monitoring-device 100 being wirelessly connected with NINCE 367; and in some embodiments, with that monitoring-device 100 being associated with a given storage unit 101 and with a given storage facility. In some embodiments, completion of step 607 may transition method 600 into step 609.

Continuing discussing FIG. 6A, in some embodiments, step 609 may be a step of mounting/attaching/installing the at least one monitoring-device 100 within the given storage unit 101 associated with that subscribed end-user. In some embodiments, step 609 may be a step of installing at least one monitoring-device 100 into the at least one storage unit 101, wherein the at least one monitoring-device 100 may comprise primary radio 507*a* configured to wirelessly connect to an ad hoc wireless network (and/or gateway 361) using a low power wireless communication protocol, wherein the at least one monitoring-device 100 may comprise secondary radio 507*b* configured to wirelessly connect to connection 383/385, wherein the at least one monitoring-device 100 may comprise at least one sensor 505, wherein primary radio 507*a*, the secondary radio 507*b*, and the at least one sensor 505 may be operatively linked. In some embodiments, step 609 may require that the given at least one monitoring-device 100 has been successfully transported to and within the given storage unit 101. Such transport may be accomplished by the facility operator bringing the given at least one monitoring-device 100 to the given storage unit 101; or by the end-user (or agent thereof) bringing the given at least one monitoring-device 100 to the given storage unit 101. In some embodiments, step 609 may not need any additional tools beyond integral mounting hardware 515. In some embodiments, step 609 may not involve making any wiring connections for electrical power to the given at least one monitoring-device 100; i.e., the given at least one monitoring-device 100 may have its own internal and/or integral power source 511. In some embodiments, step 609 may not involve making any wiring connections for internet/network connectivity for that given at least one monitoring-device 100; i.e., the given at least one monitoring-device 100 may have its own wireless radio(s)/antenna(s) for low power wireless communications (such as, but not limited to, LP WAN, LoRa, BT, ZigBee, etc.) and/or for cellular wireless communications. In some embodiments, successful completion of step 609 may involve the given at least one monitoring-device 100 being mounted/attached/installed within the given storage unit 101. In some embodiments, successful completion of step 609 may involve NINCE 367 receiving an acknowledgment from tenant 401 and/or from facility operator 405, depending upon whether 401 or 405 installed the given at least one monitoring-device 100 in the given storage unit 101, that the given at least one monitoring-device 100 has been properly mounted within the given storage unit 101. In some embodiments, when facility operator 405 may be installing the given at least one monitoring-device 100 in the given storage unit 101, tenant 401 may, through HIS 400 and NINCE 367, request that a communication be transmitted to facility operator 405 asking whether step 609 has been completed; and facility operator 405 via, HIS 400 and NINCE 367, may respond accordingly back to tenant 401. In some embodiments, completion of step 609 may transition method 600 into step 611.

Note, in some embodiments, step 607 and step 609 may be switched, wherein step 605 may transition into step 609, step 609 may transition into step 607, and step 607 may transition into step 611. In some embodiments, step 611 may require successful completion of both step 607 and step 609. In some embodiments, step 611 may require successful completion of step 605, step 607, and step 609.

Continuing discussing FIG. 6A, in some embodiments, step 611 may be a step of the given at least one monitoring-device 100 monitoring that given storage unit 101. In some embodiments, step 611 may be a step of monitoring the at least one storage-unit 101 using the at least one monitoring-device 100, by primary radio 507*a* or secondary radio 507*b* conveying sensor 505 readings from the at least one sensor 505 to the set of instructions (e.g., NINCE 367) operating on the at least one server 309. In some embodiments, during such monitoring, an authorized person (i.e., an authorized stakeholder, such as, but not limited to, tenant 401, facility operator 405, insurance personnel, law enforcement personnel, fire department personnel, first responder personnel, etc.) may interact/communicate both with that given at least one monitoring-device 100 and with NINCE 367 via the HIS 400. In some embodiments, completion of step 611 may transition method 600 into step 613.

Continuing discussing FIG. 6A, in some embodiments, step 613 may be a step of terminating (or suspension) of the subscription with the end-user (e.g., tenant 401). In some embodiments, termination of the subscription may be caused by the end-user, by a facility operator, and/or by the provider of the subscription. In some embodiments, termination may be triggered by a rental/lease period ending, rental/lease not being timely and/or properly paid, subscription not being timely and/or properly paid, a subscription period ending, agreement/contract clause, operation of law, authorized stakeholder conduct, combinations thereof, and/or the like. In some embodiments, completion of step 613 may transition method 600 into step 615.

Continuing discussing FIG. 6A, in some embodiments, step 615 may be a step of restricting access from that end-user with the terminated subscription from interacting with any formerly assigned monitoring-devices 100. In some embodiments, an end-user with a terminated subscription may still have an account and via HIS may still have some limited access to NINCE 367. In some embodiments of method 600, step 615 does not exist, is not part of method 600, or is not necessary for method 600. In some embodiments, completion of step 615 may transition method 600 into step 617.

Continuing discussing FIG. 6A, in some embodiments, step 617 may be a step of (physically) removing any monitoring-devices 100 from the storage unit 101 that has a terminated subscription. In some embodiments, step 617 may result in removed monitoring-devices 100 being made ready for re-deployment (e.g., step 609 and step 607) into use with a new subscription (e.g., step 605) or into use with an existing subscription. In some embodiments, step 617 may be optional. In some embodiments, successful completion of step 617 may transition back into step 603, step 605, step 607, and/or step 609.

Figure 6B:
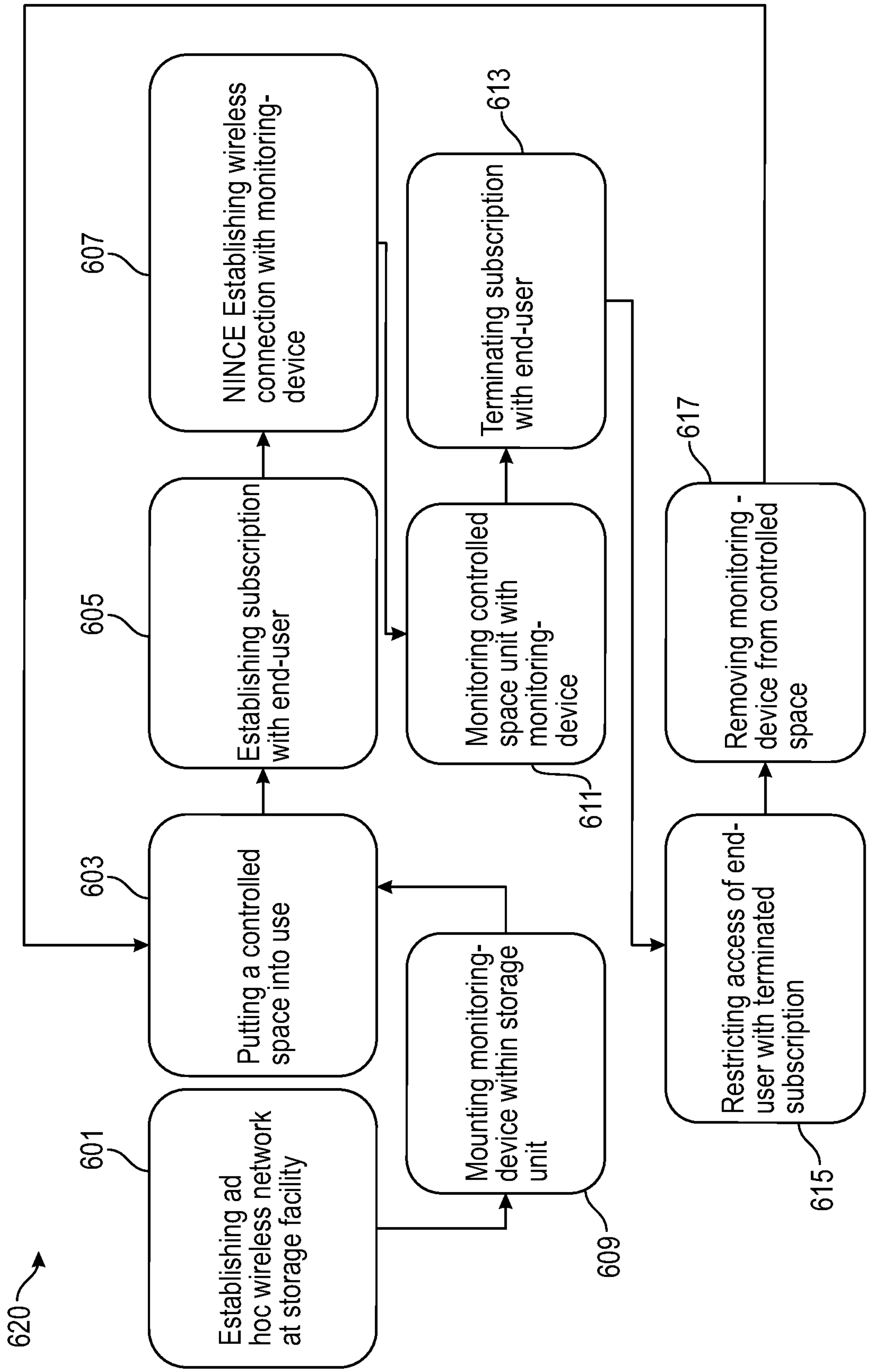
FIG. 6B may depict at least some steps in a flow diagram of a method for establishing messaging based storage unit monitoring (e.g., SMS messaging or other two-way communication mechanisms such as, but not limited to, web alerts/notifications, mobile app notification, and/or voice phone).

FIG. 6B may depict a flow diagram of at least some steps for a method 600. In some embodiments, method 620 may be a method for establishing messaging based storage unit monitoring. In some embodiments, method 620 may be a method for establishing messaging based storage unit monitoring by pre-installing monitoring-device(s) 100 before end-user (tenant 401) demand. In some embodiments, method 620 may utilize at least one monitoring-device 100 (mounted inside a given storage unit 101) and NINCE 367. In some embodiments, user interface with method 620 may be via that user's computing-device 373 via HIS 400. In some embodiments, method 620 may comprise: step 601, step 609, step 605, step 607, and step 611. In some embodiments, method 620 may comprise: step 601, step 609, step 603, step 605, step 607, step 611, step 613, step, 615, and optionally in some embodiments, step 617. In some embodiments, method 620 may comprise one or more of: step 601, step 603, step 605, step 607, step 609, step 611, step 613, step, 615, or step 617. In some embodiments, steps of method 620 need not occur in sequential order of their respective reference numerals. In some embodiments, method 620 may not comprise step 603, as step 603 may occur outside of method 620.

Continuing discussing FIG. 6B, in some embodiments, step 601 may transition into step 609. In some embodiments, the facility operator (that operates that given storage unit facility) may determine which of its storage units 101 are to receive monitoring-devices 100 and may cause those storage units 101 to receive such monitoring-devices 100. In some embodiments, step 609 may transition into step 603 if step 603 has not yet already occurred; or if step 603 has occurred, then step 609 may transition into step 605. In some embodiments, step 603 may transition into step 605. In some embodiments, step 605 may transition into step 607. In some embodiments, step 607 may transition into step 611. In some embodiments, step 611 may transition into step 613. In some embodiments, step 613 may transition into step 615. In some embodiments, successful completion of step 617 may transition back into step 603, step 605, step 607, and/or step 609.

Note, in some embodiments method 600 may differ from method 620. In some embodiments, method 620 may be applicable when a given facility operator of a given storage unit facility wants to utilize monitoring-devices 100 in at least some of its storage units 101, in which case the facility operator may determine which storage units 101 have monitoring-devices 100 and may cause those storage units 101 to have such monitoring-devices 100 mounted/attached/installed within those storage units 101. Whereas, in some applications of method 600, the tenant (end-user) may decide at any time to utilize at least one monitoring-device 100 in their rented storage unit(s) 101.

In some embodiments, in method 600 and/or in method 620 the monitoring-device(s) 100 may be instantly mountable/unmount-able for deployment/redeployment to other storage units 101; and the monitoring service(s) may be quickly turned on or turned off to end-users (e.g., tenants 401) thereby offering a true pay-as-grow subscription-based scalable service that permits facility operators 405 (or owners of the storage facility 345) to avoid the sunk cost of stranded/under-utilized capital assets.

Furthermore, in some embodiments, the subscription-based methods 600 and/or 620 may also charge a fee to the facility operators 405 (or owners of the storage facility 345) when tenant 401 subscriptions are active and/or collect subscription fees from the tenants 401 directly and/or share a commission with the facility operators 405 (or owners of the storage facility 345) thereby eliminating CAPEX, reducing/eliminating OPEX, and/or practically speaking creating a revenue opportunity for the facility operators 405 (or owners of the storage facility 345) (without the need for capital investments).

Figure 7A:
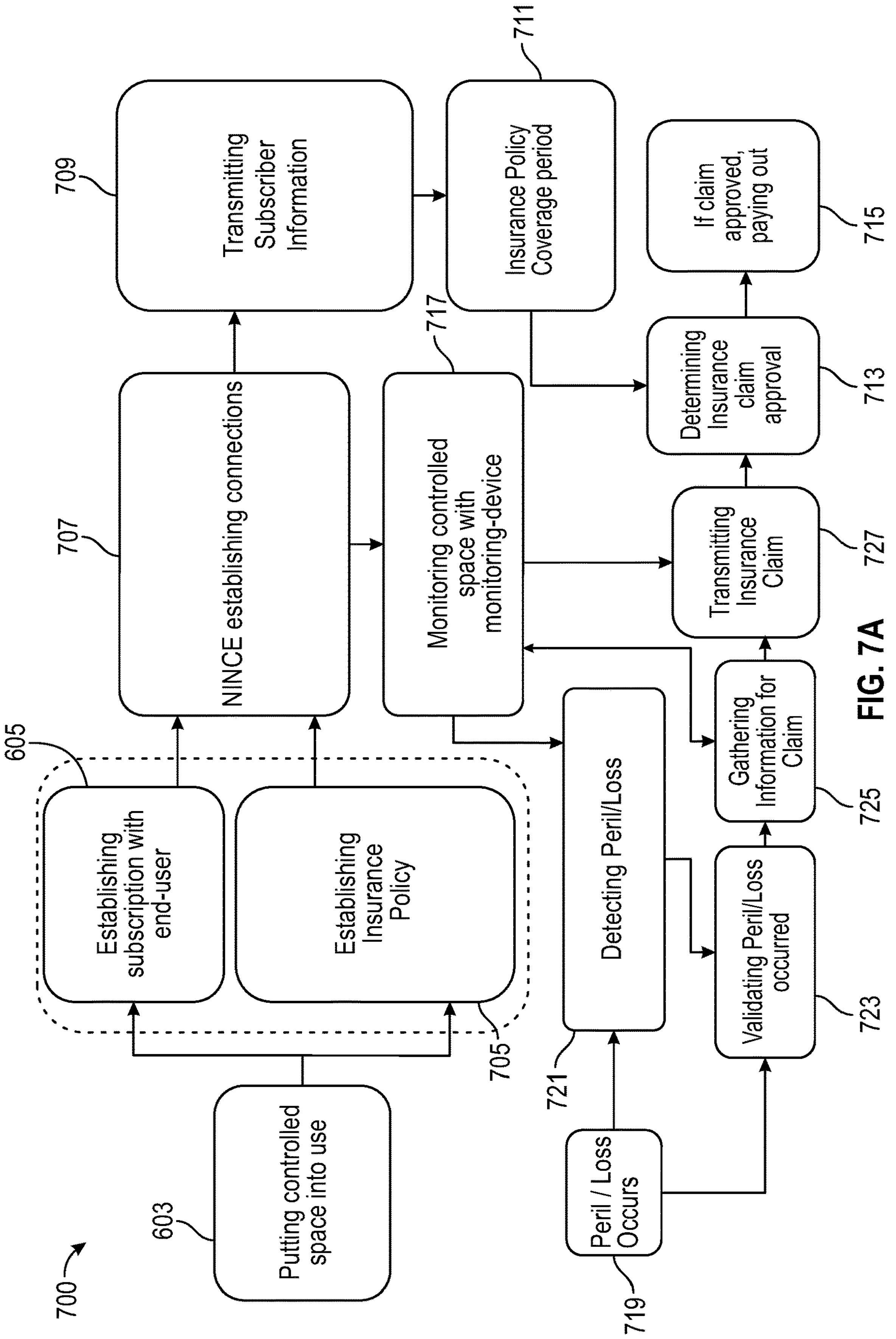
FIG. 7A may depict may depict at least some steps in a flow diagram of a method of processing insurance claim (related to a loss/peril at a monitored storage unit).

FIG. 7A may depict a flow diagram of at least some steps for a method 700. In some embodiments, method 700 may be a method of processing an insurance claim related to a loss or peril that occurred at or within a given storage unit 101 being monitored by at least one monitoring-device 100. In some embodiments, method 700 may utilize at least one monitoring-device 100 (mounted inside a given storage unit 101) and NINCE 367. In some embodiments, method 700 may utilize at least one monitoring-device 100 (mounted inside a given storage unit 101), NINCE 367, and software running on an insurance company's server(s). In some embodiments, the insurance company's server(s) may be a type of computing-device 373 in FIG. 3C; and the insurance company's server(s) that may be a type of computing-device 373 may also be further categorized as a third-party device 311. In some embodiments, communications between NINCE 367 and the insurance company's server(s) may be facilitated by HIS 400 and/or another predetermined software interface of one or more APIs (application program interfaces). In some embodiments, user interface with method 700 may be via that user's computing-device 373 via HIS 400. In some embodiments, computing-device 373 for the tenant may be tenant device 303; computing-device 373 for the facility operator may be facility operator device 305; computing-device 373 for the insurance company personnel may be third-party device 311; and computing-device 373 for the provider of the subscription and monitoring service may be provider device 309.

Continuing discussing FIG. 7A, in some embodiments, method 700 may comprise: step 603, step 605, step 707, step 709, step 609, step 717, step 721, step 723, step 725, and step 727. In some embodiments, step 705, step 711, step 713, and/or step 715 may be outside of (not part of) method 700. In some embodiments, method 700 may comprise: step 603, step 605, step 705, step 707, step 709, step 711, step 713, step 715, step 609, step 717, step 721, step 723, step 725, and step 727. In some embodiments, method 700 may comprise one or more steps of: step 603, step 605, step 705, step 707, step 709, step 711, step 713, step 715, step 609, step 717, step 721, step 723, step 725, or step 727. In some embodiments, at least some steps of method 700 may occur out of numerical order of the steps given assigned reference numerals. In some embodiments, an occurrence of peril/loss at or within the storage unit 101 being monitored with one or more monitoring-devices 100 may be designated "peril/loss occurs 719" and may be a prerequisite for some steps of method 700.

Continuing discussing FIG. 7A, in some embodiments, step 603, step 605, and step 609 in method 700 may be as substantially described above in method 600; except that successful completion of step 603 may transition into both step 605 and into step 705. In some embodiments, step 609 may be prerequisite to step 717 in method 700.

Continuing discussing FIG. 7A, in some embodiments, step 705 may be a step of establishing an insurance policy against loss/peril at or within a given storage unit 101 that is being monitored with one or more monitoring-devices 100. In some embodiments, step 705 may be a step of establishing the insurance policy of the tenant 401 with respect to the at least one storage unit 101 to be monitored or being monitored with at least one monitoring-device 100.

In some embodiments, successful completion of step 705 may require communications between the tenant of the storage unit 101 and the insurance company. Note, in some embodiments, step 705 may occur before, concurrently with, or after step 603 and/or step 605. In some embodiments, successful completion of step 603, step 605, and step 705, may then have method 700 transition into step 707. In some embodiments, step 705 may be outside of method 700, but may be a prerequisite to method 700.

Continuing discussing FIG. 7A, in some embodiments, step 707 may be a step of NINCE 367 establishing relevant connections. In some embodiments, step 707 may comprise NINCE 367 establishing a wireless connection between NINCE 367 and the at least one monitoring-devices 100 that are installed in the given storage unit 101. In some embodiments, step 707 may comprise NINCE 367 establishing a communication connection between NINCE 367 and at least one server of the insurance company 771 (e.g., via APIs). In some embodiments, step 707 may be a step of establishing a connection between the set of instructions (e.g., NINCE 367), that non-transitorily resides in memory of at least one server 309 and the at least one monitoring-device 100, using in part either primary radio 507*a* or the secondary radio 507*b* of the at least one monitoring-device 100. In some embodiments, step 707 may be a step of linking the subscription agreement, the at least one monitoring-device 100, and the insurance policy of tenant 401 with respect to the at least one storage unit 101 being monitored with the at least one monitoring-device 100. In some embodiments, step 707 may comprise NINCE 367 establishing a communication connection between NINCE 367 and at least one computing-device 373 of the facility operator (e.g., at least one facility operator device 305). In some embodiments, upon successful completion of step 707 any of the authorized persons (e.g., the tenant/subscriber, insurance company personnel, facility operator personnel, subscription/monitoring service personnel, etc.) may access/interact (e.g., through HIS) with NINCE 367 and/or any monitoring-devices 100 installed in that given storage unit 101 being monitored with the at least one monitoring-device 100. In some embodiments, successful completion of step 707 may transition method 700 in step 709 and into step 717.

Continuing discussing FIG. 7A, in some embodiments, step 709 may be a step of NINCE 367 electronically transmitting various tenant 401/subscriber information to at least one server of the insurance company 771. In some embodiments, step 709 may be a step of transmitting information of tenant 401, the at least one monitoring-device 100, the at least one storage-unit 101, and a storage facility 345 where the at least one storage unit 101 is located, from the at least one server 309 (from NINCE 367) to at least one server of the insurance company 771 (insurance carrier) of the insurance policy covering at least some of the contents of that storage unit 101. In some embodiments, the tenant 401/subscriber information transmitted may comprise one or more of: name of tenant 401/subscriber; identifying information for that tenant 401/subscriber; biometric information for that tenant 401/subscriber; contact information for that tenant 401/subscriber; storage unit 101 being monitored information (e.g., designation, size, location, characteristics, access information, etc.); storage unit 101 contents information (e.g., the items being insured against loss, the monetary value of loss coverage desired, value of items being insured against loss, etc.); storage facility information (e.g., address, contact information, map); monitoring-devices 100 information (e.g., quantity, designation(s)/name(s), models, model numbers, serial numbers, IP/MAC addresses, etc.) being used in that storage unit 101; combinations thereof, and/or the like. In some embodiments, the insurance company may already have some of this tenant/subscriber information, and for such information the insurance company may use such information for validation and/or cross-referencing purposes. In some embodiments, successful completion of step 709 may result in method 700 transitioning into step 711.

Continuing discussing FIG. 7A, in some embodiments, step 711 may be a step of initiating the insurance policy coverage period for the given storage unit 101 being monitored with at least one monitoring-device 100. In some embodiments, step 711 may be outside of method 700. In some embodiments, step 711 may transition into step 713.

Continuing discussing FIG. 7A, in some embodiments, step 717 may be a step of monitoring the given storage unit 101 with the at least one monitoring-device 100. In some embodiments, step 717 may be a step of monitoring the at least one storage-unit 101 using the at least one monitoring-device 100, by the primary radio 507*a* or the secondary radio 507*b* conveying sensor 505 readings from the at least one sensor 505 to the set of instructions (e.g., NINCE 367) operating on the at least one server 309. Thus, step 717 may be similar to step 611 in method 600; however, in some embodiments, step 717 may also entail (automatically) sharing data from the at least one monitoring-device 100 with the insurance company; and/or insurance company personnel being able to interact/access, through HIS, with NINCE 367 and the at least one monitoring-device 100. In some embodiments, flows occurring in step 717 may follow the flows shown in FIG. 3C and in FIG. 4. In some embodiments, step 717 may yield step 721, step 725, and/or step 727.

Continuing discussing FIG. 7A, in some embodiments, some form of peril/loss may occur 719 at or within the given storage unit 101 being monitored with the at least one monitoring-device 100. In some embodiments, perils may be loss and/or harm from one or more of burglary, theft, leak, water, flood, storm, rain, snow, sleet, hail, mold, fire, smoke, contamination, wind, tornado, lighting, heat, earthquake, freeze, rodents, combinations thereof, and/or the like. In some embodiments, peril/loss occurring 719, may yield step 721 and/or step 723.

Continuing discussing FIG. 7A, in some embodiments, step 721 may be a step of the at least one monitoring-device 100 detecting the peril/loss (719) that has occurred (or is occurring) at or within the given storage unit 101 being monitored. In some embodiments, step 721 may be a step of detecting the peril/loss (719) event at the at least one storage unit 101 from at least one sensor 505 reading of the at least one monitoring-device 100. In some embodiments, step 721 may be a step of transmitting the detected peril/loss (719) event from the at least one monitoring-device 100 to the set of instructions (e.g., NINCE 367) on the at least one server 309 of the subscription provider. In some embodiments, the at least one monitoring-device 100 may wirelessly transmit data related to a loss/peril 719 event at or within that given storage unit 101 to NINCE 367. In some embodiments, NINCE 367 may automatically reformat/interpret that received data and transmit various data/alters/warnings/notices to the authorized persons through HIS to their respective computing-devices 373. In some embodiments, NINCE 367 may automatically escalate based on the data received at 367 from the at least one monitoring-device 100; and/or NINCE 367 may seek an escalation command from one or more of the authorized persons. In some embodiments, completion of step 721 may be that some form of peril/loss has been detected at or within the given storage unit 101 being monitored with the at least one monitoring-device 100. In some embodiments, step 721 may transition into step 723.

Continuing discussing FIG. 7A, in some embodiments, step 723 may be a step of validating that the detected peril/loss event has actually occurred. In some embodiments, step 723 may entail additional data generation by the at least one monitoring-devices 100, such as, but not limited to, date/time stamp, image and/or audio captures. In some embodiments, step 723 may entail analysis, evaluation, and/or interpretation of data generated by the at least one monitoring-devices 100. In some embodiments, at least some of that analysis, evaluation, and/or interpretation may be carried out by NINCE 367 (e.g., by running various logic and/or algorithms). In some embodiments, at least some of that analysis, evaluation, and/or interpretation may be carried out by one or more of the authorized persons, such as, but not limited to, facility operator 405. In some embodiments, step 723 may entail one or more physical inspections of the given storage unit 101 to confirm the loss/peril event. In some embodiments, such physical inspections may be carried out by one or more of the authorized persons. In some embodiments, once validation/confirmation that peril/loss event has occurred, then step 723 may transition into step 725.

Continuing discussing FIG. 7A, in some embodiments, step 725 may be a step of gathering information for a purpose of initiating/submitting an insurance loss claim to the insurance company. In some embodiments, step 725 may entail an authorized person (e.g., the tenant/insured/subscriber) interacting with HIS to obtain information from NINCE 367 and/or to obtain data from the at least one monitoring-device 100. In some embodiments, step 725 may entail information from physical inspection(s) of the storage-unit 101 and/or its contents. In some embodiments, step 725 may transition into step 727.

Continuing discussing FIG. 7A, in some embodiments, step 727 may be a step of electronically transmitting an insurance loss claim (using HIS 400 in some embodiments) to the insurance company 771. In some embodiments, step 727 may be a step of electronically transmitting the insurance loss claim from the set of instructions (e.g., NINCE 367) on the at least one server to the insurance company 771 (insurance carrier) for review by the insurance company 771. In some embodiments, in step 727, the tenant 401/insured/subscriber may generate/create/submit the insurance loss claim via HIS and their computing-device 373 (tenant device 303); and then NINCE 367 may transmit the electronic/digital insurance loss claim to the at least one server of the insurance claim. In some embodiments, step 727 may yield step 713.

In some embodiments, prior to the step 727, the set of instructions (e.g., NINCE 367) may receive from a computing-device 373 associated with tenant 401 (e.g., tenant device 303), a request for the set of instructions (e.g., NINCE 367) to generate the insurance loss claim. In some embodiments, then the set of instructions (e.g., NINCE 367), with inputs received from the computing-device 373 (e.g., see step 725) associated with tenant 401 (e.g., tenant device 303) and from inputs received from the at least one monitoring-device 100, may generate the insurance loss claim. In some embodiments, then the set of instructions (e.g., NINCE 367) may communicate the generated insurance loss claim to the computing-device 373 associated with tenant 401 (e.g., tenant device 303); and the set of instructions (e.g., NINCE 367) may request an approval from tenant 401 for the set of instructions (e.g., NINCE 367) to electronically transmit the generated insurance loss claim to the insurance company 771. In some embodiments, upon the set of instructions (e.g., NINCE 367) receiving an approval of tenant 401 from the computing-device 373 associated with tenant 401 (e.g., tenant device 303), then the set of instructions (e.g., NINCE 367) may perform step 727.

Continuing discussing FIG. 7A, in some embodiments, step 713 may be a step of the insurance company (insurance carrier) determining if the submitted insurance loss claim will be approved/accepted. In some embodiments, to aid in evaluating the received insurance loss claim, the insurance company, through HIS, may obtain additional information from NINCE 367 and/or from the at least one monitoring-device 100 associated with that storage unit 101. In some embodiments, step 713 may outside of method 700. In some embodiments, step 713 may yield step 715 if the insurance loss claim is approved/accepted.

Continuing discussing FIG. 7A, in some embodiments, step 715 may be a step of the insurance company (insurance carrier) paying out to the policy holder (e.g., the tenant/subscriber) on the approved/accepted insurance loss claim. In some embodiments, step 715 might involve the insurance company 771 (insurance carrier) communicating to the policy holder (e.g., tenant 401) that the insurance claim has been denied or that further information is required to finalize a ruling by the insurance company 771. In some embodiments, step 715 may outside of method 700.

Figure 7B:
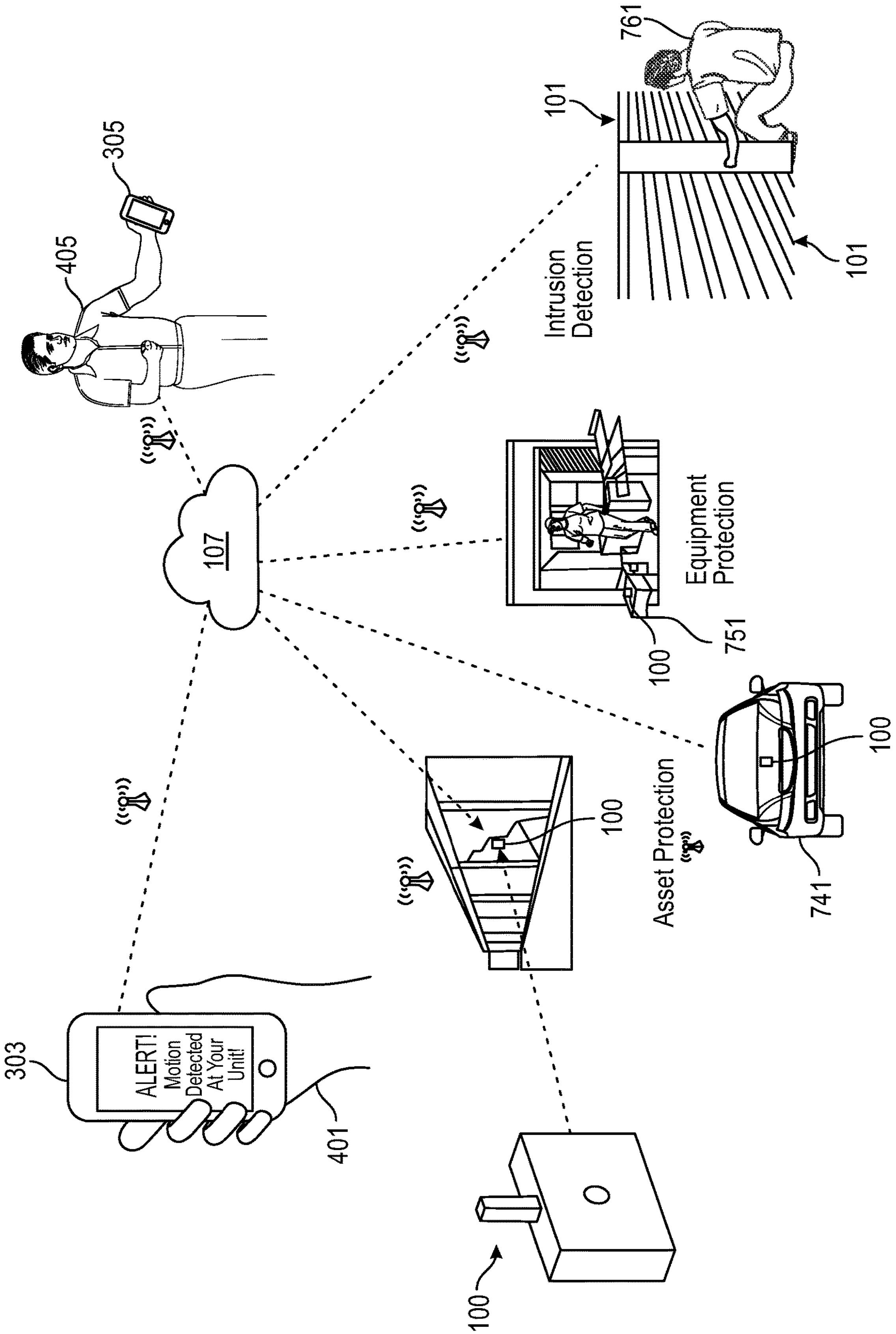
FIG. 7B may depict a system for remotely monitoring a given storage unit using at least one monitoring-device installed within that given storage unit.

FIG. 7B is just an expansion of FIG. 1, showing various monitoring-devices 100 being used in various asset monitoring scenarios, such as, but not limited to, monitoring storage-units 101, monitoring a vehicle 741, monitoring equipment/tools 751, combinations thereof, and/or the like. Thus, FIG. 7B may illustrate various asset protection applications/scenarios using at least one monitoring-device 100 for each category of asset to be protected/monitored. In some embodiments, for each storage unit 101 there may be at least one monitoring-device 100 installed within; for each vehicle 741, there may be at least one monitoring-device 100 installed on that given vehicle 741; and for each tool or each group of tools, there may be at least one monitoring-device 100 associated therewith. FIG. 7B may show that these various monitoring-devices 100 may be in wireless communication with network/cloud 107, then to the various computing-devices 373, such as, but not limited to tenant device 303 and facility operator device 305. In some embodiments, the subscription service/monitoring provider's server(s), and NINCE 367, which may be running on such servers, may be a portion of network/cloud 107. FIG. 7B may also show a thief 761 tampering with (e.g., opening and/or cutting into) a given storage unit 101 being monitored with at least one monitoring-device 100 inside (or potentially outside) of that storage unit 101; wherein the at least one monitoring-device 100 may detect storage unit 101 door motion/vibration (and/or some other detection such as fire, smoke, water, rodents, humidity, temperature, combinations thereof, and/or the like) and may report this event via wireless communications to NINCE 367; and then NINCE 367 may reformat and/or interpret that reported data in the form of an alert/warning/notice that may then be communicated to the various authorized persons, such as the tenant 401, via HIS, and that tenant's 401 tenant device 303; and/or to facility operator 405, via HIS, and that facility operator device 305. Other authorized persons could also be reported to.

In some embodiments, vehicle 741 may be selected from one or more of: a motor vehicle, a car, an automobile, a truck, a pickup truck, a sport utility vehicle (SUV), a van, a motorcycle, a bike, a bicycle, a dirt bike, a motorbike, a golf cart, a quad, an ATV (all terrain vehicle), a snowmobile, a sand-rail, a dune buggy, an RV (recreational vehicle), a motorhome, a camper, a trailer, a fifth-wheel, a vessel, a boat, a kayak, a canoe, an aircraft, a plane, a helicopter, combinations thereof, and/or the like.

Figure 7C:
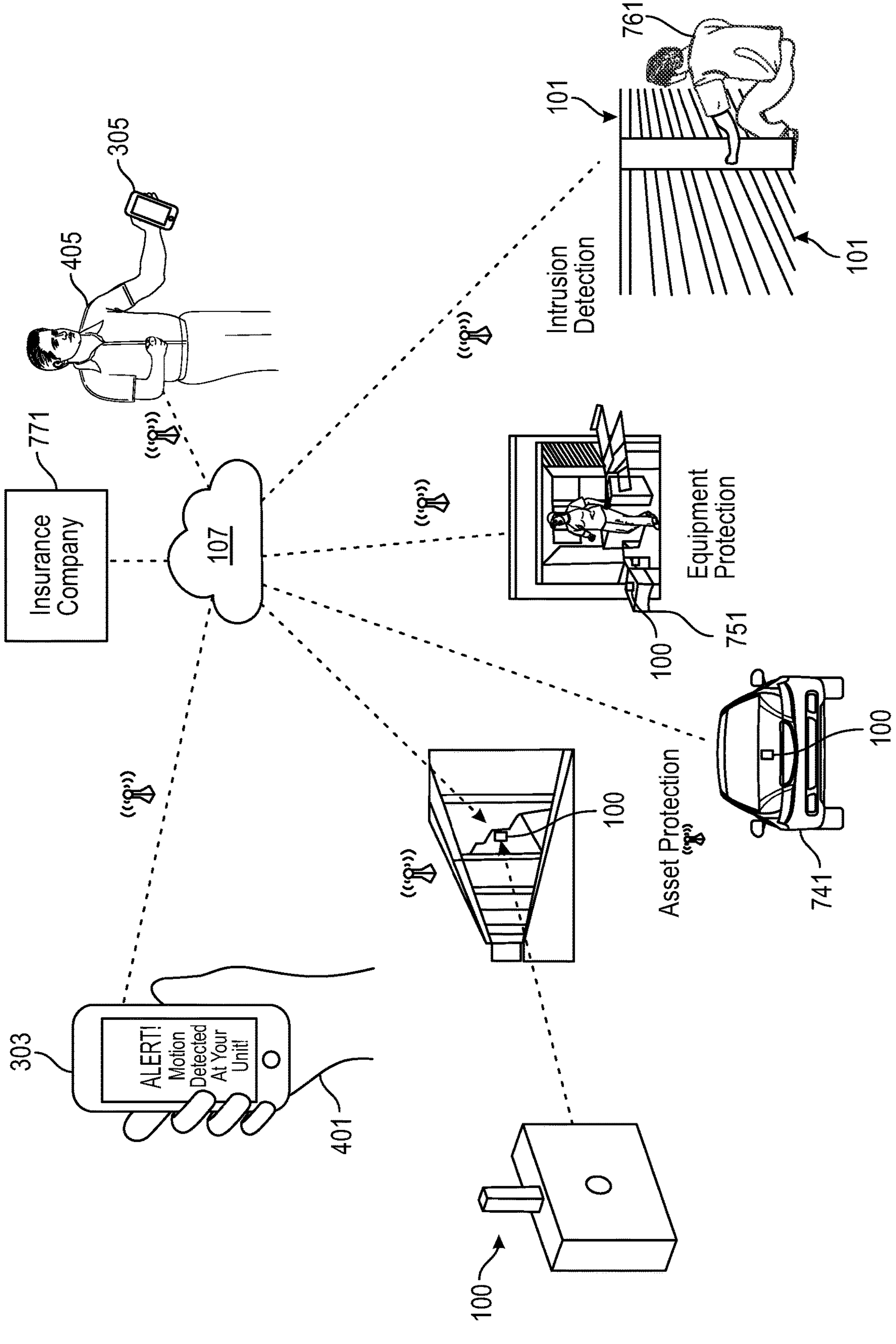
FIG. 7C may depict a system for remotely monitoring a given storage unit using at least one monitoring-device installed within that given storage unit.

FIG. 7C may just a further expansion of FIG. 7B, that now includes insurance company/carrier 771 that may be in communication with the various monitoring-devices 100. In some embodiments, at least one server of insurance company/carrier 771 may be in communication with the various monitoring-devices 100; and at least some of that communication may be wireless communication. In some embodiments, at least one server of insurance company/carrier 771 may be in communication with NINCE 367 that may be located in or part of network/cloud 107. Thus, FIG. 7C may further support method 700 and/or FIG. 7A.

Figure 8A:
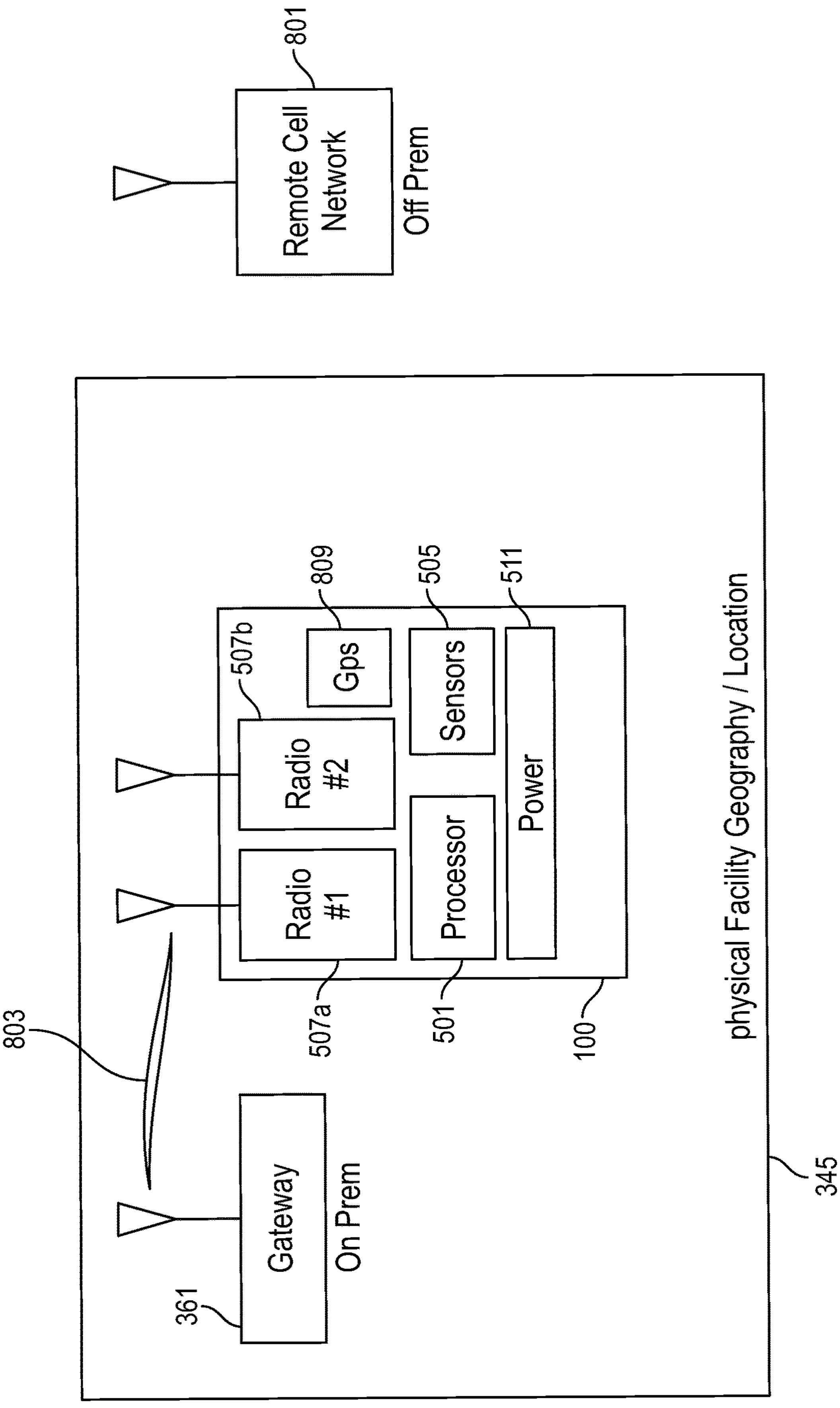
FIG. 8A may depict relativity short-range low power wireless communications between a given monitoring-device and a gateway, wherein both the monitoring-device and the gateway may be located on the same premises/grounds (but possibly at different locations within those premises/grounds).

FIG. 8A may show a schematic block diagram of a low power wireless connection/communications 803 between a given radio/antenna (e.g., primary radio 507*a*) of a given monitoring-device 100 and an ad hoc wireless network (e.g., specifically a gateway 361 of that ad hoc wireless network) located on that storage facility's 345 premises/grounds. In some embodiments, the wireless connection/communications 803 between that given monitoring-device 100 (e.g., via primary radio 507*a*) and the ad hoc wireless network (e.g., gateway 361) may be low power as in a LP WAN connection/communications; and this may preserve/extend a battery life of power source 511 of that given monitoring-device 100. In some embodiments, a given monitoring-device 100 may default to use of a low power wireless connection/communication 803 through its primary radio 507*a*, when such a connection may be established. In some embodiments, when the low power wireless connection/communications 803 are possible (e.g., with low power wireless communications between primary radio 507*a* and gateway 361), then monitoring-device 100 may not wirelessly directly connect to cellular network 801. In some embodiments, cellular network 801 may be operated by a third-party cellular service provider, such as, but not limited to, Verizon, AT&T, T-Mobile, combinations thereof, and/or the like. In some embodiments, and in general, cellular network 801 may have cellular towers (e.g., receivers/transmitters) located offsite with respect to storage facility's 345 premises/grounds. (Although some storage facility's 345 premises/grounds could have a cellular tower onsite.)

In some embodiments, upon "certain conditions" at a given monitoring-device 100, that monitoring-device 100 may switch over to higher power wireless communications 805 between secondary radio 507*b* and cellular network 801 (e.g., shown in FIG. 8B), when it may be desired to sacrifice battery life of power source 511 in favor of increased data/information communications between the given monitoring-device 100, NINCE 367, and end-user computing-devices 373. In some embodiments, the "certain conditions" may be an escalation determination, as determined by NINCE 367 and/or as determined by an authorized person (such as but not limited to, the tenant, the facility operator, the subscription service/monitoring service personnel, law enforcement personnel, fire department personnel, first responder personnel, insurance company personnel, etc.). In some embodiments, an escalation determination as determined by NINCE 367, may be based on data received from the given monitoring-device 100 at NINCE 367, wherein that data may be of sensor(s) 505 readings that exceed at least one predetermined threshold; wherein such sensor(s) 505 reading may indicate a serious problem, such as, but not limited to, fire, flooding, earthquake, tornado, smoke, volatile chemical(s), unauthorized access, combinations thereof, and/or the like.

FIG. 8A (FIG. 8B and FIG. 8C) may also show that a given monitoring-device 100 may comprise at least one GPS module 809. In some embodiments, GPS module 809 may permit a geographical location (e.g., in a coordinate system) to be generated for the given monitoring-device 100. In some embodiments, GPS module 809 may a type of I/O means 509. In some embodiments, GPS module 809 may a type of communications 507. In some embodiments, GPS module 809 may a type of sensor 505.

Figure 8B:
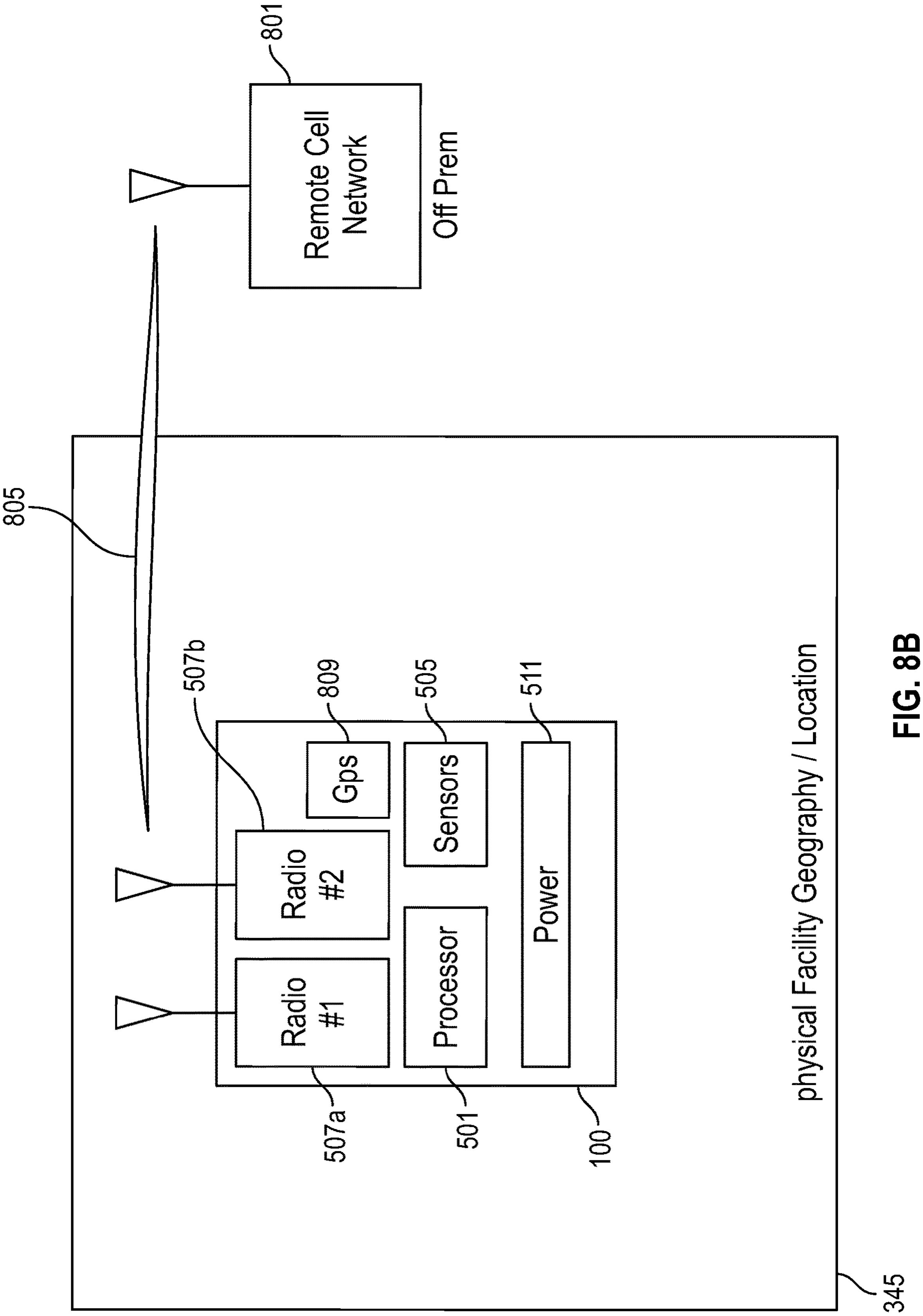
FIG. 8B may depict longer-range and higher power wireless communications between a given monitoring-device and a cellular network, wherein the monitoring-device may located on/at a given storage facility (e.g., installed withing a given storage-unit).

FIG. 8B may show a schematic block diagram of a low power (or low bandwidth cellular) wireless connection/communications 805 between a given radio/antenna (e.g., secondary radio 507*b*) of a given monitoring-device 100 and cellular network 801. In some embodiments, wireless connection/communications 805 may be a backup communication route as compared to low power wireless connection/communication 803. In some embodiments, use of wireless connection/communications 805 may be triggered when low power wireless connection/communication 803 may not be available.

FIG. 8B may show a schematic block diagram of a high power (or higher power or conventional/traditional cellular or higher bandwidth) wireless connection/communications 805 between a given radio/antenna (e.g., secondary radio 507*b*) of a given monitoring-device 100 and cellular network 801. The communication scenario shown in FIG. 8B may occur: when there may no ad hoc wireless network (with one or more gateways 361) located onsite at storage facility's 345 premises/grounds; when storage facility's 345 premises/grounds may have an ad hoc wireless network (with one or more gateways 361), but there may a connection problem between primary radio 507*a* and gateway 361 preventing establishment of low power wireless connection/communication 803; when storage facility's 345 premises/grounds may have an ad hoc wireless network (with one or more gateways 361), but at least one of the "certain conditions" has occurred (or is occurring), such that it may be desirable to switch over to the wireless connection/communications 805 for increased bandwidth functionality; and/or combinations thereof; and/or the like.

In some embodiments, the at least one monitoring-device 100 may utilize primary radio 507*a* when the primary radio 507*a* is able to establish a low power wireless connection 803 with a local gateway 361 and when a mode of operation for the at least one monitoring-device 100 may be a power saving mode (a default mode of operation in some embodiments). In some embodiments, the local gateway 361 may be local if that local gateway 361 may be within short-range of the at least one monitoring-device 100 (e.g., if gateway 361 may be located onsite of storage facility 345). In some embodiments, if the primary radio 507*a* may be unable to establish the low power wireless connection 803 with the local gateway 361, then the secondary radio 507*b* may attempt to establish a cellular connection 805 with a cellular network 801. Or in some embodiments, if the mode of operation for the at least one monitoring-device 100 may be a higher power mode, then the secondary radio 507*b* may attempt to establish the cellular connection 805 with the cellular network 801. In some embodiments, the higher power mode may be triggered by the "certain conditions" at a given monitoring-device 100, such as, but not limited to, an escalation event. For example, and without limiting the scope of the present invention, in some embodiments, an escalation event may be a possible unauthorized intrusion, possibly a theft in progress or attempt at theft in progress or other critical peril or predetermined condition; wherein switching over to the higher power mode (or higher bandwidth mode) may permit faster transmission of video and/or camera images from the given at least one monitoring-device 100, to NINCE 367, and then on to authorized stakeholder(s) (e.g., tenant 401). In some embodiments, use of the cellular connection 805 may cease once there has been a de-escalation event, and if possible, the lower power wireless connection/communication may be re-instated.

In some embodiments, when wireless connection/communication 805 may not be needed/necessary, wireless communications of the given monitoring-device 100 may revert back to using low power wireless connection/communication 803. In some embodiments, this may occur when low power wireless connection/communication 803 is able to re-established. In some embodiments, this may occur when the given monitoring-device 100 receives a switch radio command from NINCE 367 and originating from NINCE 367 and/or from an authorized computing-device 373 in communication with NINCE 367, e.g., via HIS 400. In some embodiments, this may occur when "the certain predetermined conditions" are met/applies and "the certain different predetermined conditions" are not met/does not apply.

Figure 8C:
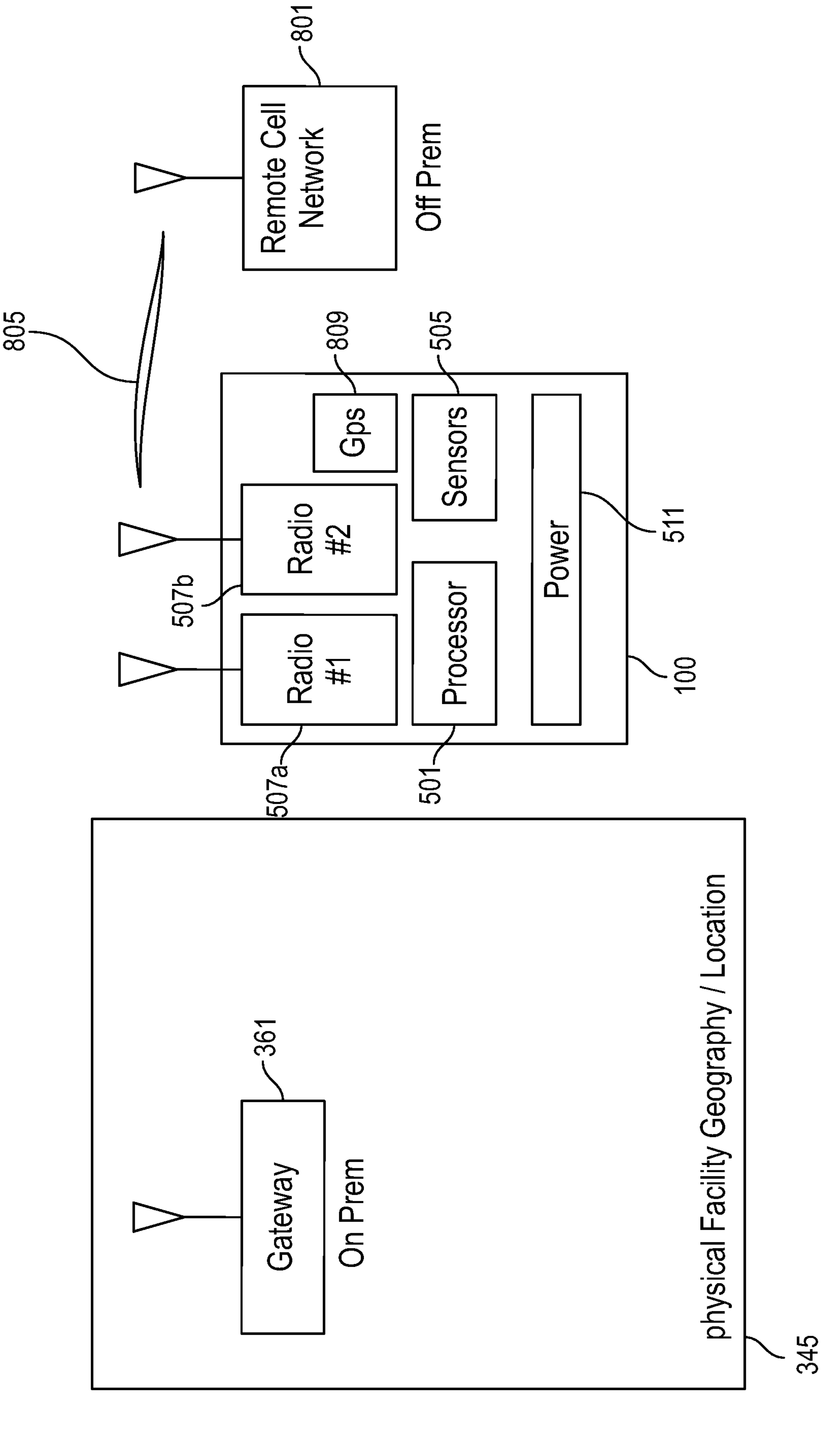
FIG. 8C may depict longer-range and higher power wireless communications between a given monitoring-device and a cellular network, wherein the monitoring-device may be physically associated with an asset to be monitored and that asset has been removed from its storage facility.

FIG. 8C may depict a scenario when the given monitoring-device 100 has been physically moved offsite from storage facility's 345 premises/grounds, such that a low power connection/communications 803 between primary radio 507*a* and gateway 361 of the ad hoc network are no longer possible (because the proximity threshold has been exceeded), in which case, that monitoring-device 100 may automatically switch over to wireless connection/communications 805 between its secondary radio 507*b* and cellular network 801. In some embodiments, wireless connection/communications 805 may be a cellular connection/communications. For example, and without limiting the scope of the present invention, the scenario shown in FIG. 8C may occur in a theft situation, when an asset (such as, but not limited to, vehicle 741 and/or equipment/tool 751) that has at least one monitoring-device 100 attached to that asset has been removed from storage facility's 345 premises/grounds in an unauthorized manner. For example, and without limiting the scope of the present invention, the scenario shown in FIG. 8C may occur when an asset (such as, but not limited to, vehicle 741 and/or equipment/tool 751) that has at least one monitoring-device 100 attached to that asset has been intentionally and properly removed from storage facility's 345 premises/grounds, such as, but not limited to, an RV being taken out for a family vacation, a contractor removing tools/equipment 751 necessary for work, or the like. That asset could have been some tangible object (such as, but not limited to, vehicle equipment/tool 751) previously stored within a given storage unit 101; or that asset could have been a vehicle 741 stored on storage facility's 345 premises/grounds.

Continuing discussing FIG. 8C, in some embodiments, the given monitoring-device 100 associated with a given asset (e.g., vehicle 741, equipment/tool 751, shipping containers, utility trailers, PODs, combinations thereof, and/or the like) may comprise GPS-module 809. In some embodiments, GPS module 809 may be used to determine a location for the given asset. In some embodiments, wireless connection/communications with cellular network 801 may be used to determine an approximate location for the given asset.

Continuing discussing FIG. 8C, in some embodiments, in order to provide continuous battery power-optimized wireless connectivity outside a locally defined controlled space for transient use in order to maintain the monitoring service, and optionally including geo-tracking, when a given monitoring-device 100 moves outside the initial defined location and into surrounding local areas, broader regions or across the USA, when primary radio 507*a* is able to establish a low power wireless connection (such as, but not limited to, NFC, LAN, or WAN) with a primary network then primary radio 507*a* may be utilized. However, in some embodiments, if the primary radio 507*a* is unable to establish a such a low power wireless connection, then the secondary radio 507*b* may attempts to establish a connection with the secondary network (e.g., cellular network 801), which in this case may require either a longer range WAN radio or cellular radio networks that ensure the broader desired geographic network connectivity only when outside the range of the local primary radio 507*a* network thus, the monitored-device 100 consumes/utilizes the higher power secondary radio 507*b* only until given monitoring-device 100 returns back to the local lower power network and re-established its primary radio 507*a* network connection (e.g., to gateway 361). In some embodiments, it should also be noted that the reverse may also apply, i.e., that the primary radio 507*a* low power wireless connection is re-established when the low power network is able to establish a steady and reliable low power wireless connection.

In some embodiments, a given monitoring-device 100 may switch from low power wireless communications using primary radio 507*a* to secondary radio 507*b*. In some embodiments, the given monitoring-device 100 may switch from secondary radio 507*b* use to low power wireless communications using primary radio 507*a*. In some embodiments, use of secondary radio 507*b* may allow for longer range wireless communications as compared to primary radio 507*a*; and/or use of secondary radio 507*b* may allow for higher power wireless communications as compared to primary radio 507*a*. In some embodiments, use of secondary radio 507*b* may allow the given monitoring-device 100 to access increased/higher bandwidth wireless communications as compared to using primary radio 507*a*. However, use of secondary radio 507*b* may use more power than use of primary radio 507*a*. In some embodiments, use of secondary radio 507*b* may be done when there may be a need and/or a desire for access to increased bandwidth (e.g., to transmit larger files sizes and/or to transmit more files), such as, but not limited to, transmitting sensor 505 data at an increased rate; transmitting video, image, and/or audio captured by the given monitoring-device 100; streaming video, image, and/or audio captured by the given monitoring-device 100; combinations thereof. In some embodiments, when the need and/or the desire for access to increased bandwidth no longer exists, the given monitoring-device 100 may switch back from secondary radio 507*b* use to primary radio 507*a*; i.e., use of secondary radio 507*b* (e.g., when be using for increased bandwidth access) may be for brief durations in time. In some embodiments, switching from primary radio 507*a* to secondary radio 507*b* may be triggered and/or controlled by one or more of: certain sensor 505 data/reading beyond a predetermined threshold; determination of an escalation event; the given monitoring-device 100 being moved into a location where primary radio 507*a* cannot connect; receiving a proper switch radio command from NINCE 367 originating from NINCE 367 and/or originating from an authorized computing-device 373 in communication with NINCE 367; combinations thereof, and/or the like. In some embodiments, when use of secondary radio 507*b* may be triggered because primary radio 507*a* cannot connect, secondary radio 507*b* can and may operate in a low power mode; i.e., just because the given monitoring-device 100 may be using secondary radio 507*b*, such use may not be a scenario requiring increased bandwidth access. In some embodiments, switching from secondary radio 507*b* to primary radio 507*a* may be triggered and/or controlled by one or more of: certain sensor 505 data/reading within/under a predetermined threshold; determination of an de-escalation event; the given monitoring-device 100 being moved into a location where primary radio 507*a* can connect; receiving a proper switch radio command from NINCE 367 originating from NINCE 367 and/or originating from an authorized computing-device 373 in communication with NINCE 367; combinations thereof, and/or the like. Inclusion of primary radio 507*a* and secondary radio 507*b*, and their use rules, may prolong battery power (power source 511) of the given monitoring-device 100.

In some embodiments, primary radio 507*a* may be configured for low power wireless communications, such as, but not limited to, low power LAN, low power NFC, Zigbee, 802.15, BT, BLE, RFID, WiFi, low power WAN, LoRa, SigFix, combinations thereof, and/or the like.

In some embodiments, secondary radio 507*b* may be configured for low power and/or higher power wireless communications, such as, but not limited to, cellular, 4G, LTE, 5G, NB-IoT, LTE Cat-M1, LoRa, SigFox, combinations thereof, and/or the like.

In some embodiments, communication pathways shown in FIG. 1, FIG. 7B, FIG. 7C, FIG. 8A, FIG. 8B, and FIG. 8C, may be in alignment/cooperation/corroboration of the flows shown in FIG. 3A, FIG. 3B, FIG. 3C, and/or FIG. 4.

In some embodiments, embodiments of this invention may be a system (systems) for monitoring a given controlled space (e.g., storage unit 101) using at least one monitoring-device 100. In some embodiments, such a system may comprise the at least one monitoring-device 100 and a set of instructions non-transitorily stored in memory of at least one server 309. In some embodiments, the set of instructions may be NINCE 367 or a portion thereof. In some embodiments, the at least one server 309 may be a computing-device 373 of the provider for the subscription and monitoring service. In some embodiments, the at least one server 309 may be a server owned and/or controlled by the provider for the subscription and monitoring service. In some embodiments, the at least one monitoring-device 100 may comprise at least one sensor 505 for sensing a condition of the given controlled space (e.g., storage unit 101). In some embodiments, the at least one monitoring-devices 100 may comprise at least one radio 507 (with at least one antenna). In some embodiments, the at least one sensor 505 and the at least one radio 507 may be operatively linked. In some embodiments, the set of instructions (e.g., NINCE 367) may be configured to instruct and/or control the at least one monitoring-device 100 in how to function. In some embodiments, the at least one radio 507 may be configured for two-way wireless communications between the at least one monitoring-device 100 and the at least one server 309 (which may be running the set of instructions [e.g., NINCE) 367]. In some embodiments, when the at least one monitoring-device 100 and the at least one server 309 may be in communication with each other, the at least one monitoring-device 100 periodically may wirelessly transmit information (e.g., sensor 505 data) to the at least one server 309 for use by the set of instructions (e.g., NINCE 367).

In some embodiments, the set of instructions (e.g., NINCE 367) may comprise two-way communications instructions for two-way communications in deploying a purpose-built natural language message protocol that deploys simple text and/or audible format (such as, but not limited to, an SMS messaging text format, but also optionally instant messaging, web messaging, chat messaging, mobile app messaging, and/or an audible voice format such as text-to-speech (robot voice)/speech (robot voice)-to-text, or the like) between the at least one server and a computing-device 373 associated with an authorized end-user, such as a tenant, tenant N+1, or facility operator, of the system. In some embodiments, these two-way communications instructions (of the set of instructions) may comprise an ability to execute one or more of the following:

(a) send predetermined natural language commands in the text message format(s) and/or optionally voice message format(s) from NINCE 367 (the set of instructions) to the computing-device 373 associated with the authorized end-user of the system;

(b) receive predetermined natural language commands in the text message format(s) and/or optionally voice message format(s) from the computing-device 373 associated with the authorized end-user of the system;

(c) interpret and convert the received predetermined natural language commands into commands that are executable by processor 501 of the at least one monitoring-device 100;

(d) transmit the commands that are executable by the processor 500 of the at least one monitoring-device 100, from the at least one server 309 to the at least one monitoring-device 100;

(e) receive the information (e.g., sensor data) from the at least one monitoring-device 100;

(f) interpret and convert the received information from the at least one monitoring-device 100 into content that is in the text message format(s) and optionally voice message format(s); and (g) transmit the content in the text message format(s) and optionally voice message format(s), from the at least one server to the computing-device 373 associated with the authorized end-user.

Then in some embodiments, the at least one monitoring-device 100 may receive from the at least one server 309 the transmission of the commands that are executable by the processor 501 of the at least one monitoring-device 100. Then in some embodiments, the processor 501 of the at least one monitoring-device 100 may execute the commands that are executable by the processor 501 of the at least one monitoring-device 100 that are received from at least one server 309. In some embodiments, the execution of the commands that are executable by processor 501 of the at least one monitoring-device 100, may cause the at least one monitoring-device 100 to generate additional information (e.g., sensor 505 data) and to transmit at least some of that additional information to the set of instructions (e.g., NINCE 367) on the at least one server 309. In some embodiments, the set of instructions (e.g., NINCE 367) may receive the at least some of the additional information from the at least one monitoring-device 100. Then in some embodiments, the set of instructions (e.g., NINCE 367) may interpret, convert, and/or transmit some portion of the at least some of the additional information as at least one text/SMS message (or another means of HIS 400) to the at least one computing-device 373.

In some embodiments, systems for monitoring a given storage space 101 may utilize one or more monitoring-devices 100, and wherein that system may comprise space monitoring software. In some embodiments, that space monitoring software may be accessed via HIS 400 and may include a web-based portal and/or interface (e.g., a Facility Web Manager), a mobile app, graphical user interfaces, combinations thereof, and/or the like. Such interface options may be accessed on one or more of: tenant device 303, facility operator device 305, provider device 309, and/or third party device 311. Via such interfaces: new tenants 401 may be onboarded; accounts created; accounts opened; accounts activated; accounts deactivated; settings, rules, preferences, and/the like entered; monitoring-devices 100 armed or disarmed; monitoring-devices 100 enabled or disabled; sensors 505 enabled or disabled; historical logs accessed and/or reviewed; and/or the like. In some embodiments, this software may allow status of: monitoring-devices 100, sensors 505 (e.g., change of status/state, sensor data status/state, power, connectivity, etc.), system, battery 511 level, connectivity, combinations thereof, and/or the like to be monitored and/or checked. In some embodiments, such interfaces may provide various dashboards and/or analytics of this information. In some embodiments, this software may allow display via one of these interfaces deployed monitoring-devices 100 in a representative 2D (two dimensional) and/or 3D (three dimensional) map of a given storage facility 345.

In some embodiments, various access authorization requirements may be utilized, such as, but not limited to, caller ID checking, PIN checking, two step authentication, QR-codes (bar codes), voice recognition, fingerprint recognition, biometrics recognition, and/or the like.

An existing storage space 101 without any monitoring capabilities may be retrofitted with one or more monitoring-devices 100. In some embodiments, systems for monitoring a given storage space 101 may utilize one or more monitoring-devices 100, such that the system may be scalable, modular, and/or extendable by adding one or more additional monitoring-devices 100 to the system or alternatively easily removed and redeployed elsewhere when not in use and another storage unit 101 may be more preferable to a given tenant 401 and/or facility operator 405. In some embodiments, such retrofitting may be done without wires and/or adding wires. Electrical power may come from one or more batteries (e.g., power source 511), with ultra-long lasting battery life; and/or from renewable energy sources, such as solar energy, wind energy, and/or the like.

In some embodiments, methods for monitoring a given storage space 101 may utilize one or more monitoring-devices 100, such that the method may be scalable, modular, and/or extendable by adding one or more additional monitoring-devices 100 to the system or alternatively easily removed and redeployed elsewhere when not in use and another storage unit 101 may be more preferable to a given tenant 401 and/or facility operator 405.

In some embodiments, the one or more monitoring-devices 100 may be preconfigured for easy of installation and quick setup ahead of intended end-user demand, permitting a plug and play installation without wiring and cabling.

In some embodiments, the details, information, alerts, reminders, notices, notifications, alarms, and/or the like generated by a given monitoring-device 100 and/or by its controlling software may be communicated to the various interested party via text message, SMS message, audible messages (e.g., two-way robo voice calls), and/or through other software interfaces optionally included, and/or the like. That is, in some embodiments, access to an applicable mobile app and/or access to web portal interface may not be necessary.

In some embodiments, the details, information, alerts, reminders, notices, notifications, alarms, and/or the like generated by a given monitoring-device 100 and/or by its controlling software may be communicated to the various interested party via text message, SMS message, internet browser, email, voice call, video call, voicemail, private message, dedicated/proprietary software application (e.g., the storage space monitoring software or portion thereof), combinations thereof, and/or the like.

In some embodiments, communications from the given monitoring-device 100 may be done in real-time and/or substantially near real-time (e.g., minus computing times and transmission times).

In some embodiments, editing, changing, and/or updating rules, preferences, settings, and/or the like for a given monitoring-device 100 and/or by its controlling software may be communicated to from various interested party via text message, SMS message, mobile app, web portal/interface, and/or the like. For example, and without limiting the scope of the present invention, the tenant/renter may supply rules pertaining to escalation of alarms. In some embodiments, text messaging and/or SMS messaging may then be two way.

In some embodiments, various algorithms, machine learning, and/or AI may be used to improve rules and responses to rules, such as, but not limited to, enhancing end-user experience, accuracy of predictive warnings, response times for communications, collective knowledge, real-time knowledge, combinations thereof, and/or the like, individually or in combination, to further optimize the authorized stakeholder hierarchy escalation rules and automatic/semi-automatic behavior. False alarms may be minimized over time as the machine learning and/or AI "learns" what the tenant/renter may deem as acceptable and unacceptable behavior.

Similarly, algorithms, machine learning, and AI use may facilitate and enhance engagement and relevance with authorized users interfacing with the two-way text messaging (such as SMS messaging) and/or audible voice messaging (such as text-to-voice, voice-to-text), including natural language use in such two-way communications.

In some embodiments, one or more monitoring-devices 100 may be used to monitor a given defined space and/or asset. In some embodiments, the define space and/or the asset may be selected from one or more of the following: an interior space; an interior zone; enclosed spaces; a room of a building; rooms; marine vessels (e.g., vessels, boats, ships, jet skis, skidoos, kayaks, canoes, house boats, and the like); RVs (e.g., recreational vehicles, campers, motor homes, fifth wheels, and the like); equipment used with camping (e.g., tents, campsites, and the like); equipment used in moving (e.g., moving boxes, moving trucks, moving vehicles, and the like); pods (e.g., storage pods); trailers; mailboxes; vacant homes; vacant buildings; locked buildings; hotel rooms; construction sites, construction yards; pets; pet enclosures, animals; animal enclosures; stables; animal stalls; rentals (e.g., residential, commercial, and the like); vacation rentals; cabins; hunter blinds; hunter traps; warehouses; fleets; off road vehicles (e.g., Jeeps, sport utility vehicles [SUVs], pickup trucks, and the like); quads; ATVs (e.g., all-terrain vehicles, three-wheelers); apartments, AirBNB rental properties; car rentals; bicycle rentals; vehicle rentals; schools; motorcycles; waste totes; livestock movement and/or containers; aircraft; luggage; trash; trash containers; fields; yards; lots; parking lots and/or parking spots; sheds; post office boxes; combinations thereof, portions thereof, and/or the like.

Monitoring-devices, systems for monitoring at least one controlled space for transitory uses, and methods for monitoring at least one controlled space are described. The foregoing description of the various embodiments of the invention has been presented for the purposes of illustration and disclosure. It is not intended to be exhaustive nor to limit the invention to the precise form disclosed. Many modifications and variations are possible in light of the above teaching without departing from the spirit or scope of the invention.

While the invention has been described in connection with what is presently considered to be the most practical embodiments, it is to be understood that the invention is not to be limited to the disclosed embodiments, but on the contrary, is intended to cover various modifications and equivalent arrangements included within the spirit and scope of the appended claims.

What is claimed is:

1. A monitoring-device for electronic monitoring of a controlled space, wherein the controlled space is for transitory use, wherein the monitoring-device comprises:

at least one enclosure that at least partially houses electronics of the monitoring-device; and the electronics, wherein the electronics comprises: at least one processor, at least one sensor, and at least one radio; wherein the at least one sensor is configured to sense at least one condition of the controlled space; wherein the at least one radio is configured for wireless communication; wherein the at least one radio is configured to be in periodic wireless communication with at least one network connection; and wherein the at least one processor is operatively connected to: the at least one sensor and the at least one radio; wherein the at least one processor controls the at least one sensor and the at least one radio;

wherein the monitoring-device, via the at least one radio, is configured to communicate with software running on a server by the at least one radio wirelessly connecting to a gateway of an ad hoc network that is in communication with the server.

2. The monitoring-device according to claim 1, wherein the enclosure comprises integral mounting hardware that is configured for mounting of the monitoring-device to a surface within the controlled space without tools that are separate from the monitoring-device.

3. The monitoring-device according to claim 2, wherein the mounting hardware is selected from one or more of: at least one magnet, at least one adhesive layer with a peel away cover, a plurality of hooks for removeable attachment to a complimentary plurality of loops, or a plurality of loops for removeable attachment to a complimentary plurality of hooks.

4. The monitoring-device according to claim 1, wherein the electronics further comprises at least one power source, wherein the at least one power source is configured to power at least some of the electronics.

5. The monitoring-device according to claim 4, wherein the at least one power source is selected from one or more of: at least at least one battery or at least one fuel cell.

6. The monitoring-device according to claim 1, wherein the at least one sensor is at least one primary sensor and the electronics further comprises at least one secondary sensor.

7. The monitoring-device according to claim 6, wherein the at least one primary sensor and the at least one secondary sensor are different types of sensors.

8. The monitoring-device according to claim 6, wherein the at least one secondary sensor is configured for obtaining sensor readings that are external to the enclosure.

9. The monitoring-device according to claim 6, wherein activation of the at least one secondary sensor depends on the at least one primary sensor obtaining a sensor reading outside of a predetermined threshold.

10. The monitoring-device according to claim 6, wherein the at least one primary sensor and the at least one secondary sensor operate independently of each other.

11. The monitoring-device according to claim 6, wherein the electronics further comprises memory for non-transitory storage of real-time sensor data; wherein the real-time sensor data comprises sensor readings from (i) the at least one primary sensor, (ii) the at least one secondary sensor, or (iii) both the at least one primary sensor and the at least one secondary sensor; wherein the memory is operatively connected to and controlled by the at least one processor; wherein the real-time sensor data is from one or more of the at least one primary sensor or the at least one secondary sensor; wherein event detection and processing is performed in the monitoring-device by the at least one processor using the real-time sensor data.

12. The monitoring-device according to claim 1, wherein the electronics further comprises memory for non-transitory storage of real-time sensor data; wherein the real-time sensor data comprises sensor readings from the at least one sensor; wherein the memory is operatively connected to and controlled by the at least one processor; wherein the real-time sensor data is from the at least one sensor; wherein event detection and processing is performed in the monitoring-device by the at least one processor using the real-time sensor data.

13. The monitoring-device according to claim 1, wherein the at least one radio is at least one primary radio; wherein the electronics further comprises at least one secondary radio.

14. The monitoring-device according to claim 13, wherein the electronics further comprises at least one power source, wherein the at least one power source is configured to at least power the at least one primary radio or the at least one secondary radio, wherein at least some portion of the electronics are configured to minimize power usage from wireless communications;

wherein the at least one primary radio is configured for lower power wireless communications using at least one of shorter-range communications or lower bandwidth communications, as compared to the at least one secondary radio; and wherein the at least one secondary radio is configured for higher power wireless communications using at least one of longer-range communications or higher bandwidth communications, as compared to the at least one primary radio.

15. The monitoring-device according to claim 14, wherein the monitoring-device uses the at least one primary radio when the at least one primary radio is able to establish and maintain the at least one network connection with a primary network, which meets a sufficient satisfactory coverage threshold for the at least one primary radio; wherein if the at least one primary radio is unable to establish or maintain the at least one network connection with the primary network, and thereby not meeting the sufficient satisfactory coverage threshold, then the least one secondary radio attempts to establish a different wireless connection with a secondary network.

16. The monitoring-device according to claim 15, wherein if monitoring-device is using the at least one secondary radio, the monitoring-device will switch over to using at least one primary radio when the at least one primary radio is able to establish and maintain the at least one network connection with the primary network.

17. The monitoring-device according to claim 14, wherein the monitoring-device uses the at least one primary radio when the at least one primary radio is able to initiate and complete wireless transmission of data when the at least one primary radio meets a sufficient satisfactory coverage threshold for the at least one primary radio; wherein if the at least one primary radio has insufficient throughput capabilities for wireless transmission of the data, then the at least one secondary radio attempts to establish the different wireless connection with the secondary network for the transmission of the data.

18. The monitoring-device according to claim 17, wherein if monitoring-device is using the at least one secondary radio for transmitting the data, the monitoring-device will switch over to using the at least one primary radio when the at least one secondary radio completes the transmission of the data and when the at least one primary radio is able to establish and maintain the at least one network connection with the primary network.

19. The monitoring-device according to claim 1, wherein the controlled space is a storage rental unit of a fixed volume that is substantially enclosed.

20. The monitoring-device according to claim 1, wherein the monitoring-device comprises a locking means configured for removably attaching to a latch hasp of the controlled space, wherein the locking means (i) locks electronically, (ii) unlocks electronically, or (iii) both electronically locks and unlocks, wherein the locking means is operatively connected to the electronics, wherein the monitoring-device provides controlled access to the controlled space.

21. The monitoring-device according to claim 1, wherein the electronics further comprises a sound maker.

22. The monitoring-device according to claim 21, wherein the sound maker is selected from at least one of: a speaker, a buzzer, a siren, or a horn.

23. The monitoring-device according to claim 1, wherein the at least one sensor is selected from one or more of: a passive infrared sensor, a motion detection sensor, an image capture sensor, a camera, an accelerometer, a vibration detector, an inertia detector, a positional detector, an orientation sensor, a gyroscope, a door movement sensor, a door open or closed sensor, a window movement sensor, a window open or closed sensor, a window break sensor, a water sensor, a humidity sensor, a temperature sensor, an acoustic sensor, a microphone, a sound sensor, a rodent intrusion sensor, a touch sensor, a change in resistance sensor, a change in capacitance sensor, a change in magnetic field sensor, a chemical sensor, a particulate sensor, a light sensor, a darkness sensor, a light level sensor, a light of the controlled space on or off sensor, a location sensor, or a global positioning system module.

24. The monitoring-device according to claim 6, wherein the at least one secondary sensor is selected from one or more of: a passive infrared sensor, a motion detection sensor, an image capture sensor, a camera, an accelerometer, a vibration detector, an inertia detector, a positional detector, an orientation sensor, a gyroscope, a door movement sensor, a door open or closed sensor, a window movement sensor, a window open or closed sensor, a window break sensor, a water sensor, a humidity sensor, a temperature sensor, an acoustic sensor, a microphone, a sound sensor, a rodent intrusion sensor, a touch sensor, a change in resistance sensor, a change in capacitance sensor, a change in magnetic field sensor, a chemical sensor, a particulate sensor, a light sensor, a darkness sensor, a light level sensor, a light of the controlled space on or off sensor, a location sensor, or a global positioning system module.

25. The monitoring-device according to claim 6, wherein the at least one primary sensor is a motion detection sensor and the at least one secondary sensor is an image capture sensor.

26. The monitoring-device according to claim 1, wherein the electronics comprises at least one camera.

27. The monitoring-device according to claim 13, wherein switching between use of the at least one primary radio and the at least one secondary radio is caused by the at least one sensor.

28. The monitoring-device according to claim 1, wherein the monitoring-device has at least two different operating modes.

29. The monitoring-device according to claim 28, wherein the at least two different operating modes are a power saving mode and a higher power mode.

30. The monitoring-device according to claim 29, wherein the power saving mode is a default mode of operation.

31. The monitoring-device according to claim 29, wherein a switch from the power saving mode to the higher power mode is triggered by the monitoring-device receiving at least one certain condition.

32. The monitoring-device according to claim 29, wherein the higher power mode enables faster transmission of video and/or camera images from the monitoring-device as compared to the power saving mode.

33. The monitoring-device according to claim 1, wherein the monitoring device activates or deactivates the at least one sensor.

34. The monitoring-device according to claim 1, wherein a frequency of sensor readings from the at least one sensor is increasable or decreasable.

35. The monitoring-device according to claim 1, wherein the at least one sensor is an image capture sensor that is configured to capture, store, and transmit one or more of: photos, still images, video images, and/or audio.

36. The monitoring-device according to claim 35, wherein the electronics comprises a second sensor that is selected from one or more of: a passive infrared sensor, a motion detection sensor, an accelerometer, a vibration detector, an inertia detector, a positional detector, an orientation sensor, a gyroscope, a door movement sensor, a door open or closed sensor, a window movement sensor, a window open or closed sensor, a window break sensor, a water sensor, a humidity sensor, a temperature sensor, an acoustic sensor, a microphone, a sound sensor, a rodent intrusion sensor, a touch sensor, a change in resistance sensor, a change in capacitance sensor, a change in magnetic field sensor, a chemical sensor, a particulate sensor, a light sensor, a darkness sensor, a light level sensor, a light of the controlled space on or off sensor, a location sensor, or a global positioning system module.

37. The monitoring-device according to claim 1 wherein the electronics comprises memory and/or storage, wherein data from the at least one sensor is non-transitorily stored in the memory and/or in the storage; wherein the memory and/or the storage are in operative communication with the at least one processor.

38. The monitoring-device according to claim 37, wherein the data is content of one or more of: a photo, a still image, a video, audio, positional information, movement information, or fingerprint scans.

39. The monitoring-device according to claim 37, a set of instructions for controlling the at least one processor is non-transitorily stored within the storage and is called up into the memory during operation of the at least one processor.

40. The monitoring-device according to claim 39, wherein the set of instruction includes instructions for capturing the data from the at least one sensor.

41. The monitoring-device according to claim 39, wherein the set of instruction includes instructions for transmission of at least some of the data.

42. The monitoring-device according to claim 1, wherein the at least one radio is configured for cellular communications.

* * * * *